United States Patent
Honma et al.

(10) Patent No.: US 7,962,267 B2
(45) Date of Patent: Jun. 14, 2011

(54) CONTROL APPARATUS AND METHOD FOR AUTOMATIC TRANSMISSION

(75) Inventors: Tomoaki Honma, Kanagawa (JP);
Masaaki Uchida, Kanagawa (JP);
Shusaku Katakura, Kanagawa (JP);
Yoshinobu Kawamoto, Kanagawa (JP);
Sadamu Fujiwara, Kanagawa (JP)

(73) Assignee: Jatco Ltd, Fuji-shi (JP)

( * ) Notice: Subject to any disclaimer, the term of this patent is extended or adjusted under 35 U.S.C. 154(b) by 992 days.

(21) Appl. No.: 11/828,044

(22) Filed: Jul. 25, 2007

(65) Prior Publication Data
US 2008/0026910 A1    Jan. 31, 2008

(30) Foreign Application Priority Data

Jul. 31, 2006   (JP) ................. 2006-208908

(51) Int. Cl.
*G06F 17/00*   (2006.01)
*B60W 10/10*   (2006.01)
(52) U.S. Cl. .......................... 701/51; 477/34
(58) Field of Classification Search .............. 701/60, 701/51, 84, 87; 475/43; 477/34, 107, 110
See application file for complete search history.

(56) References Cited

U.S. PATENT DOCUMENTS

| | | | |
|---|---|---|---|
| 5,551,930 A * | 9/1996 | Creger et al. | 477/130 |
| 5,609,068 A | 3/1997 | Gruhle et al. | |
| 5,772,550 A * | 6/1998 | Kamada et al. | 475/120 |
| 5,782,711 A | 7/1998 | Tsutsui et al. | |
| 5,795,265 A | 8/1998 | Domian et al. | |
| 5,809,442 A * | 9/1998 | Schulz et al. | 701/51 |
| 5,810,694 A * | 9/1998 | Kamada et al. | 477/150 |
| 5,908,370 A | 6/1999 | Kubo et al. | |
| 6,514,166 B2 | 2/2003 | Yuasa et al. | |
| 6,684,144 B2 | 1/2004 | Sekii et al. | |
| 6,832,978 B2 | 12/2004 | Buchanan et al. | |
| 6,887,184 B2 | 5/2005 | Buchanan et al. | |
| 6,909,955 B2 | 6/2005 | Vukovich et al. | |
| 7,037,239 B2 | 5/2006 | Werner et al. | |

(Continued)

FOREIGN PATENT DOCUMENTS

JP   02-080853 A   3/1990

(Continued)

OTHER PUBLICATIONS

T. Honma, U.S. PTO Notice of Allowance, U.S. Appl. No. 11/772,963, dated Apr. 16, 2010, 15 pages.

(Continued)

*Primary Examiner* — Yonel Beaulieu
(74) *Attorney, Agent, or Firm* — Foley & Lardner LLP

(57) ABSTRACT

A control apparatus for an automatic transmission includes a target-value setting section configured to set a target rotational-speed difference between input and output rotational speeds of at least one of first and second friction-engagement elements; a total torque-capacity calculating section configured to calculate a total torque capacity of the first and second friction-engagement elements by adding a transmission input torque to a correction value calculated from a deviation between the target rotational-speed difference and an actual rotational-speed difference; a distribution-ratio setting section configured to set a distribution ratio; an individual torque-capacity calculating section configured to calculate individual torque capacities of both second friction-engagement elements on the basis of the total torque capacity and the distribution ratio; and an engagement control section configured to control engagement states of the both friction-engagement elements in accordance with the individual torque capacities.

27 Claims, 25 Drawing Sheets

U.S. PATENT DOCUMENTS

| | | |
|---|---|---|
| 7,039,516 B2 | 5/2006 | Yamaguchi et al. |
| 7,089,102 B2 * | 8/2006 | Slayton et al. ................ 701/51 |
| 7,131,933 B2 | 11/2006 | Tabata |
| 7,563,196 B2 | 7/2009 | Yamada et al. |
| 7,666,113 B2 | 2/2010 | Honma et al. |
| 7,682,285 B2 | 3/2010 | Kraska et al. |
| 2007/0225115 A1 * | 9/2007 | Nakajima et al. ............ 477/107 |
| 2007/0278022 A1 * | 12/2007 | Tanishima ................... 180/65.2 |
| 2009/0312132 A1 * | 12/2009 | Saitou et al. ................. 475/128 |
| 2009/0318264 A1 * | 12/2009 | Suzuki ........................ 477/140 |

FOREIGN PATENT DOCUMENTS

| | | |
|---|---|---|
| JP | 08-503764 A | 4/1996 |
| JP | 08-184369 A | 7/1996 |
| JP | 9-170654 | 6/1997 |
| JP | 09-296862 A | 11/1997 |
| JP | 10-502438 A | 3/1998 |
| JP | 2001-124196 A | 5/2001 |
| JP | 2001-235024 A | 8/2001 |
| JP | 2004-251456 A | 9/2004 |
| JP | 2004-538213 A | 12/2004 |

OTHER PUBLICATIONS

U.S. Appl. No. 11/772,963, filed Jul. 3, 2007, Honma et al.
U.S. Appl. No. 11/772,988, filed Jul. 3, 2007, Honma et al.
Tomoaki Honma, U.S. Notice of Allowance and Allowability, U.S. Appl. No. 11/772,988, dated Oct. 7, 2009, 10 pages.

* cited by examiner

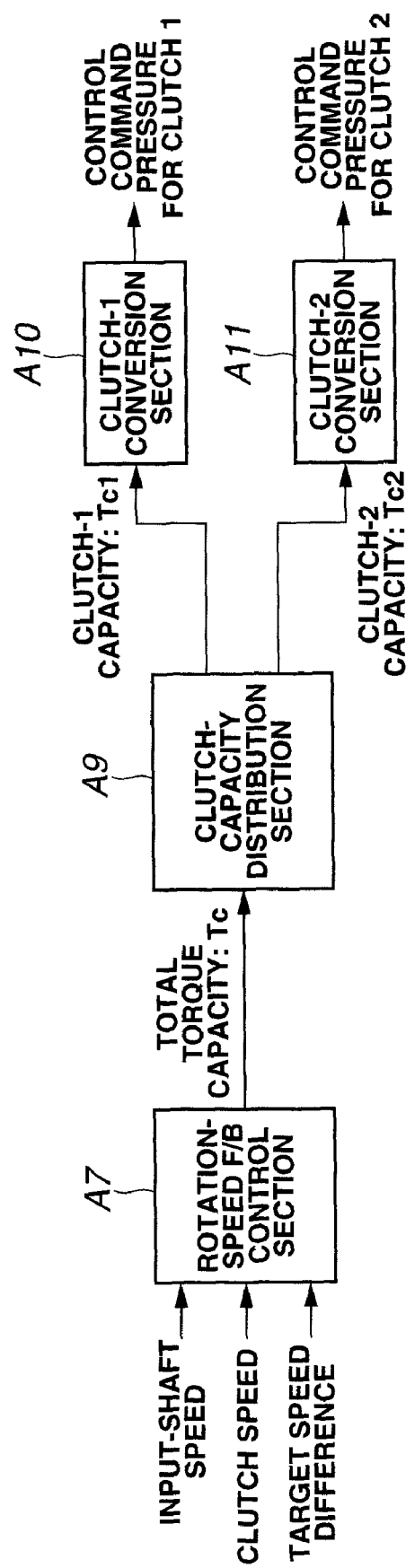

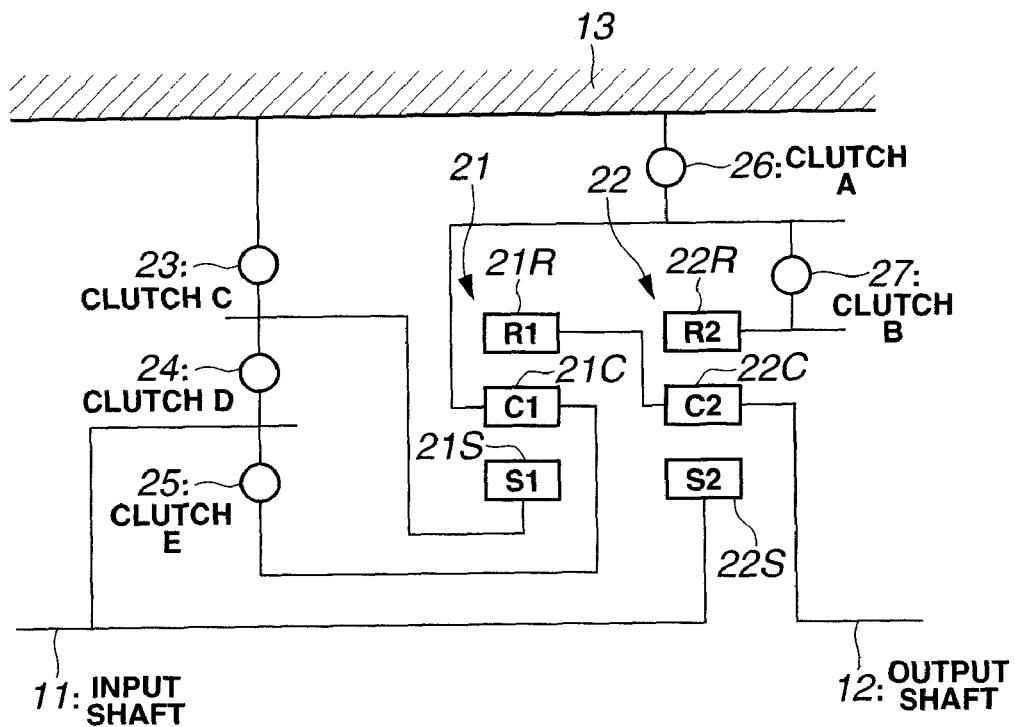

CONTROL APPARATUS AND METHOD FOR AUTOMATIC TRANSMISSION

BACKGROUND OF THE INVENTION

The present invention relates to control apparatus and method for an automatic transmission adapted to transmit power by selectively engaging a friction clutch (or friction-engagement element).

Generally when carrying out a shift of automatic transmission (when changing a speed-step), a friction-engagement element such as a clutch is changed from a disengaged state to an engaged state, or changed from the engaged state to the disengaged state. In such case, it is desired that an operation for the friction-engagement element is performed smoothly and quickly so as not to generate a shock at the time of shift. Japanese Published Patent Application No. 1997(H09)-170654 discloses a previously proposed control apparatus. In this technique, hydraulic pressure to a hydraulic servo of friction-engagement element is adjusted in order to reduce the shock generated at the time of shift.

SUMMARY OF THE INVENTION

However, in the technique disclosed in the above Patent Application, although a target hydraulic pressure for engagement-side friction-engagement element (i.e., friction-engagement element to be changed from disengaged state to engaged state) at the start time of an inertia phase is calculated in accordance with an input torque; after that time, the friction-engagement element is controlled by focusing on hydraulic pressure. With regard to a disengagement-side friction-engagement element (i.e., friction-engagement element to be changed from engaged state to disengaged state), although a torque for disengagement-side element and a hydraulic pressure for disengagement-side element are calculated on the basis of the input torque and the hydraulic pressure for engagement-side element at the start time of the inertia phase; after that time, the disengagement-side element is controlled by focusing on hydraulic pressure. Thus both of engagement-side element and disengagement-side element are controlled with the focus on hydraulic pressure. Hence, a special calculation formula taking into account each characteristic of two friction-engagement elements is necessary when controlling the two friction-engagement elements concurrently.

Moreover in the technique disclosed in the above Application, a relation between control results of engagement-side and disengagement-side friction-engagement elements is difficult to be understood. Hence, this technique is difficult to be applied to a control focusing on the condition of speed difference of each friction-engagement element or the condition of a transfer-torque distribution between both friction-engagement elements. Namely, it is conceivable that a stable shift can be performed more smoothly and without excessive shock, if the friction-engagement elements are controlled by focusing on the above speed difference condition or transfer-torque distribution condition not only during the inertia phase but during engaging or disengaging process of each friction-engagement element.

Particularly in the case of automotive vehicle, when a driver wishes to accelerate the vehicle, the driver depresses an accelerator pedal. Thereby, a shift (ON-downshift) of the transmission toward lower speed-step (a side of lower speed-step) is conducted under the condition where an engine output is positive (power-on condition). In such power-on downshift, the driver requests a quick response of shift and a favorable feeling of shift.

It is an object of the present invention to provide control apparatus and method for an automatic transmission, devised to perform a stable shift smoothly, quickly, and with a mild shock, and devised to simply achieve the control focusing on the speed-difference condition of friction-engagement element and/or the transfer-torque distribution condition for both friction-engagement elements at the time of downshift.

According to one aspect of the present invention, there is provided a control apparatus for an automatic transmission, the automatic transmission including an input member and a plurality of friction-engagement elements having a first friction-engagement element and a second friction-engagement element, and being adapted to change a rotational speed of the input member driven by an engine, by engaging at least one of the plurality of friction-engagement elements in accordance with a desired speed step, the control apparatus comprising: a target-value setting section configured to set a target rotational-speed difference between an input rotational speed and an output rotational speed of at least one of the first and second friction-engagement elements, to cause the input rotational speed to become higher than the output rotational speed, when a downshift by a changeover between the first friction-engagement element and the second friction-engagement element is carried out during a power-on running of vehicle, the first friction-engagement element being adapted to attain a before-shift speed step, the second friction-engagement element being adapted to attain an after-shift speed step; a total torque-capacity calculating section configured to calculate a total torque capacity necessary for the first and second friction-engagement elements to bring an actual rotational-speed difference between the input rotational speed and the output rotational speed of the at least one of the first and second friction-engagement elements to the target rotational-speed difference set by the target-value setting section; a distribution-ratio setting section configured to set a distribution ratio of the total torque capacity between the first and second friction-engagement elements; an individual torque-capacity calculating section configured to calculate individual torque capacities necessary for the respective first and second friction-engagement elements, on the basis of the total torque capacity calculated by the total torque-capacity calculating section and the distribution ratio set by the distribution-ratio setting section; and an engagement control section configured to control engagement states of the first and second friction-engagement elements in accordance with the individual torque capacities calculated by the individual torque-capacity calculating section, the total torque-capacity calculating section being configured to calculate the total torque capacity by adding a transmission input torque for being inputted to the input member, to a correction value calculated from a deviation between the target rotational-speed difference and the actual rotational-speed difference for feedback control.

According to another aspect of the present invention, there is provided a control method for an automatic transmission, the automatic transmission including an input member and a plurality of friction-engagement elements having a first friction-engagement element and a second friction-engagement element; and being adapted to change a rotational speed of the input member driven by an engine, by engaging at least one of the plurality of friction-engagement elements in accordance with a desired speed step, the control method comprising: setting a target rotational-speed difference between an input rotational speed and an output rotational speed of at least one of the first and second friction-engagement elements to cause the input rotational speed to become higher than the output rotational speed, when a downshift by a changeover between the first friction-engagement element and the second friction-engagement element is carried out during a power-on running of vehicle, the first friction-engagement element being adapted to attain a before-shift speed step, the second friction-engagement element being adapted to attain an after-shift speed step; calculating a total torque capacity necessary for the first and second friction-engagement elements by adding a transmission input torque for being inputted to the input member to a correction value so as to bring an actual rotational-speed difference between the input rotational speed and the output rotational speed of the at least one of the first and second friction-engagement elements to the set target rotational-speed difference, the correction value being calculated from a deviation between the target rotational-speed difference and the actual rotational-speed difference for feedback control; setting a distribution ratio of the total torque capacity between the first and second friction-engagement elements; calculating individual torque capacities necessary for the respective first and second friction-engagement elements, on the basis of the calculated total torque capacity and the set distribution ratio; and controlling engagement states of the first and second friction-engagement elements in accordance with the calculated individual torque capacities.

According to still another aspect of the present invention, there is provided a control apparatus for an automatic transmission, the automatic transmission including an input member and a plurality of friction-engagement elements having a first friction-engagement element and a second friction-engagement element; and being adapted to change a rotational speed of the input member driven by an engine, by engaging at least one of the plurality of friction-engagement elements in accordance with a desired speed step, the control apparatus comprising: means for setting a target rotational-speed difference between an input rotational speed and an output rotational speed of at least one of the first and second friction-engagement elements to cause the input rotational speed to become higher than the output rotational speed, when a downshift by a changeover between the first friction-engagement element and the second friction-engagement element is carried out during a power-on running of vehicle; means for calculating a total torque capacity of the first and second friction-engagement elements by adding a transmission input torque for being inputted to the input member to a correction value so as to bring an actual rotational-speed difference between input and output rotational speeds of the at least one of the first and second friction-engagement elements closer to the set target rotational-speed difference by way of feedback control, the correction value being calculated from a deviation between the target rotational-speed difference and the actual rotational-speed difference; means for setting a distribution ratio of the total torque capacity between the first and second friction-engagement elements; means for calculating individual torque capacities necessary for the respective first and second friction-engagement elements, on the basis of the calculated total torque capacity and the set distribution ratio; and means for controlling engagement states of the first and second friction-engagement elements in accordance with the calculated individual torque capacities.

The other objects and features of this invention will become understood from the following description with reference to the accompanying drawings.

BRIEF DESCRIPTION OF THE DRAWINGS

FIG. 1 is a schematic block diagram showing a basic configuration of control apparatus for a twin-clutch-type transmission according to respective embodiments of the present invention.

FIG. 2 is a view explaining an example of a main structure of automatic transmission in shift controls according to the respective embodiments.

FIG. 3 is a view showing an engagement table in the case where a downshift from second-speed to first-speed is carried out in the automatic transmission of FIG. 2.

DETAILED DESCRIPTION OF THE INVENTION

Figure 4:
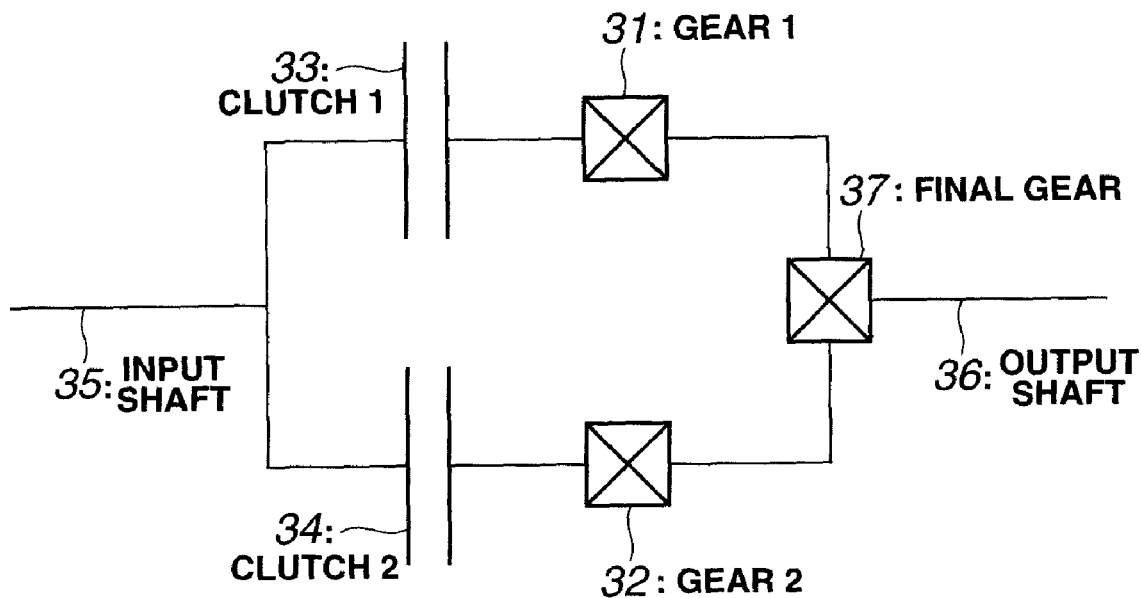
FIG. 4 is a simplified view showing a basic structure of automatic transmission in the shift control according to the respective embodiments.

Reference will hereinafter be made to the drawings in order to facilitate a better understanding of the present invention.

Common Structure of Shift Control for Automatic Transmission in Embodiments According to the Present Invention At first, a principle and a basic structure of shift control common among after-described embodiments according to the present invention will be now explained with reference to FIGS. 1 to 6, before detailing the respective embodiments. FIG. 2 is a schematic diagram showing a structure of general four-speed (four-step) automatic transmission. As shown in FIG. 2, the automatic transmission is mounted between an input shaft 11 and an output shaft 12. This automatic transmission includes two planetary gear sets 21 and 22 in series.

First planetary gear set 21 includes a sun gear 21S (S1), a carrier 21C (C1), and a ring gear 21R (R1). Second planetary gear set 22 includes a sun gear 22S (S2), a carrier 22C (C2), and a ring gear 22R (R2). A brake 23 (clutch C) is interposed between sun gear 21S of first planetary gear set 21 and a casing 13, as a friction-engagement element. Sun gear 21S is forced to stop rotating by engaging (throwing in) brake 23. A clutch 24 (D) is interposed between sun gear 21S and input shaft 11, as a friction-engagement element. Sun gear 21S is forced to rotate integrally with (together with) input shaft 11 by engaging clutch 24. Hereinafter, the friction-engagement element such as clutch or brake is simply referred to as clutch.

Carrier 21C pivotally supports planetary pinions of first planetary gear set 21, namely carrier 21C supports the planetary pinions so that the planetary pinions pivot on carrier 21C. A clutch 25(E) is interposed between carrier 21C and input shaft 11. Carrier 21C is forced to rotate as a unit with (integrally with) input shaft 11 by means of the engagement of clutch 25. A brake 26 (clutch A) is interposed between carrier 21C and casing 13. Carrier 21C is forced to stop rotating by means of the engagement of brake 26. Moreover, a clutch 27(B) is interposed between carrier 21C and ring gear 22R. Carrier 21C is forced to rotate integrally with ring gear 22R by means of the engagement of clutch 27.

Ring gear 21R of first planetary gear set 21 is directly connected with carrier 22C pivotally supporting planetary pinions of second planetary gear set 22. On the other hand, sun gear 22S of second planetary gear set 22 is directly connected with input shaft 11. Carrier 22C is directly connected with ring gear 21R, and is directly connected with output shaft 12. Ring gear 22R of second planetary gear set 22 is connected through clutch 27 with carrier 21C of first planetary gear set 21, as mentioned above.

As shown by an engagement table of FIG. 3, in the case where a downshift from a second-speed (second-gear-speed of the transmission) to a first-speed (first-gear-speed of the transmission) is carried out in such automatic transmission; clutch A is changed from in a disengaged (released) state to in an engaged state, clutch C is changed from in the engaged state to in the disengaged state, and the other clutches are maintained at their states kept before the downshift. Namely, the downshift from the second-speed to the first-speed is performed (i.e., the state of transmission gears is changed from the second to the first) by engaging the released clutch A and by releasing the engaged clutch C.

In order to simply consider this shift of transmission, an extreme simplification of structure of the transmission can be provided as shown in FIG. 4. FIG. 4 shows the simplified parallel-shaft-type automatic transmission including two gears (two gear sets) each of which is for achieving the corresponding transmission ratio (speed ratio of transmission). These two gear sets are respectively connected with corresponding clutches. Namely, the simplified automatic transmission includes a clutch 33 connected in series with a gear train 31 serving to achieve one transmission ratio (e.g. first-speed); and a clutch 34 connected in series with a gear train 32 serving to achieve another transmission ratio (e.g. second-speed). This clutch 33 is connected in parallel with clutch 34; and moreover one side of clutch 33 is connected to the input-shaft side and another side of clutch 33 is connected with an output shaft 36 through gear train 31, a final gear 37 and the like. Similarly, one side of clutch 34 is connected to the input-shaft side and another side of clutch 34 is connected with output shaft 36 through gear train 32, final gear 37 and the like.

Figure 5:
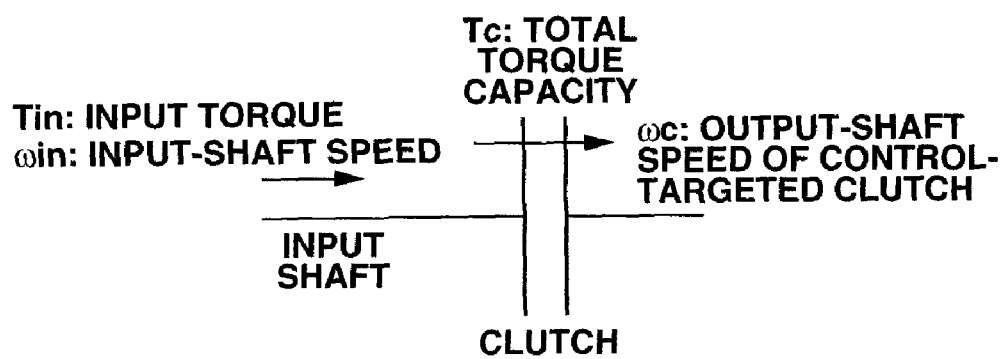
FIG. 5 is a further simplified view showing the basic structure of automatic transmission in the shift control according to the respective embodiments.

The above-described downshift from the second-speed to the first-speed can be considered, as a shift control causing the currently-engaged clutch 34 to be released and causing the currently-disengaged clutch 33 to be engaged in the two-speed transmission shown in FIG. 4. Moreover when considering a configuration of this changeover from clutch 34 to clutch 33 from a viewpoint of a rotation difference control of clutch 33 or 34, the rotation-speed difference of any of clutch 33 and clutch 34 is controlled by controlling engagement capacities Tc1 and Tc2 of two clutches 33 and 34 in accordance with an input torque Tin and an input rotation speed $\omega$in. It is noted that this term "engagement capacity" means an engagement degree or engagement force of clutch, in other words, a torque transmitting ability by its engaging pressure. Hence by extracting only a clutch part from the two-speed transmission shown in FIG. 4, the changeover control from clutch 34 to clutch 33 can be replaced with a rotation-speed-difference control which is performed by an engagement capacity control for one integrated clutch as shown in FIG. 5, for the sake of simple consideration. Namely, by controlling the engagement capacity for one integrated clutch instead of individually controlling the two clutches, the engagement capacities of both clutches can be controlled.

Therefore, the control apparatus for a twin-clutch-type transmission according to the respective embodiments generally includes a rotation-speed (or rotation-speed difference) feedback control section A7 as a functional component of the rotation-speed control for clutch (i.e., rotation speed control for the input side of clutch, or speed-difference control for clutch); and a clutch-capacity distribution section A9 as a functional component of a distribution ratio control for clutches, as shown in FIG. 1. This rotation-speed feedback control section A7 is provided functionally before clutch-capacity distribution section A9. By using such configuration, the case will be now explained where the control for changing clutch 1 from the engaged state to the released state and for changing clutch 2 from the released state to the engaged state is carried out.

By such configuration, a total torque capacity of two of a disengagement-side clutch 1 (i.e., clutch scheduled to be disengaged, or being in currently (gradually-)disengaging state) and an engagement-side clutch 2 (i.e., clutch scheduled to be engaged, or being in currently engaging state) is controlled or adjusted so as to cause a rotation speed of input shaft of the transmission to range within a predetermined tolerance. Alternatively, the total torque capacity of two of disengagement-side clutch 1 and engagement-side clutch 2 may be controlled so as to cause a rotation-speed difference between the input and the output of disengagement-side clutch 1 to range within a predetermined tolerance. At the same time, the distribution ratio for distributing the total torque capacity to the two clutches is controllably varied. Thereby, a replacing control for varying the distribution (share) of transfer torque between two clutches is achieved while performing the rotation-speed (difference) control of clutch. Finally, the transfer torque capacity of disengagement-side clutch 1 is converted to a corresponding control pressure (value) in a conversion section A10, and the transfer torque capacity of engagement-side clutch 2 is converted to a corresponding control pressure in a conversion section A11. Then, control commands representing thus-determined control pressure values are outputted and executed.

By thus-constructed configuration (or concept) for control system, the rotation-speed (difference) control of clutch can be separated from the distribution ratio control of torque. Then finally, the integrated control quantity (controlled variable) depending on these two controls can be produced for the execution of shift. Therefore, the thus-constructed configuration is easy to be applied to various types of shift control for automatic transmission.

Thus-constructed configuration for control system is applicable also to a power-on downshift. The power-on downshift is a shift toward lower speed-step side (lower-gear side) which is caused when a driver depresses an accelerator pedal. This downshift is called the power-on downshift since this downshift is conducted when the condition of engine output power is "Positive" (i.e., under power-on condition of engine).

At the time of power-on, the engine output power is increased by increasing an accelerator opening. Hence, an engine rotational speed (i.e., rotational speed of input shaft 11) is increased in response to the release of disengagement-side clutch 1 (i.e., clutch being in engaged state before the shift and being scheduled to be released with the execution of shift). Moreover, at the time of downshift, the engine speed (i.e., rotational speed of input shaft 11) is increased as the result of execution of shift. Therefore at the time of above-mentioned power-on downshift, if focusing on the rotation of input shaft 11 (or input member) of transmission, a direction of the rotational variation of input shaft 11 which spontaneously occurs in dependence upon the release of disengagement-side clutch 1 is same as a direction of the rotational variation which is caused as the result of execution of the shift control.

In the case of such condition, at first, the rotational speed of input shaft is controllably varied from a value corresponding to the rotational speed obtained by a transmission ratio before the shift, to a value corresponding to the rotational speed obtained by a transmission ratio after the shift. Subsequently, the changeover (replacement) of clutch is carried out.

Figure 6:
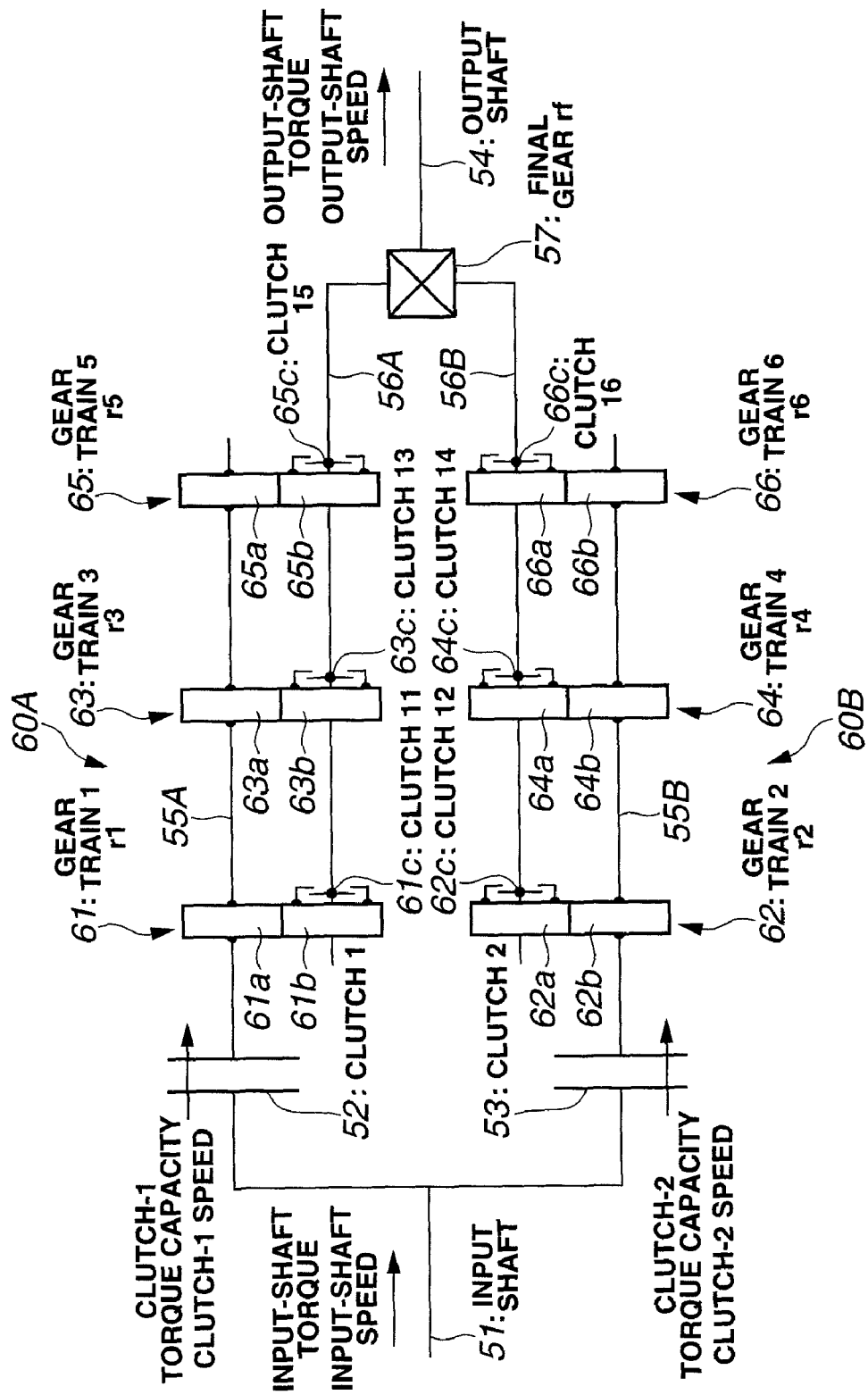
FIG. 6 is a view explaining a schematic structure of automatic transmission applicable to the shift controls according to the respective embodiments.

Here, there is a two-shaft-type six-speed automatic transmission as shown in FIG. 6, as a development of the two-speed transmission shown in FIG. 4. In the after-described respective embodiments, the case where such two-shaft-type six-speed automatic transmission is shifted will be explained.

As shown in FIG. 6, this automatic transmission includes an input shaft (input member) 51, a first clutch 52 (clutch 1), a second clutch 53 (clutch 2), an output shaft 54, a shift gear mechanism 60A, and a shift gear mechanism 60B. Input shaft 51 is connected with the input-side member of first clutch 52, and is connected with the input-side member of second clutch 53. Shift gear mechanism 60A is interposed between first clutch 52 and output shaft 54. Shift gear mechanism 60B is interposed between second clutch 53 and output shaft 54.

Shift gear mechanism 60A includes an input-side shaft (input shaft) 55A, an output-side shaft (output shaft) 56A, a first-speed gear set 61 (gear train 1), a third-speed gear set 63 (gear train 3), and a fifth-speed gear set 65 (gear train 5). First-speed gear set 61 is interposed between input-side shaft 55A and output-side shaft 56A, and includes a gear 61a, a gear 61b, and an engaging mechanism 61c having synchromesh function (hereinafter also simply called, "synchro"). Third-speed gear set 63 is interposed between input-side shaft 55A and output-side shaft 56A, and includes a gear 63a, a gear 63b, and an engaging mechanism 63c having synchromesh function. Fifth-speed gear set 65 is interposed between input-side shaft 55A and output-side shaft 56A, and includes a gear 65a, a gear 65b, and an engaging mechanism 65c having synchromesh function.

Shift gear mechanism 60B includes an input-side shaft (input shaft) 55B, an output-side shaft (output shaft) 56B, a second-speed gear set 62 (gear train 2), a fourth-speed gear set 64 (gear train 4), and a sixth-speed gear set 66 (gear train 6). Second-speed gear set 62 is interposed between input-side shaft 55B and output-side shaft 56B, and includes a gear 62a, a gear 62b, and an engaging mechanism 62c having synchromesh function. Fourth-speed gear set 64 is interposed between input-side shaft 55B and output-side shaft 56B, and includes a gear 64a, a gear 64b, and an engaging mechanism 64c having synchromesh function. Sixth-speed gear set 66 is interposed between input-side shaft 55B and output-side shaft 56B, and includes a gear 66a, a gear 66b, and an engaging mechanism 66c having synchromesh function. Each gear set 61~66 has a gear ratio $r1$~$r6$ different from one another.

Moreover, a gear 57a is fixedly installed at an output-end portion of output-side shaft 56A. Gear 57a is adapted to mesh (engage) with a gear 54a of output shaft 54 so as to transmit a power from output-side shaft 56A to output shaft 54. A gear 57b is fixedly installed at an output-end portion of output-side shaft 56B. Gear 57b is adapted to mesh with gear 54a of output shaft 54 so as to transmit a power from output-side shaft 56B to output shaft 54.

When attaining the shift-step (speed-step) of first-speed, third-speed, or fifth-speed; only the engaging mechanism 61c, 63c, or 65c of the gear set corresponding to the desired speed-step among engaging mechanisms 61c, 63c, and 65c is engaged, then first clutch 52 is engaged, and second clutch 53 is disengaged. When attaining the speed-step of second-speed, fourth-speed, or sixth-speed; only the engaging mechanism 62c, 64c, or 66c of the gear set corresponding to the desired speed-step is engaged, then first clutch 52 is disengaged, and second clutch 53 is engaged.

Therefore, for example, when considering the case of downshift from sixth-speed to fifth-speed, the condition that the sixth-speed (step) has been attained is changed into the condition that the fifth-speed has been attained. Namely, the condition that the sixth-speed has been attained means the condition where second clutch 53 is engaged (in closed); first clutch 52 is released (open); only clutch 16 (66c) of sixth-speed gear set 66 among second-speed gear set 62, fourth-speed gear set 64, and sixth-speed gear set 66 is engaged (in closed); and clutches 12 and 14 for the other gear steps are released (open). On the other hand, the condition that the fifth-speed has been attained means the condition where first clutch 52 is engaged; second clutch 53 is released; only a clutch 15 of fifth-speed gear set 65 among first-speed gear set 61, third-speed gear set 63, and fifth-speed gear set 65 is engaged; and clutches 11 and 13 for the other gear steps are released.

Therefore, in this case, while carrying out the changeover control for changing the state of second clutch 53 from the engaged state to the released state and changing the state of first clutch 52 from the released state to the engaged state, the control for switching from the condition that the sixth-speed (step) has been attained to the condition that the fifth-speed has been attained is carried out. Namely, by this switching control, the condition where only clutch 16 of sixth-speed gear set 66 among second-speed gear set 62, fourth-speed gear set 64 and sixth-speed gear set 66 is engaged (in closed) is changed to the condition where only clutch 15 of fifth-speed gear set 65 among first-speed gear set 61, third-speed gear set 63 and fifth-speed gear set 65 is engaged (in closed). This switching control is hereinafter also called a mechanical actuation other than engagement/disengagement of (main) clutch.

Accordingly, when changing the speed step by only one step, the changeover control is carried out between first clutch 52 and second clutch 53. Hence, in the case of downshift (power-on downshift) caused by the accelerator depression, for example, there are the downshift from fifth-speed to fourth-speed, the downshift from fourth-speed to third-speed, and the downshift from third-speed to second-speed.

First Embodiment

FIGS. 7 to 11 show control apparatus and method for a twin-clutch-type transmission according to the first embodiment of the present invention.

<Functional Configuration Related to Shift Control>

In this embodiment, the shift control for downshift according to the present invention is applied in the case where one of first clutch 52 and second clutch 53 is changed from in engaged (closed) state to in disengaged (open) state and another of first clutch 52 and second clutch 53 is changed from in disengaged state to in engaged state. Namely in this embodiment, the changeover control according to the present invention is applied, when one of first clutch 52 and second clutch 53 is disengaged and another of first clutch 52 and second clutch 53 is engaged at the request of attainment of the above-explained speed-step of transmission (for example, at the request of change from third-speed to second-speed). The explanation of this embodiment will be given by regarding first clutch 52 as a clutch 1 which is changed from engaged state to released state, and regarding second clutch 53 as a clutch 2 which is changed from released state to engaged state. However as a matter of course, the shift control according to the present invention can be also applied to the case where first clutch 52 is changed from released state to engaged state and second clutch 53 is changed from engaged state to released state.

The control apparatus according to this embodiment includes the above-mentioned basic structure as shown in FIG. 1. In more detail by focusing on its shift control phase, the control according to this embodiment includes a changeover phase explained above as the basic structure, a preparation phase, an inertia phase, and a finishing phase. The preparation phase is defined as a phase for preparing for the changeover functionally before the changeover phase. The inertia phase is defined as a phase for adjusting an inertia part (i.e., effect relevant to inertia), functionally before the changeover phase. The finishing phase is defined as a phase for finishing the shift control functionally subsequent to the changeover phase.

Figure 7:
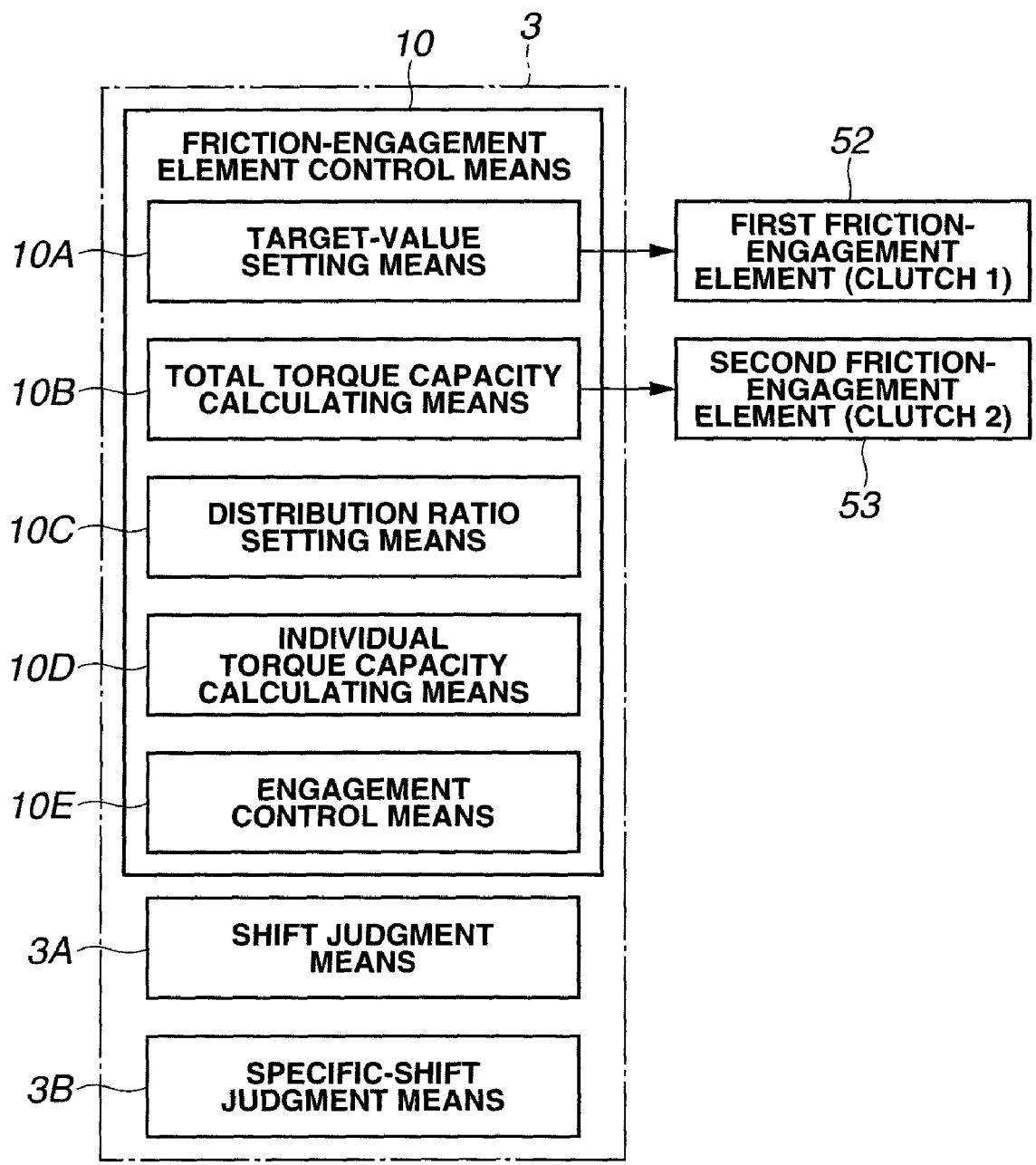
FIG. 7 is a control block diagram showing a main configuration of control apparatus for a twin-clutch-type transmission according to the respective embodiments.

From such viewpoint, it can be considered that a control function (a friction-engagement element control means or section) 10 of this shift control apparatus includes a target-value setting section or means 10A, a total torque capacity calculating section or means 10B, a distribution ratio setting section or means 10C, an individual torque capacity calculating section or means 10D, and an engagement control section or means 10E, as shown in FIG. 7. Friction-engagement element control means or section 10 further includes a shift judgment section or means 3A and a specific-shift judgment section or means (power-on downshift judgment section) 3B in order to judge the power-on downshift on which this shift control focuses.

These sections 10A to 10E, 3A, and 3B are provided as functional components included in an ECU (electronic control unit) 3 for the transmission. At first, the means of shift judgment will now be explained.

Shift judgment section 3A judges whether or not the shift (the change of speed step) should be carried out, and sets a target speed step (gear-speed) in the case where the shift should be carried out. This shift judgment is conducted based on a so-called shift map having parameters of a vehicle speed and an engine load (for example, throttle opening or accelerator manipulation degree). Shift judgment section 3A sets the target speed step at a speed step corresponding to a shift map's position of a driving point determined by the vehicle speed and engine load when the driving point moves to the position beyond a downshift line on the shift map.

Specific-shift judgment section 3B judges whether or not the above-mentioned downshift is a downshift under the power-on condition where positive torque is being inputted from the engine to the transmission side. Specific-shift judgment section 3B can judge whether or not the downshift is executed under the power-on condition, by judging whether or not the accelerator manipulation quantity (degree) or the throttle opening is greater than or equal to a reference value, or by judging whether or not a variation of accelerator manipulation quantity or a variation of throttle opening is greater than or equal to a reference variation, or by a combination of these judgments. Furthermore, specific-shift judgment section 3B can judge the power-on condition, also by judging whether or not an input rotational speed of the clutch which is currently transmitting power is higher than an output rotational speed thereof if giving a slight slip to the clutch.

Next, the means of shift control will now be explained. In this embodiment, a power-on downshift from the condition where clutch 1 is used (i.e., fifth-speed step or third-speed step) to the condition where clutch 2 is used (i.e., fourth-speed step or second-speed step) will be explained. However, this embodiment is applicable also to the cases of the other power-on downshifts by replacing the corresponding speed steps and clutches.

Target-value setting section 10A sets a target rotational-speed difference which is a difference between the input-side rotational speed and the output-side rotational speed of a clutch (being a controlled object), as a rotational speed target value of the clutch regarded as controlled object. The clutch regarded as controlled object is switched in response to progress stage of the shift control. At the start time of the control, target-value setting section 10A sets a first target rotational-speed difference $\Delta n1$ (also called, target rotational-speed difference 1) which is the difference between the input-side rotational speed and the output-side rotational speed of disengagement-side clutch (clutch 1 which is being used by the current speed step and is scheduled to be disengaged). Subsequently, during the shift control, target-value setting section 10A sets a second target rotational-speed difference $\Delta n2$ (also called, target rotational-speed difference 2) which is the difference between the input-side rotational speed and the output-side rotational speed of engagement-side clutch (clutch 2 which is used by the target speed step (shift-step to be attained by the execution of shift)).

In the case of power-on downshift, each of first and second target rotational-speed differences $\Delta n1$ and $\Delta n2$ is set to cause the input rotational speed of the clutch (controlled-object clutch) to be higher than the output rotational speed of the clutch by a predetermined slight amount. Namely, first target rotational-speed difference $\Delta n1$ is set so as to cause the input-side rotational speed of clutch 1 (rotational speed of input shaft 51) to become greater than the output-side rotational speed of clutch 1 (rotational speed of input-side shaft 55A) by this first target rotational-speed difference $\Delta n1$. Moreover, second target rotational-speed difference $\Delta n2$ is set so as to cause the input-side rotational speed of clutch 2 (rotational speed of input shaft 51) to become greater than the output-side rotational speed of clutch 2 (rotational speed of input-side shaft 55B) by this second target rotational-speed difference $\Delta n2$.

In the case of power-on running of vehicle, the engine speed (the input-side rotational speed of clutch) increases when slipping the clutch. Hence, by controlling the slip state of clutch, the state where the input rotational speed of clutch is greater than the output rotational speed of clutch by target rotational-speed difference $\Delta n$ (the state where the engine speed is higher than the output rotational speed of clutch) can be achieved.

Here, target-value setting section 10A sets the target rotational-speed difference for the currently-engaged clutch (i.e., in-use clutch scheduled to be released by the next shift) also at the time of a steady-state running before the execution of shift is determined (before a shift determination), on condition of the power-on running of vehicle. At this time, target-value setting section 10A uses first target rotational-speed difference $\Delta n1$ as the target rotational-speed difference. Namely at the time of power-on running, a slip according to the target rotational-speed difference is given to the clutch remaining in engaged state, even if it has not been determined to carry out the shift. Thereby, a process subsequent after starting the shift can be executed smoothly and immediately.

Total torque capacity calculating section 10B calculates a capacity of total transfer torque, for example, from a parameter value according to the engine load such as throttle opening, accelerator opening or the like. Specifically, in this control apparatus, total torque capacity calculating section 10B calculates the total torque capacity Tc for clutches by adding an input-shaft torque Tin corresponding to an open-loop control amount to a feedback correction amount (F/B correction amount Tfb). This feedback correction amount Tfb is set according to a deviation (feedback control deviation) between the target rotational-speed difference and an actual rotational-speed difference, which is used for the speed-difference feedback control (F/B control) for the clutch (being the controlled object).

For example, during the changeover phase (also called, torque phase), the rotational speed of input shaft can be kept substantially constant, by setting the total transfer-torque capacity which is transferred by respective clutches so as to cause the total transfer-torque capacity itself to correspond to the engine load, and by causing the transmission to actually transfer thus-set total transfer-torque capacity. In other words, the engine speed (i.e., the rotational speed of input shaft) rises if the total transfer-torque capacity is small relative to the engine output power. Contrary, the engine speed falls if the total transfer-torque capacity is great relative to the engine output power. Accordingly at the time of power-on, if allowing the clutch to slip by weakening its engagement from the engaged state; the total transfer-torque capacity becomes small relative to the engine output power and thereby the engine speed (rotational speed of input shaft) rises. Contrary, if strengthening the engagement (degree) of clutch from the slipping state to the firmly engaged state; the total transfer-torque capacity becomes great relative to the engine output and thereby the engine speed falls.

Distribution ratio setting section 10C sets a distribution ratio (share rate) between the disengagement-side clutch and the engagement-side clutch with respect to the total transfer-torque capacity. Here, the explanation focusing on the distribution rate for the disengagement-side clutch which is disengaged from its engaged state during the changeover phase will be given. Distribution ratio setting section 10C sets the distribution rate of transfer-torque capacity for the disengagement-side clutch (which is scheduled to be released during the changeover phase) at equal to 1 during the preparation phase of shift, so as to distribute all the total transfer-torque capacity only to the disengagement-side clutch.

In the changeover phase, distribution ratio setting section 10C sets the distribution ratio (each distribution rate) so as to gradually decrease the distribution rate for the disengagement-side clutch from 1 to 0 and gradually increase the distribution rate for the engagement-side clutch from 0 to 1. Then, in the finishing phase, distribution ratio setting section 10C sets the distribution rate for the disengagement-side clutch at equal to 0 and sets the distribution rate for the engagement-side clutch at equal to 1, so as to distribute all the total transfer-torque capacity to the engagement-side clutch. Therefore during the changeover phase, respective distribution rates (distribution ratio of transfer-torque capacity between the disengagement-side clutch and the engagement-side clutch) are set to gradually decrease the distribution rate for clutch 1 which is a clutch to be released (disengagement-side clutch) from 1 to 0, and to gradually increase the distribution rate for clutch 2 which is a clutch to be engaged (engagement-side clutch) from 0 to 1.

Individual torque capacity calculating section 10D sets respective torque capacities (individual torque capacities) of the disengagement-side clutch and the engagement-side clutch, on the basis of the total torque capacity calculated by total torque capacity calculating section 10B and the distribution ratio between the disengagement-side clutch and the engagement-side clutch (distribution rate of each clutch) set by distribution ratio setting section 10C. Namely, the individual torque capacity of disengagement-side clutch can be obtained by multiplying the total torque capacity by the distribution rate for disengagement-side clutch, and the individual torque capacity of engagement-side clutch can be obtained by multiplying the total torque capacity by the distribution rate for engagement-side clutch.

Engagement control section 10E adjusts an engagement control quantity (controlled-variable) for each of disengagement-side clutch and engagement-side clutch, on the basis of the transfer-torque capacity (individual torque capacity) calculated by individual torque capacity calculating section 10D. As the engagement controlled-variable, a hydraulic pressure that is applied to each clutch is employed. Since a correspondence relation between the individual torque capacity and the hydraulic pressure of clutch (clutch capacity—hydraulic pressure relationship) can be previously recognized and provided, each clutch can be controlled by setting the hydraulic pressure of that clutch from the individual torque capacity.

In this transmission control, at the time of steady-state running before the shift, on condition of the power-on running of vehicle; the target rotational-speed difference control is carried out for the currently-engaged clutch (to be possibly disengaged at the time of execution of next shift). Moreover at this time of steady-state running before the shift, a target rotational-speed difference control for the currently-released clutch (to be possibly engaged at the time of execution of next shift) is also carried out beforehand. This control for the currently-released clutch is carried out by dragging the released clutch, namely by causing the released clutch to follow the currently-engaged clutch to some degree.

When the start of shift is determined, the shift control (including preparation phase, inertia phase, changeover phase, and finishing phase) is started.

At the start time of shift in the preparation phase, the engagement control quantity (controlled variable) for disengagement-side clutch 1 (clutch to be released) is adjusted so as to cause the disengagement-side clutch 1 to become in slipping state and so as to cause the its input-output rotational speed difference (differential speed between the input side and the output side of disengagement-side clutch) to become first target rotational-speed difference $\Delta n1$. At this time, as a matter of course; engagement-side clutch 2 (clutch to be engaged) is made to remain in released state, and disengagement-side clutch 1 bears or occupies all of the total transfer-torque capacity of the transmission. Namely, the distribution rate of disengagement-side clutch 1 is made equal to 1. Moreover during this preparation phase, some mechanical actuations are also conducted to establish the target speed step (hereinafter also called, after-shift speed step) other than the engagement/disengagement of clutches 1 and 2. If the establishment of target speed step has not been yet completed, the rotational-speed difference of clutch 1 is held at first target rotational-speed difference $\Delta n1$ even if the rotational-speed difference of clutch 1 has reached first target rotational-speed difference $\Delta n1$.

In the inertia phase, the engagement control quantity (controlled variable) for disengagement-side clutch 1 is adjusted so as to maintain clutch 1 in the slipping state and so as to bring the input-output rotational speed difference of clutch 2 (for achieving the after-shift speed step) gradually closer to second target rotational-speed difference $\Delta n2$. Also at this time, engagement-side clutch 2 (to be used for the after-shift speed step) is made to remain in released state, and disengagement-side clutch 1 continues to bear or occupy all of the total transfer-torque capacity of the transmission. Namely, the distribution rate for disengagement-side clutch 1 is maintained equal to 1.

In the changeover phase, total torque capacity calculating section 10B calculates the total transfer-torque capacity necessary to maintain the rotational-speed difference of engagement-side clutch 2 at second target rotational-speed difference $\Delta n2$. Then, distribution ratio setting section 10C sets the distribution ratio of transfer-torque capacity between disengagement-side clutch 1 and engagement-side clutch 2, so as to make and keep the sum of the transfer-torque capacity of disengagement-side clutch 1 and the transfer-torque capacity of engagement-side clutch 2 substantially equal to the total transfer-torque capacity, and so as to gradually decrease the distribution to disengagement-side clutch 1 and gradually increase the distribution to engagement-side clutch 2. Then, individual torque capacity calculating section 10D sets each of the transfer-torque capacity of disengagement-side clutch 1 and the transfer-torque capacity of engagement-side clutch 2, in accordance with the calculated total transfer-torque capacity and the set distribution ratio. Then, engagement control section 10E adjusts each of the engagement control quantities (controlled-variables) for disengagement-side clutch 1 and engagement-side clutch 2, on the basis of the set transfer-torque capacities of disengagement-side clutch 1 and engagement-side clutch 2.

In the finishing phase; it is judged whether or not a next-time shift control will be soon carried out (judgment of pre-shift process), while causing the rotational-speed difference of engagement-side clutch 2 to remain second target rotational-speed difference $\Delta n2$. If it has been determined that the next-time shift control is scheduled to be carried out soon; it is determined that an establishment of predicted speed step (pre-shift process) is necessary, and the establishment of predicted speed step is ordered. The establishment of predicted speed step is also called "pre-shift process", and means the completion of engagement (i.e., mechanical actuation) of a power transmitting element(s) necessary to achieve the target speed step of next-time shift control (e.g., gear or clutch meshing for target gear step other than the engagement/disengagement of clutches 1 and 2). If it is determined that the next-time shift control is not scheduled to be carried out soon; the control for dragging the disengagement-side clutch 1 is carried out. During the finishing phase, the control section controls engagement-side clutch 2 so as to keep its rotational-speed difference at second target rotational-speed difference $\Delta n2$, and continues to distribute all the total transfer-torque capacity of transmission only to engagement-side clutch 2. Namely, the distribution rate for engagement-side clutch is equal to 1.

A transition from the preparation phase to the inertia phase is done under the condition where the rotational-speed difference (between the input and output) of the disengagement-side clutch (currently-engaged clutch 1) has reached the first target rotational-speed difference $\Delta n1$ and the establishment of after-shift speed step (i.e., configuration change of the gear train associated with the engagement-side clutch) has been completed. Namely, the transition from the preparation phase to the inertia phase is conducted, when the rotational-speed difference of clutch 1 has reached first target rotational-speed difference $\Delta n1$ and also the configuration change of engagement-side gear train (power transmitting elements) has finished if some mechanical actuations are needed in order to change the configuration of engagement-side gear train other than the engagement/disengagement of clutch 1 or 2. A transition from the inertia phase to the changeover phase is done, under the condition where the rotational-speed difference of clutch 2 has reached second target rotational-speed difference $\Delta n2$.

A transition from the changeover phase to the finishing phase is done, under the condition where the transfer-torque capacity of the disengagement-side clutch 1 becomes substantially equal to 0 by means of the control of the changeover phase. Namely, the transition from the changeover phase to the finishing phase is conducted when distribution ratio setting section 10C has made the transfer-torque capacity of disengagement-side clutch equal to 0 during the changeover phase. The finishing phase is ended on condition that the establishment of predicted speed step has been done, in the case where the next-time shift control will be carried out soon. On the other hand, the finishing phase is ended on condition that the control for dragging the disengagement-side clutch is being carried out and also the rotational-speed difference of engagement-side clutch is ranging within a predetermined tolerance on second target rotational-speed difference $\Delta n2$, in the case where the next-time shift control will not be carried out soon.

It is noted that target rotational-speed difference $\Delta n1$ or $\Delta n2$ also associated with the threshold value for conducting the phase transition may be set at a constant value as mentioned above, or may be set based on the engine load condition of start time of phase or start time of shift control, namely based on the engine load or an amount corresponding to engine load (such as throttle opening or engine torque). Further, target rotational-speed difference $\Delta n1$ or $\Delta n2$ may be set so as to allow target rotational-speed difference $\Delta n1$ or $\Delta n2$ to vary in accordance with the engine load condition or the input rotational speed of start time of the preparation phase. For example, target rotational-speed difference Δn1 or Δn2 may be set so as to bring target rotational-speed difference Δn1 or Δn2 greater as the engine load becomes greater, or so as to bring target rotational-speed difference Δn1 or Δn2 greater as the input rotational speed becomes higher.

<Block Diagram>

Figure 8:
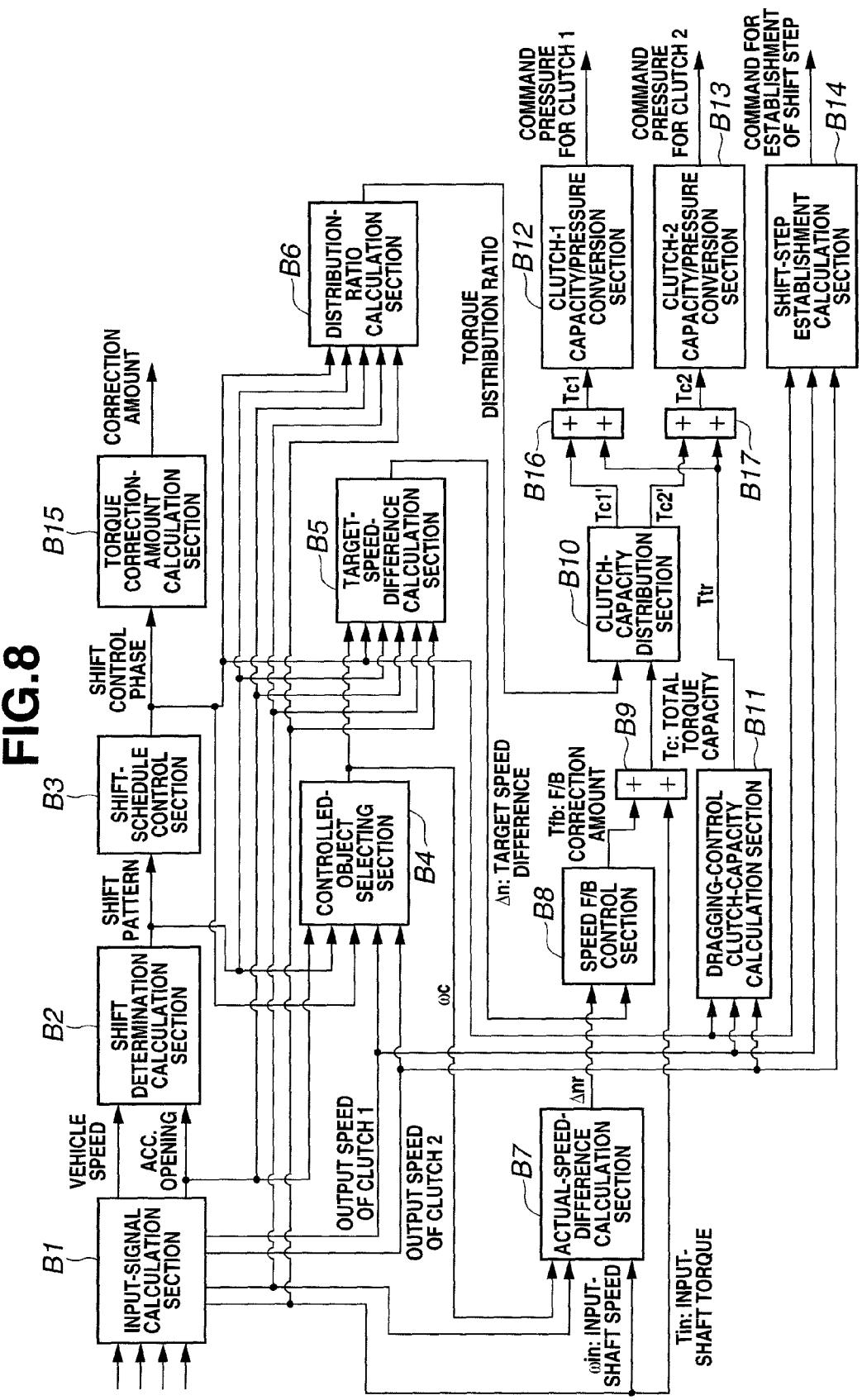
FIG. 8 is a control block diagram showing a detailed control configuration of control apparatus for a twin-clutch-type transmission according to first to third embodiments of the present invention.

Next, a concrete control-configuration of the apparatus according to this embodiment will now be explained by using a block diagram of FIG. 8. Of course, this apparatus includes functional components explained with reference to FIG. 1, as control functions. As shown in FIG. 8, this apparatus includes an input-signal calculation section B1, a shift determination calculation section B2, a shift-schedule control section B3, a controlled-object selecting section B4, a target-speed-difference calculation section B5, a distribution-ratio calculation section B6, an actual-speed-difference calculation section B7, a speed F/B control section (rotational-speed feedback control section) B8, an adding section B9, a clutch-capacity distribution section (torque-capacity distribution section) B10, a dragging-control clutch-capacity calculation section B11, a clutch-1 capacity/pressure conversion section B12, a clutch-2 capacity/pressure conversion section B13, a shift-step establishment calculation section B14, a torque correction-amount calculation section B15, and adding sections B16 and B17.

Note that shift determination calculation section B2 includes the functions of shift judgment means (section) 3A and specific-shift judgment means (power-on downshift judgment section) 3B shown in FIG. 7. Moreover, target-speed-difference calculation section B5 corresponds to target-value setting means 10A shown in FIG. 7; distribution-ratio calculation section B6 corresponds to distribution ratio setting means 10C shown in FIG. 7; adding section B9 corresponds to total torque capacity calculating means 10B shown in FIG. 7; torque-capacity distribution section B10 and adding sections B16 and B17 correspond to individual torque capacity calculating means 10D shown in FIG. 7; and clutch-1 capacity/pressure conversion section B12 and clutch-2 capacity/pressure conversion section B13 correspond to engagement control means 10E shown in FIG. 7.

At first, input-signal calculation section B1 carries out a processing for input signals. These input signals include a wheel-speed signal serving to produce the signal of vehicle speed, an accelerator opening signal serving to produce the signal of accelerator operation quantity (i.e., accelerator manipulated variable), an input-shaft signal representing the input-side rotational speed of clutch 1 or clutch 2, a first output-shaft signal representing the output-side rotational speed of clutch 1, a second output-shaft signal representing the output-side rotational speed of clutch 2, and the like. Shift determination calculation section B2 receives the vehicle-speed signal and the signal of accelerator operation quantity from input-signal calculation section B1, and produces a shift pattern by using a prescribed shift map relative to these signals (i.e., by assigning signals of vehicle-speed and accelerator operation quantity to the prescribed shift map). This shift pattern also includes no shift (non-shift condition).

Shift-schedule control section B3 monitors or checks the shift pattern, output-side rotational speed ωc of the clutch targeted for control, and the torque-capacity distribution ratio R for both clutches. By this monitoring, shift-schedule control section B3 judges a progress of the shift control, and thereby selects one phase from the preparation phase, the inertia phase, the changeover phase, and the finishing phase. Namely, shift-schedule control section B3 produces the phase for shift control. Controlled-object selecting section B4 selects the clutch targeted for control (i.e., clutch of controlled object or clutch scheduled to be controlled), in conformity with each shift control, on the basis of the shift pattern produced by shift determination calculation section B2 and the shift-control phase produced by shift-schedule control section B3. Then, controlled-object selecting section B4 calculates output-side rotational speed ωc of the control-targeted clutch, from the output rotational-speed signal of the selected clutch.

Target-speed-difference calculation section B5 calculates or produces the target rotational-speed difference Δn (Δn1 or Δn2), in conformity with each shift control, on the basis of the output-side speed ωc of control-targeted clutch and the shift-control phase produced by shift-schedule control section B3. At this time, target-speed calculation section B5 sets target rotational-speed difference Δn so as to make input-side rotational speed (input-shaft speed) ωin of control-targeted clutch greater than output-side rotational speed ωc in the case where the sign of input-shaft torque Tin is plus (i.e., positive). On the other hand, in the case where the sign of input-shaft torque Tin is minus, i.e., negative, target-speed calculation section B5 sets target rotational-speed difference Δn so as to make input-side rotational speed ωin of control-targeted clutch lower than output-side rotational speed ωc. Accordingly, under the condition of power-on, target rotational-speed difference Δn is set to allow the input-side rotational speed of control-targeted clutch to become higher than its output-side rotational speed.

Distribution-ratio calculation section B6 calculates or produces torque-capacity distribution ratio R between clutches, in conformity with each shift control, on the basis of the shift-control phase produced by shift-schedule control section B3. Actual-speed-difference calculation section B7 calculates the actual rotational-speed difference Δnr between the (output-side) rotational speed of control-targeted clutch and the input-shaft rotational speed. Note that actual-speed-difference calculation section B7 calculates actual rotational-speed difference Δnr in consideration of the sign (positive or negative) of input-shaft torque. Speed F/B control section B8 produces the feedback control quantity (i.e., controlled variable for F/B or correction amount of F/B) Tfb for the target rotational-speed difference, by using actual rotational-speed difference Δnr of the control-targeted clutch and target rotational-speed difference Δn.

Adding section B9 calculates or produces total torque capacity Tc of clutch, by adding feedback correction amount Tfb produced by speed F/B control section B8 to input-shaft torque Tin (corresponding to an open-loop-control amount). Torque-capacity distribution section B10 distributes or divides this total torque capacity Tc into respective clutches, in accordance with torque-capacity distribution ratio R produced by distribution-ratio calculation section B6. Thus-distributed torque capacities are defined as a clutch-1 capacity Tc1' and a clutch-2 capacity Tc2'.

Dragging-control clutch-capacity calculation section B11 calculates a torque capacity Ttr necessary for the control for dragging the not-driven-side clutch (substantially currently-released clutch, i.e., dragging the output shaft of not-driven-side clutch). However, dragging-control clutch-capacity calculation section B11 makes this torque capacity Ttr equal to 0 when it has been determined that the pre-shift process should be carried out. Adding section B16 calculates or produces torque capacity Tc1 of clutch 1, by adding clutch-1 capacity Tc1' calculated by torque-capacity distribution section B10 to torque capacity Ttr calculated by dragging-control clutch-capacity calculation section B11.

Adding section B17 calculates or produces torque capacity Tc2 of clutch 2, by adding clutch-2 capacity Tc2' calculated by torque-capacity distribution section B10 to torque capacity Ttr calculated by dragging-control clutch-capacity calculation section B11. Clutch-1 capacity/pressure conversion section B12 converts the clutch-1 torque capacity Tc1 to a control command pressure for clutch 1 and, clutch-2 capacity/pressure conversion section B13 converts the clutch-2 torque capacity Tc2 to a control command pressure for clutch 2. Thereby, the respective clutches are controlled.

Shift-step establishment calculation section B14 orders the establishment of speed step (shift step) in the case of the automatic transmission adapted to establish the speed step by some mechanical actuations (e.g., switching of gear-train by synchro) other than the engagement/disengagement of clutch. However, this process is omitted in the case of an automatic transmission that does not need such mechanical actuations. Torque correction-amount calculation section B15 calculates a generated inertia torque from a variation rate (differential value) of the target rotational-speed difference during the inertia phase.

<Flowchart>

The control apparatus for automatic transmission according to this embodiment has the configuration as described above. For example in this apparatus, the shift control is performed at the time of power-on downshift as shown by a flowchart of FIG. 9. In this embodiment, the power-on downshift from the condition where clutch 1 is used (i.e., fifth-speed step or third-speed step) to the condition where clutch 2 is used (i.e., fourth-speed step or second-speed step) is explained. However, this embodiment is applicable also to the cases of the other power-on downshifts by replacing the corresponding speed steps and clutches.

Figure 9:
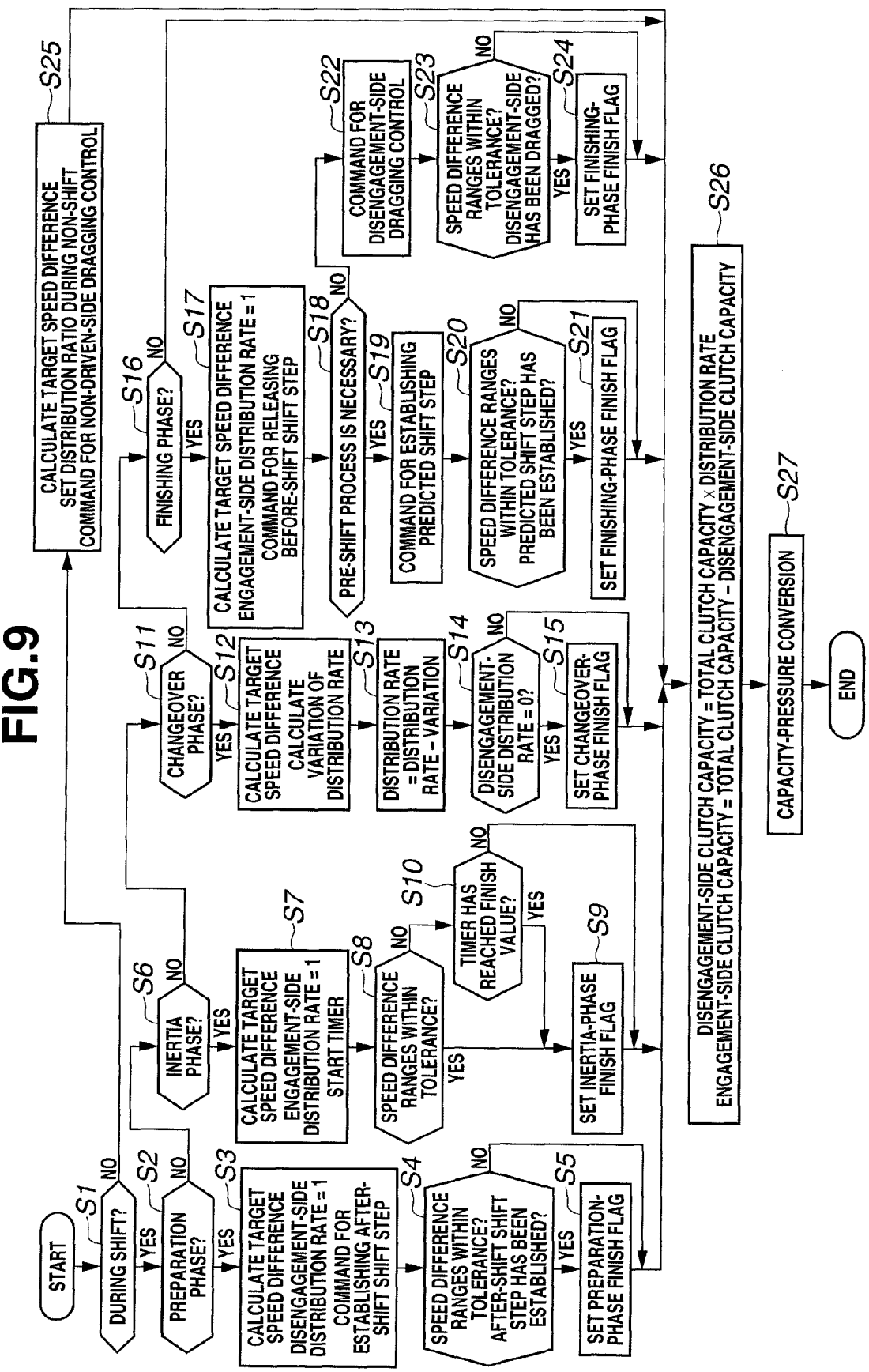
FIG. 9 is a flowchart explaining a shift control for an automatic transmission according to the first embodiment.

As shown in FIG. 9, at first at step S1, the controller (control unit) judges whether or not the vehicle is currently under shift control. If the answer of step S1 is YES, namely the shift is currently being executed; the routine proceeds to step S2. At step S2, the controller judges whether or not the shift control is currently in process of the preparation phase. At the start time of the shift, at first, the preparation phase is selected. During this preparation phase, the controller sets the target value for rotational-speed difference control at target rotational-speed difference $\Delta n1$ serving as the control-target value before shift (before-shift target rotational-speed difference), at step S3. This before-shift control-target value is set at a value bringing the speed of input side higher than the speed of output side, in the case of downshift. At the same time, the controller fixes the distribution (rate) for disengagement-side clutch 1 at equal to 1, at step S3. On the other hand, the controller fixes the distribution (rate) for engagement-side clutch 2 at equal to 0. Furthermore, the controller carries out the establishment (gear engagement) of target speed-step by the synchromesh.

Then at step S4, the controller judges whether or not the actual rotational-speed difference of disengagement-side clutch 1 has reached within a predetermined range which is in proximity to before-shift target rotational-speed difference $\Delta n1$. Since the mechanical changing actuation for the establishment of after-shift speed step by the synchro is necessary on its power-transmitting line in this embodiment; the controller also judges whether or not the establishment of after-shift speed step has been done (i.e., whether or not the engagement-side gear train has become the configuration for after-shift speed step) by means of such mechanical actuation, at step S4. Namely, this judgmental requirement is added to the requirement that the actual rotational-speed difference has already reached within the predetermined range near before-shift target rotational-speed difference $\Delta n1$, as "AND" logical requirement.

If the actual rotational-speed difference of disengagement-side clutch 1 has not yet reached before-shift target rotational-speed difference $\Delta n1$, or if the establishment of after-shift speed step has not yet been done; the controller executes each processing of the clutch-capacity calculation and the clutch command-hydraulic-pressure calculation in steps S26, and S27. Namely at step S26, the controller calculates the disengagement-side torque capacity and the engagement-side torque capacity, from the total clutch capacity and the distribution ratio calculated at this time. At step S27, the controller outputs a command obtained based on each conversion characteristic between torque capacity and hydraulic pressure, to an actuator of corresponding clutch as the command pressure for clutch.

Thus, the preparation phase continues by repeating the processing of steps S1, S2, S3, S4, S5, S26, and S27 every control period (routine-program period). Thereby, the actual rotational-speed difference is brought within the predetermined range near target rotational-speed difference $\Delta n1$, and also the after-shift speed step becomes established.

By so doing, the controller comes to determine that the actual rotational-speed difference of disengagement-side clutch is within the predetermined range near target rotational-speed difference $\Delta n1$ and also determine that the after-shift speed step has been established, at step S4. In this case, the controller finishes the preparation phase, and sets a preparation-phase finish flag to set the transition to inertia phase, at step S5. Thereby, during next control period; the controller determines that the preparation phase is not currently in process at step S2, and determines that the inertia phase is in process at step S6 by judging whether or not the shift control is currently in process of inertia phase. Thereby, the shift control becomes under the inertia phase.

In the inertia phase, at step S7, the controller changes the target value for rotational-speed difference control from that of clutch 1 to that of clutch 2 (scheduled to be engaged), and sets the control-target value at target rotational-speed difference $\Delta n2$. At the same time, the controller sets the distribution rate of disengagement-side clutch 1 at equal to 1. On the other hand, the controller sets the distribution rate of engagement-side clutch 2 at equal to 0. Moreover, the controller starts a timer for measuring an elapsed time of inertia phase. Subsequently at step S8, the controller judges whether or not the current actual rotational-speed difference has reached within a predetermined range which is in proximity to target rotational-speed difference $\Delta n2$, by comparing the actual rotational-speed difference of engagement-side clutch 2 with target rotational-speed difference $\Delta n2$ (specifically, by comparing the current actual rotational-speed difference with a threshold value(s)).

If the actual rotational-speed difference has not yet become within the predetermined range near target rotational-speed difference $\Delta n2$; the controller judges whether or not the timer started at the beginning of inertia phase has indicated a finish value (a predetermined elapsed time) at step S10. Note that the finish value (predetermined elapsed time) for the timer is set based on a time period normally necessary to bring the actual rotational-speed difference within the predetermined range near target rotational-speed difference $\Delta n2$. In other words, the finish value (predetermined elapsed time) for the timer is a predetermined value which is determined from at least one of the engine load or its corresponding amount (e.g., throttle opening), the input torque to transmission or its corresponding amount, the input-shaft speed or input-shaft speed of control-targeted object, and the transmission ratio, which are respectively obtained at that time. By carrying out the time setting (time restriction) suitable for shift condition as mentioned above, the balance between the restriction of elapsed time of inertia phase (preventing the inertia phase from consuming an excessive time) and an improvement of engagement shock of clutch can be properly achieved.

If the timer has not yet reached the finish value, the controller calculates the final disengagement-side engagement capacity and the final engagement-side engagement capacity at step S26. Then, the controller converts these capacities into the command hydraulic-pressure for disengagement-side clutch and the command hydraulic-pressure for engagement-side clutch at step S27, and outputs these commands to the actuators.

By repeating the control period (i.e., program routine) during the inertia phase; the actual rotational-speed difference comes to reach (the tolerance of) target rotational-speed difference $\Delta n2$, or the timer indicates the finish value (predetermined elapsed time). The program proceeds from step S8 to step S9, or proceeds from step S10 to step S9. At step S9, the controller finishes the inertia phase, and sets an inertia-phase finish flag to set the transition to changeover phase.

Thereby, during next control period; the controller determines that the inertia phase is not currently in process at step S6 through steps S1 and S2. Then, the program proceeds to step S11, and the controller determines that the changeover phase is in process at step S11 by judging whether or not the shift control is currently in process of changeover phase. Accordingly, the shift control becomes under the changeover phase. In the changeover phase, at step S12, the controller maintains the target value for speed difference control at target rotational-speed difference $\Delta n2$. At the same time, the controller sets a distribution-rate changing amount (amount per one control period (routine)) according to a predetermined changing speed (changing rate), so as to gradually decrease the distribution for disengagement-side clutch 1, and gradually increase the distribution for engagement-side clutch 2 at the predetermined changing speed, at step S12. Subsequently at step S13, the controller sets the distribution rate for disengagement-side clutch 1 by subtracting the distribution-rate changing amount from the previous (last-time) distribution rate for clutch 1, and sets the distribution rate for engagement-side clutch 2 by adding the distribution-rate changing amount to its previous distribution rate. Then, at step S14, the controller judges whether or not the distribution rate of disengagement-side clutch 1 is equal to 0.

The processing of above-mentioned steps S26 and S27 is carried out on the basis of the set distribution ratio (rates) also in this changeover phase, since the distribution rate for disengagement-side clutch 1 does not reach equal to 0 for a while from the start time of changeover phase. Namely, the controller respectively calculates the final disengagement-side engagement capacity and the final engagement-side engagement capacity at step S26. Then, the controller converts these capacities into the command hydraulic-pressure for disengagement-side clutch and the command hydraulic-pressure for engagement-side clutch at step S27, and outputs these commands to the actuators.

By repeating such processing of the changeover phase, the distribution rate of disengagement-side clutch 1 gradually decreases at step S13. Accordingly, it comes to be determined that the distribution rate of disengagement-side clutch 1 is equal to 0, at step S14. At this time, the controller finishes the changeover phase at step S15. At step S15, the controller sets a changeover-phase finish flag to set the transition to the finishing phase.

Thereby, during next control period; the controller determines that the changeover phase is not in process at step S11 subsequent to steps S1, S2, and S6. Then, the controller determines that the finishing phase is in process at step S16 by judging whether or not the shift control is currently in process of the finishing phase. Accordingly, the shift control becomes under the finishing phase. In the finishing phase, the controller maintains the target rotational-speed difference for engagement-side clutch at target rotational-speed difference $\Delta n2$, at step S17. At the same time, the controller fixes the distribution rate for disengagement-side clutch at equal to 0, and fixes the distribution rate for engagement-side clutch at equal to 1. Moreover, the controller carries out the release of before-shift speed step (release of gear engagement and the like). Then at step S18, the controller judges whether or not the pre-shift process is necessary, namely whether or not the next shift control will be conducted in a short time. The controller determines that the pre-shift process is necessary if the next shift control will be conducted in the short time, and determines that the pre-shift process is not necessary if the next shift control will not be conducted in the short time If it is determined that the pre-shift process is necessary, the controller orders or performs the establishment of predicted speed step at step S19. Subsequently at step S20, the controller judges whether or not the rotational-speed difference of engagement-side clutch is within the predetermined range (tolerance) and also the predicted speed step has been already established. If at least one of these two is not satisfied, the finishing phase continues. On the other hand, if the rotational-speed difference of engagement-side clutch is within the predetermined range and also the predicted speed step has been already established, the shift is terminated by setting a finishing-phase finish flag at step S21.

On the other hand, if it is determined that the pre-shift process is not necessary at step S18, the controller orders or carries out the disengagement-side(-shaft) dragging control at step S22. Subsequently at step S23, the controller judges whether or not the rotational-speed difference of engagement-side clutch is within the predetermined range and also the disengagement-side-shaft dragging control has been already performed. If at least one of these two is not satisfied, the finishing phase continues. On the other hand, if it is determined that the rotational-speed difference of engagement-side clutch is within the predetermined range and also the disengagement-side-shaft dragging control has been already performed (is being performed), the shift is terminated by setting the finishing-phase finish flag at step S24.

Also during this finishing phase, the controller respectively calculates the final disengagement-side engagement capacity and the final engagement-side engagement capacity at step S26. Then, the controller converts these capacities into the command hydraulic-pressure for disengagement-side clutch and the command hydraulic-pressure for engagement-side clutch at step S27, and outputs these commands to the actuators.

When the finishing-phase finish flag is set (ON) at step S21 or S24, the shift is terminated. Thereby, during next control period; the controller determines that the vehicle is not currently under shift control (i.e., the vehicle is under the steady-state running) at step S1, and calculates the target rotational-speed difference, sets the distribution ratio proper to the time of non-shift, and carries out the dragging control for non-driven shaft at step S25.

By repeating the processing routine described above every predetermined control period (routine-program period), the shift control according to the first embodiment is performed.

<Time Chart in the Case of Power-On Downshift>

The shift control according to this embodiment will now be explained in the case of power-on downshift (i.e., downshift conducted because of increase of vehicle speed when depressing the accelerator pedal), with reference to time charts of FIGS. 10 and 11. Concrete examples of this embodiment are as follows.

(Case Where no Pre-Shift Process is Executed)

Figure 10:
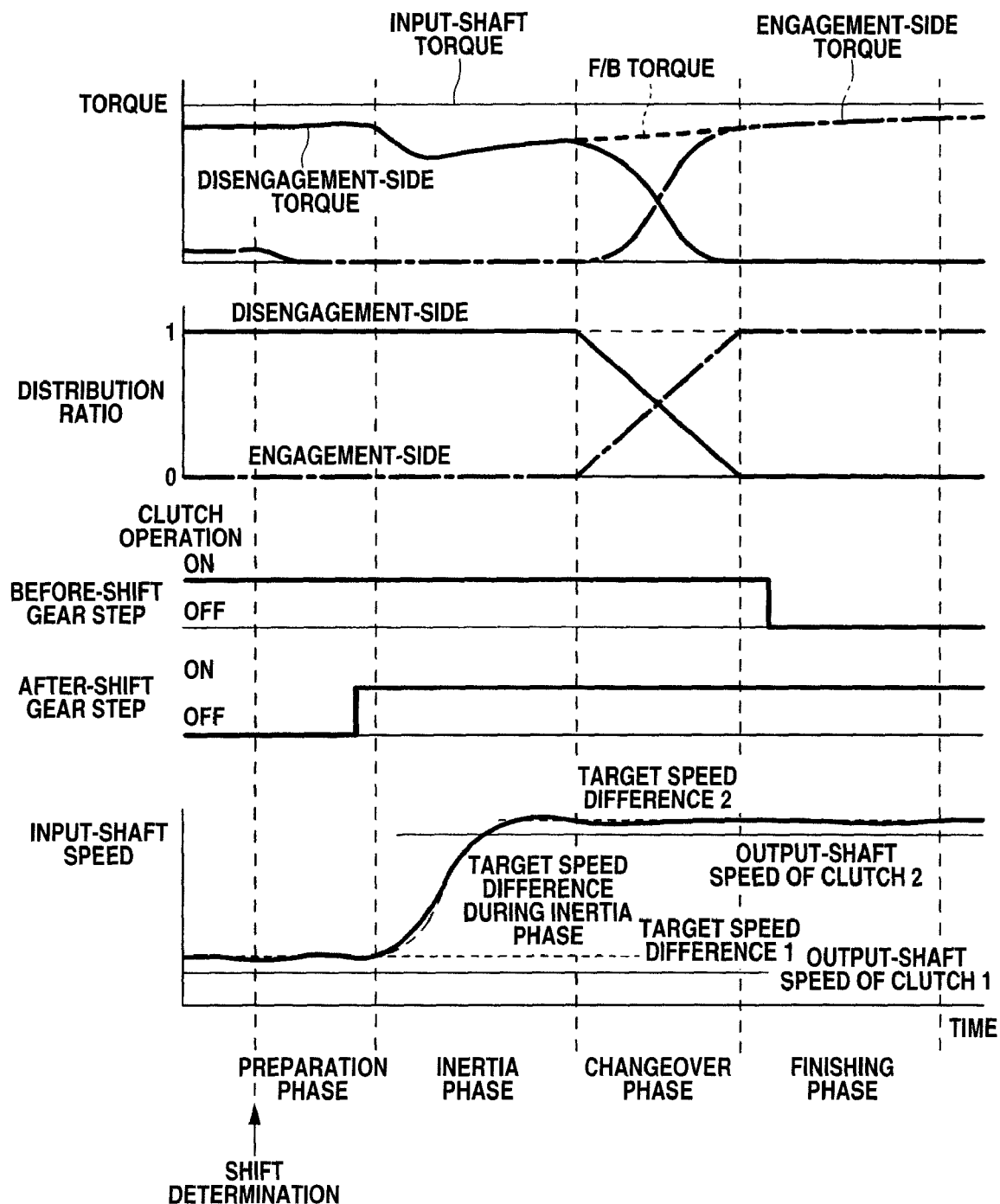
FIG. 10 is a time chart explaining one example of the shift control according to the first embodiment.

FIG. 10 is a time chart of shift control in the case where it is determined that the pre-shift process (pre-shift operation) is not necessary during the finishing phase. At first, in the preparation phase, the controller sets target rotational-speed difference 1 (first target rotational-speed difference $\Delta n1$), and controls clutch 1 (disengagement-side clutch) so as to cause the actual rotational-speed difference of clutch 1 (regarded as controlled object) to follow target rotational-speed difference 1. At the same time, the after-shift speed step is established.

Next in the inertia phase; the controller switches the target value (controlled object) of speed difference control from clutch 1 to clutch 2, and calculates a trail of target rotational-speed difference between a current rotational-speed difference of clutch 2 and after-shift target rotational-speed difference 2 (second target rotational-speed difference $\Delta n2$). Then, the current rotational-speed difference is made to follow or track the trail of target rotational-speed difference.

Next in the changeover phase; the controller carries out the control of torque distribution ratio while maintaining the speed difference control of inertia phase. Thereby, the controller engages clutch 2 which is in released state while releasing clutch 1 which is in engaged state.

Next in the finishing phase; the controller sets target rotational-speed difference 2, and controls clutch 2 so as to cause the actual rotational-speed difference of clutch 2 to follow target rotational-speed difference 2. At this time, in the case of automatic transmission that needs the configuration change of gear train which is conducted, e.g., by synchro; the controller releases the before-shift speed step and carries out the control for dragging the disengagement-side shaft (output-side shaft of clutch 1) by giving the predetermined amount of torque to clutch 1.

(Case Where the Pre-Shift Process is Executed)

Figure 11:
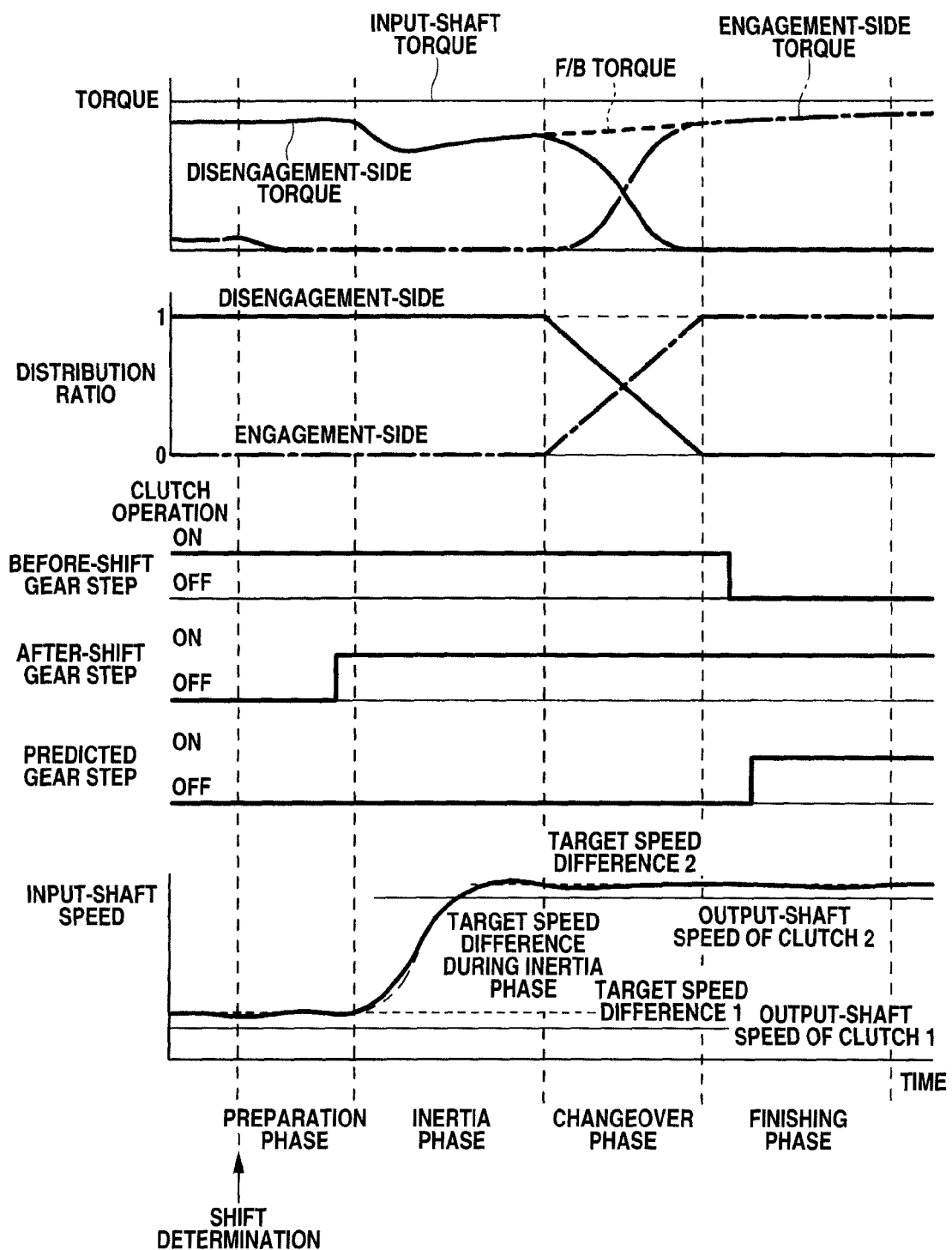
FIG. 11 is a time chart explaining the other example of the shift control according to the first embodiment.

FIG. 11 is a time chart of shift control in the case where it is determined that the pre-shift process is necessary during the finishing phase. Accordingly, this example shown in FIG. 11 is similar as the example shown in FIG. 10 except the finishing phase. In the finishing phase of this example, the controller sets target rotational-speed difference 2 for clutch 2, and controls clutch 2 so as to cause the actual rotational-speed difference of clutch 2 to follow target rotational-speed difference 2. At this time, in the case of automatic transmission that needs the configuration change of gear train which is conducted e.g., by synchro; the controller releases the before-shift speed step and sets up the predicted speed step.

According to the transmission control of this embodiment as described above, when the power-on downshift of vehicle is performed; the total torque capacity is calculated as the sum of the input toque to transmission and the correction value calculated from the deviation of feedback control between the target rotational-speed difference and the actual rotational-speed difference. Hence, the total torque capacity can be set properly with a simple logic, and a smooth power-on downshift can be carried out.

Moreover in respective phases, the rotational speed of clutch(es) is controlled while focusing on the distribution condition of transfer torque. Namely, the changeover control according to the first embodiment is separated into the control focused on torque and the control focused on rotational speed. Then finally, a single control quantity (single controlled variable) such as command-pressure can be outputted. Therefore, the smooth changeover motion can be achieved with a simple control logic.

Moreover, a disengaging timing of disengagement-side clutch and an engaging timing of engagement-side clutch can completely coincide (can be synchronized) with each other. Namely, the timing for changing the state of clutch 1 (which has been used for power transfer at the time of before-shift speed step) from engaged state to released state can be synchronized with the timing for changing the state of clutch 2 (which is scheduled to be used for power transfer at the time of after-shift speed step) from released state to engaged state, during the changeover phase. Accordingly in this embodiment, a stable shift control can be achieved more smoothly and with a little shock.

Moreover, under the power-on running of vehicle, the rotational-speed difference of clutch 1 which is being used for power transfer before the start of shift is controlled (and the rotational-speed difference of clutch 2 is controlled after the shift). Hence, the transition to the start of changeover control becomes smooth. When controlling the rotational-speed difference of clutch 1 before the start of shift, the output shaft of clutch 2 which is in released state and is not being used for power transfer is dragged by the input shaft of clutch 2. Thereby, the variation of rotational speed which is provided after the start of shift can be made smaller in advance. Accordingly, a time period necessary for the shift can be shortened and a durability of released-state clutch can be improved.

Second Embodiment

Figure 12:
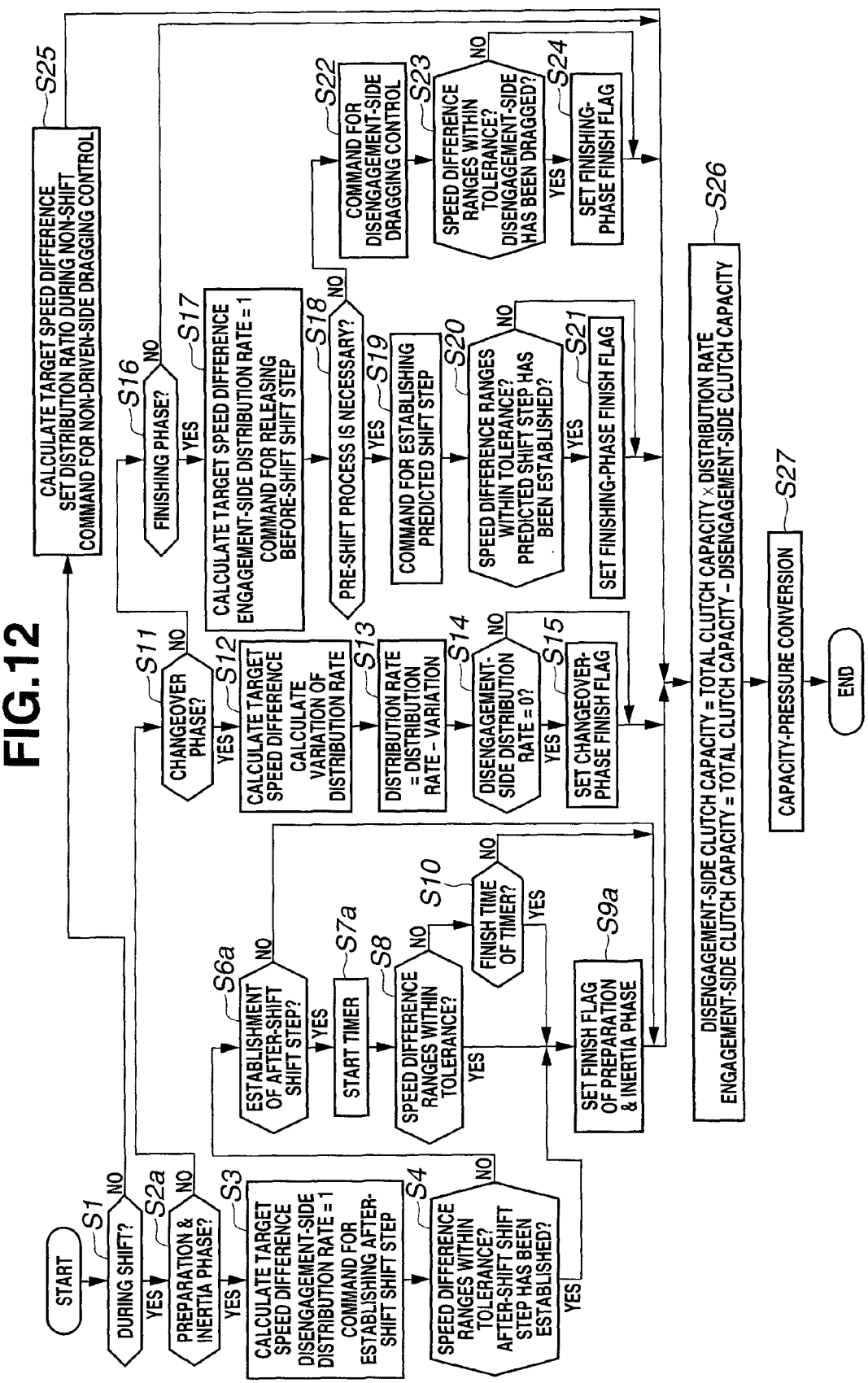
FIG. 12 is a flowchart explaining a shift control for an automatic transmission according to the second embodiment.
Figure 13:
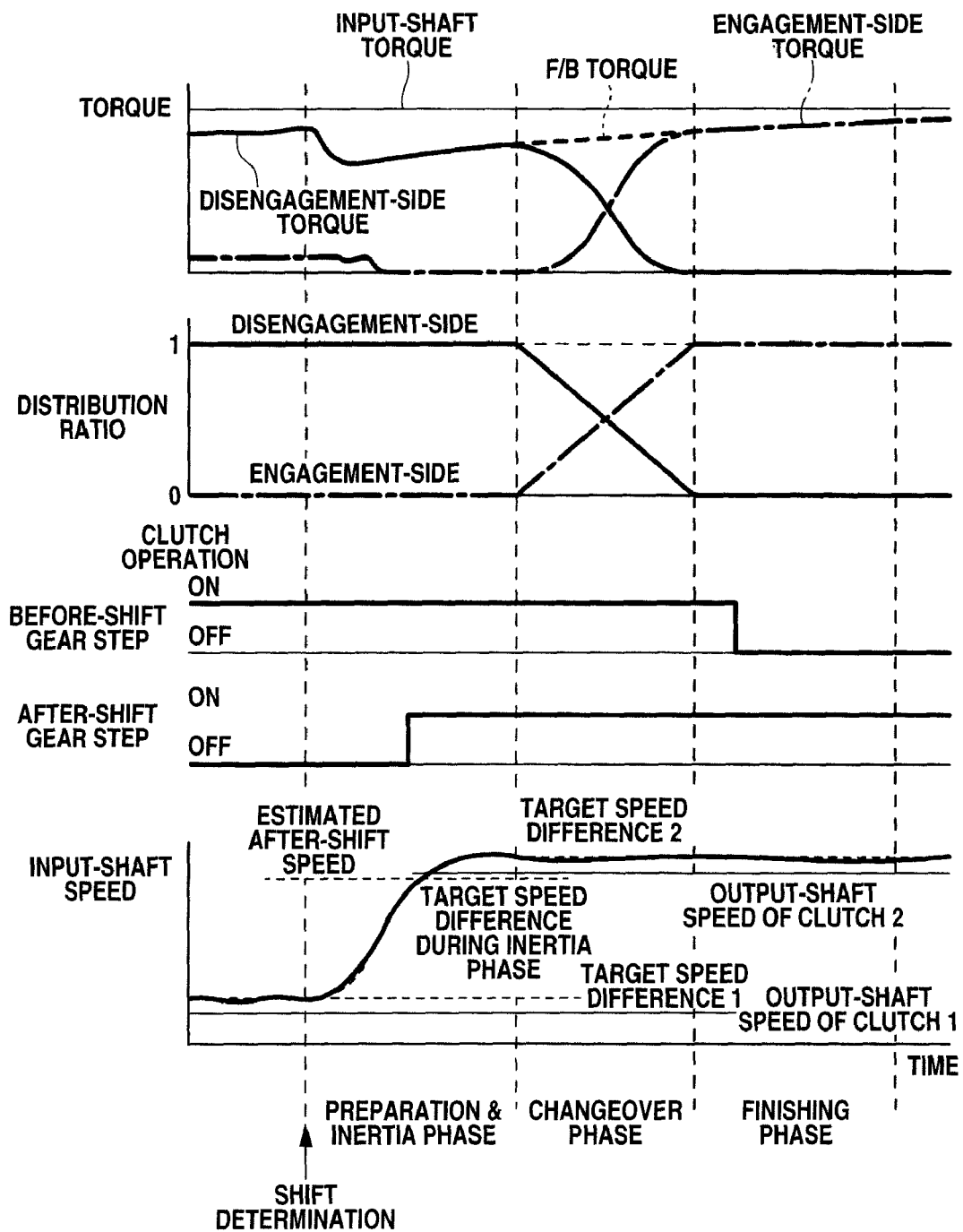
FIG. 13 is a time chart explaining one example of the shift control according to the second embodiment.
Figure 14:
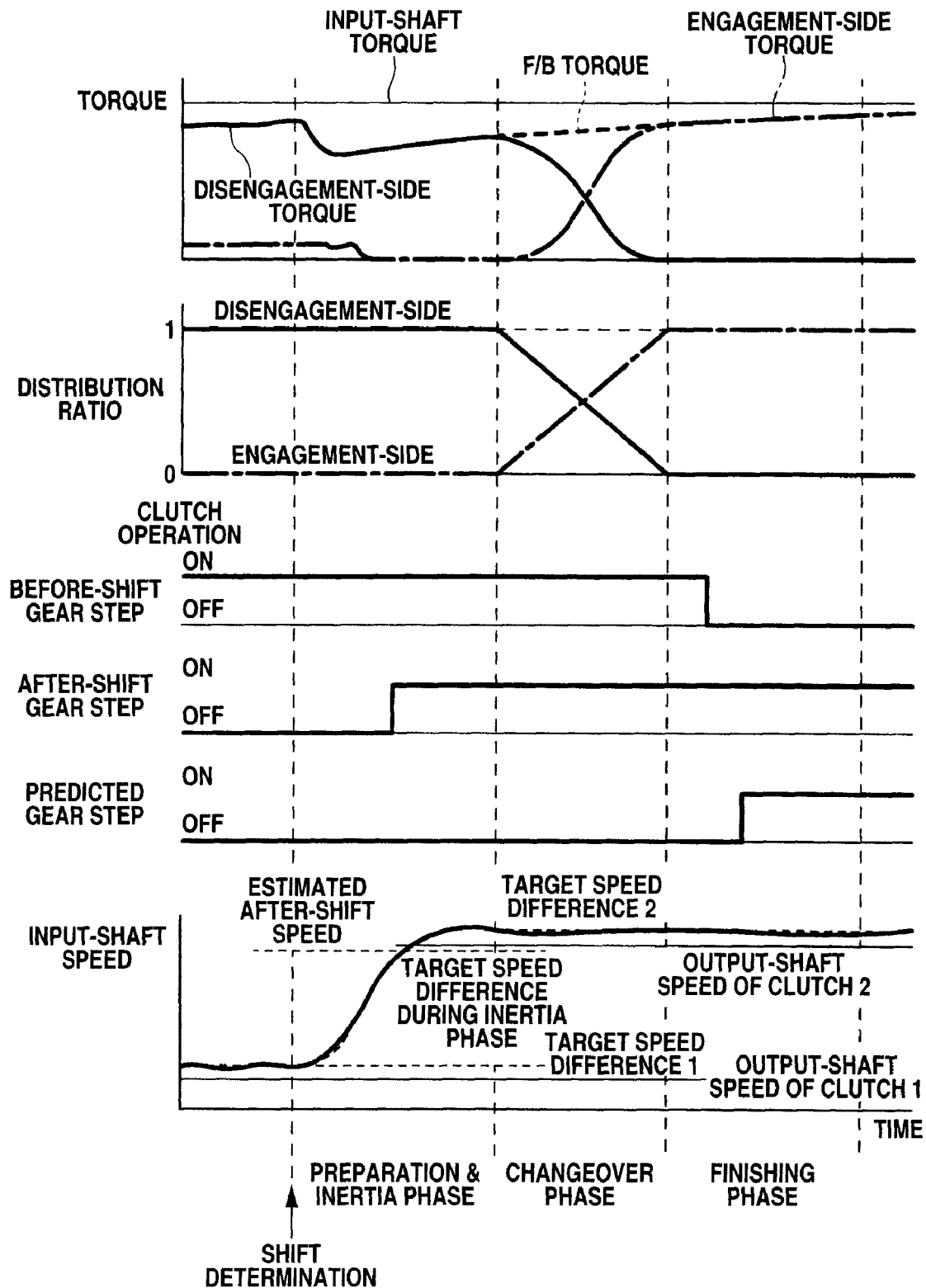
FIG. 14 is a time chart explaining the other example of the shift control according to the second embodiment.

FIGS. 12 to 14 show control apparatus and method for a twin-clutch-type transmission according to a second embodiment of the present invention. In this second embodiment, the preparation phase and the inertia phase of first embodiment are combined as a preparation-and-inertia phase in which the preparation phase and the inertia phase of first embodiment proceed concurrently. The functional elements associated with the control of second embodiment are similar as that of the first embodiment shown by the block diagram of FIG. 8, and hence the explanations thereof will be omitted from the following description.

FIG. 12 shows a flowchart according to the second embodiment. In FIG. 12, each step having the same reference mark as that of FIG. 9 is conducted in the similar manner as the example of FIG. 9, and hence the explanation thereof will be omitted. Mainly, the features different from the first embodiment will now be explained. As shown in FIG. 12, at step S1, the controller judges whether or not the vehicle is currently during the shift. If the answer of step S1 is YES, namely the shift is currently being executed; the routine proceeds to step S2a. At step S2a, the controller judges whether or not the shift control is currently in process of the preparation-and-inertia phase. If it is determined that the preparation-and-inertia phase is in process; the controller calculates the target rotational-speed difference for disengagement-side clutch 1, sets the distribution rate for clutch 1 at equal to 1, and orders the establishment of after-shift speed step, at step S3. At step S4, the controller judges whether or not the rotational-speed difference of clutch 1 has become within the predetermined range (threshold values) and the after-shift speed step has been already established. If these criteria are satisfied, the controller sets a finish flag of preparation-and-inertia phase to ON at step S9a. Then, the changeover phase starts.

If it is determined that the criteria are not satisfied at step S4, the controller judges whether or not the after-shift speed step has been established at step S6a. There is a case where only the establishment of after-shift speed step has been attained even if the two criteria of step S4 are not satisfied. In this case, the controller sets a timer at step S7a. Further, the controller judges whether or not the rotational-speed difference is within the predetermined range (or smaller than the threshold value) at step S8. If YES at step S8, the controller sets the finish flag of preparation-and-inertia phase at step S9a. Then, the changeover phase starts.

On the other hand, if it is determined that the rotational-speed difference is not within the predetermined range at step S8, the controller judges whether or not the timer has reached a finish time at step S10. If it is determined that the timer has reached the finish time, the controller sets the finish flag of preparation-and-inertia phase at step S9a. Then, the changeover phase starts. The other steps are similar as the first embodiment.

<Time Chart in the Case of Power-On Downshift>

The shift control according to this embodiment will now be explained in the case of power-on downshift (i.e., downshift conducted because of increase of vehicle speed when depressing the accelerator pedal), with reference to time charts of FIGS. 13 and 14. Concrete examples of this embodiment are as follows.

(Case Where No Pre-Shift Process is Executed)

FIG. 13 is a time chart of shift control in the case where it is determined that the pre-shift process (pre-shift operation) is not necessary during the finishing phase. As shown in FIG. 13, in the preparation-and-inertia phase, the controller switches the controlled object for speed difference control from clutch 1 to clutch 2, estimates an after-shift rotational speed of input shaft, and calculates a trail of target rotational-speed difference between a current rotational speed of input shaft and the estimated after-shift rotational speed. Then, the actual rotational-speed difference of clutch 2 is made to follow or track this trail of target rotational-speed difference. At the same time, the controller establishes the after-shift speed step. At this time by controlling the engagement-side clutch, the engagement-side shaft (shaft of engagement-side clutch) is dragged. Thereby, when the rotational speed of engagement-side shaft has reached in proximity to an estimated value of rotational speed of engagement-side shaft which will be attained after the establishment of after-shift speed step, the controller establishes the after-shift speed step. Therefore, the burden of the mechanical actuation such as synchro is reduced.

Next in the changeover phase, the controller carries out the torque distribution-ratio control while maintaining the rotational-speed difference control. Thereby, the engaged(-state) clutch 1 is released while the released clutch 2 is engaged. The later controls of this embodiment are similar as the time chart in FIG. 10 of the first embodiment, and hence the explanations thereof are omitted.

(Case Where Pre-Shift Process is Executed)

FIG. 14 is a time chart of shift control in the case where it is determined that the pre-shift process is necessary during the finishing phase. An example shown in FIG. 14 is similar as the example shown in FIG. 13 except the finishing phase. In the finishing phase of this example, the controller sets target rotational-speed difference 2 for clutch 2 and controls (hydraulic pressure of) clutch 2 to cause the actual rotational-speed difference of clutch 2 to follow target rotational-speed difference 2. At this time, in the case of automatic transmission that needs the configuration change of gear train which is conducted, e.g., by synchro; the controller releases the before-shift speed step and sets up the predicted speed step.

Thus, the shift control according to this embodiment has advantages similar as the first embodiment. Furthermore, the time period necessary for the shift can be shortened to a larger degree, since the preparation phase and the inertia phase are executed concurrently.

Third Embodiment

Figure 15:
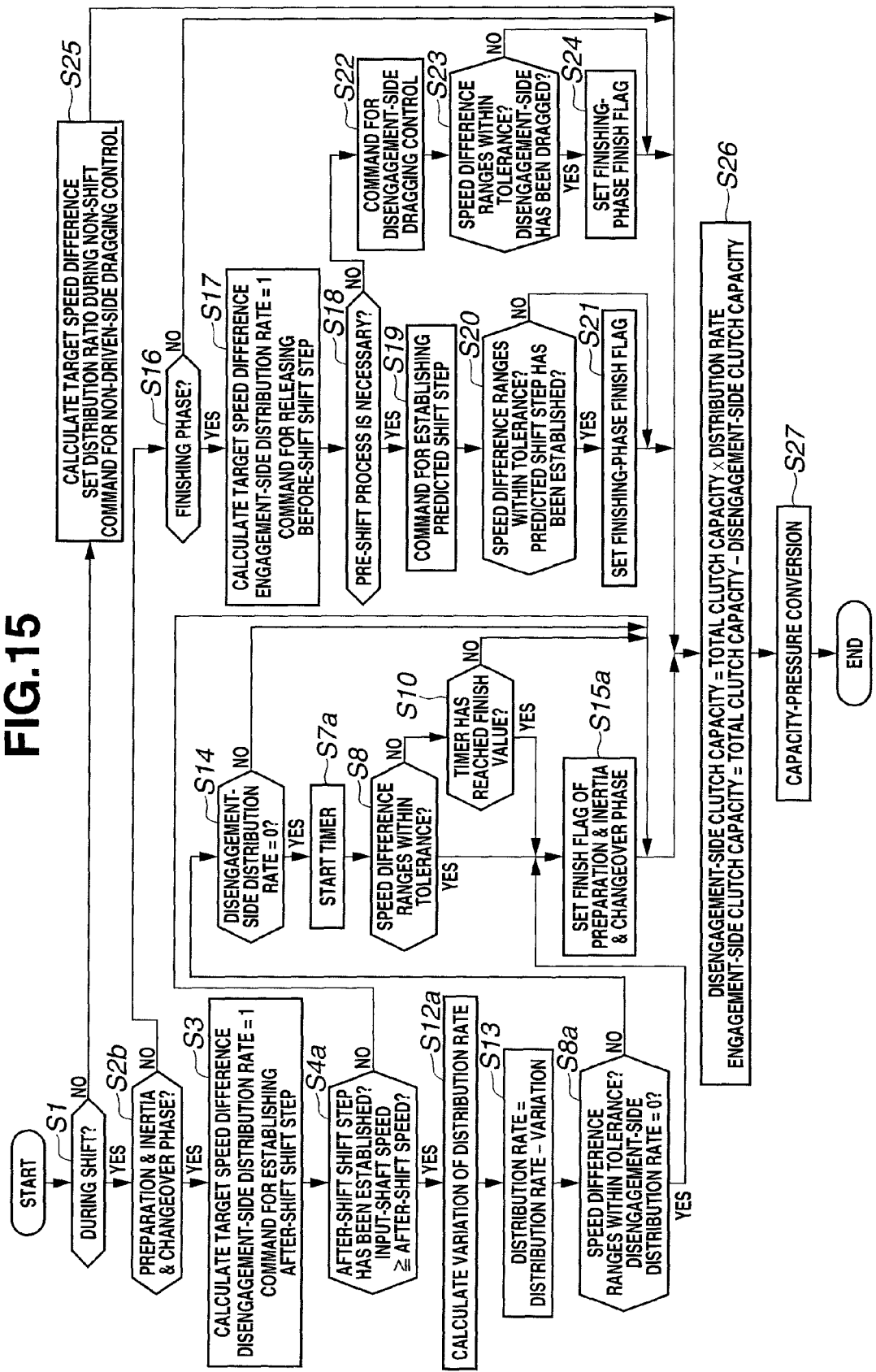
FIG. 15 is a flowchart explaining a shift control for an automatic transmission according to the third embodiment.
Figure 16:
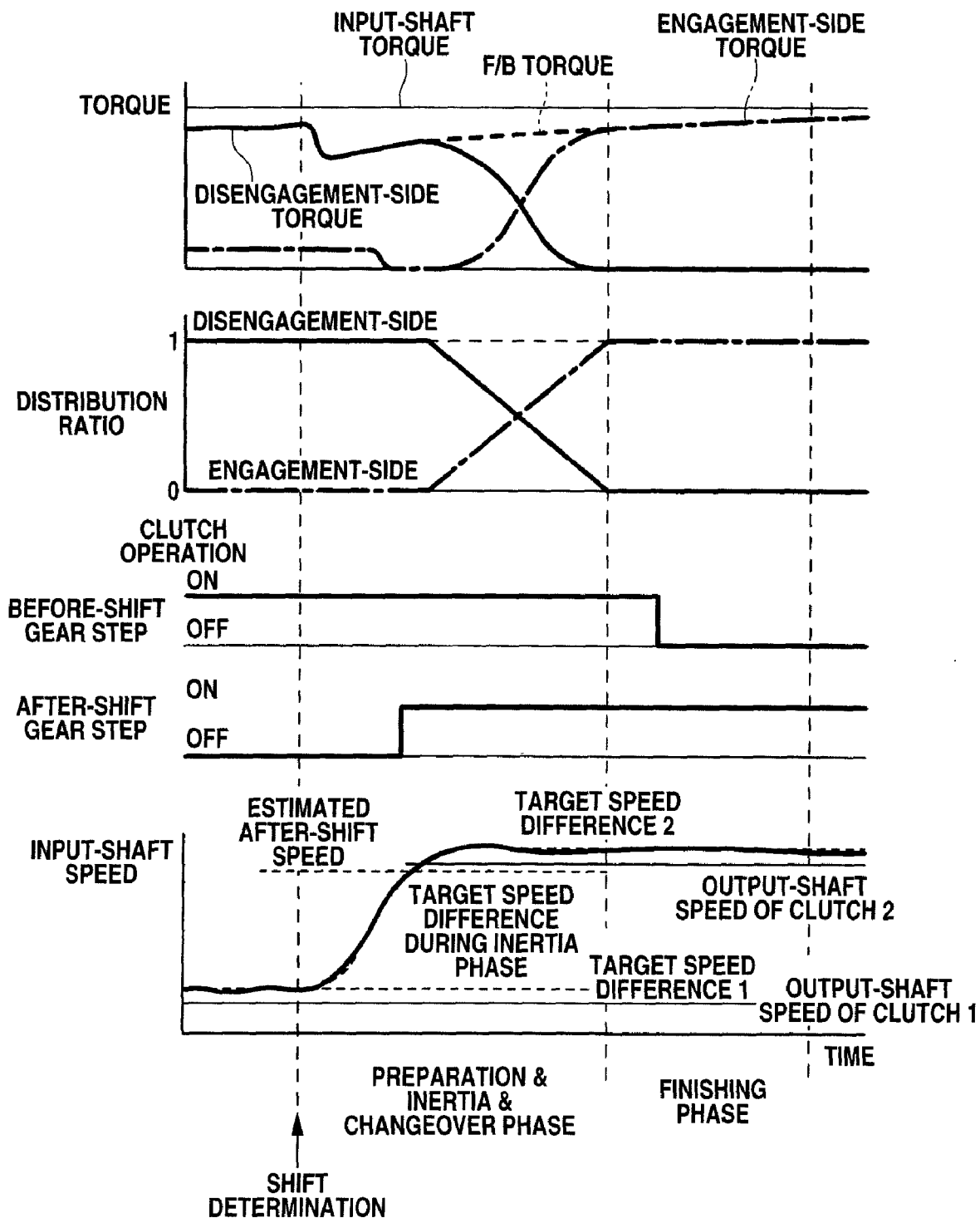
FIG. 16 is a time chart explaining one example of the shift control according to the third embodiment.
Figure 17:
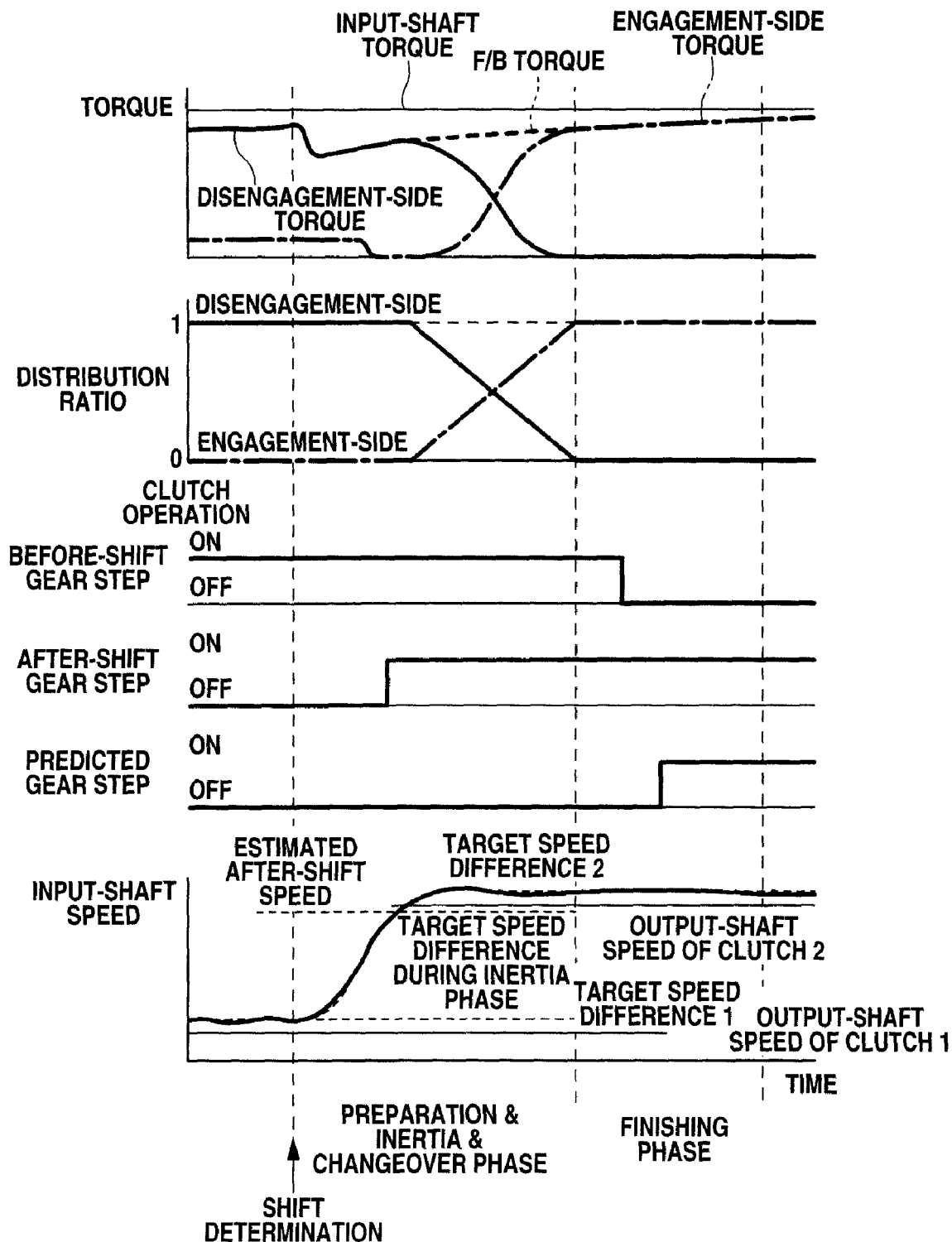
FIG. 17 is a time chart explaining the other example of the shift control according to the third embodiment.

FIGS. 15 to 17 show control apparatus and method for a twin-clutch-type transmission according to a third embodiment of the present invention. In this third embodiment, the preparation phase, the inertia phase, and the changeover phase of the first embodiment are combined as a preparation-and-inertia-and-changeover phase in which the preparation phase, the inertia phase, and the changeover phase of the first embodiment proceed concurrently. The functional elements associated with the control of third embodiment are similar as that of the first embodiment shown by the block diagram of FIG. 8, and hence the explanations thereof will be omitted from the following description.

FIG. 15 shows a flowchart according to the third embodiment. In FIG. 15, each step having the same reference mark as that of FIG. 9 is conducted in the similar manner as the example of FIG. 9, and hence the explanation thereof will be omitted. Mainly, the features different from the first embodiment will now be explained. As shown in FIG. 15, at step S1, the controller judges whether or not the vehicle is currently during the shift. If the answer of step S1 is YES, namely the shift is currently being executed; the routine proceeds to step S2b. At step S2b, the controller judges whether or not the shift control is currently in process of the preparation-and-inertia-and-changeover phase. If it is determined that the preparation-and-inertia-and-changeover phase is in process; the controller calculates the target rotational-speed difference for clutch 1, sets the distribution rate for clutch 1 at equal to 1, and orders the establishment of after-shift speed step, at step S3.

At step S4a, the controller judges whether or not the rotational speed of input shaft has become greater than the estimated after-shift rotational speed and also the after-shift speed step has been already established. If these criteria are satisfied, the controller sets the distribution-rate changing amount (amount per one control period (routine)) according to a predetermined changing speed, so as to gradually decrease the distribution rate for disengagement-side clutch 1, and gradually increase the distribution rate for engagement-side clutch 2 at the predetermined changing speed, at step S12a. Moreover at step S13, the controller sets the distribution rate for disengagement-side clutch 1 by subtracting the distribution-rate changing amount from the previous distribution rate for clutch 1, and sets the distribution rate for engagement-side clutch 2 by adding the distribution-rate changing amount to its previous distribution rate.

At step S8a, the controller judges whether or not the rotational-speed difference has reached within the predetermined range, and also the distribution rate for disengagement-side clutch is equal to 0 (namely, whether or not the transition of distribution ratio has finished). If these criteria are satisfied, the controller sets a finish flag of preparation-and-inertia-and-changeover phase to ON at step S15a. Then, the finishing phase starts. On the other hand, if the criteria are not satisfied at step S8a, the controller judges whether or not the distribution rate of disengagement-side clutch is equal to 0 at step S14. There is a case where the distribution rate of disengagement-side clutch has become equal to 0 even if the criteria of step S8a are not satisfied. In this case, the controller sets a timer at step S7a. Further, the controller judges whether or not the rotational-speed difference is within the predetermined range (or, whether or not the rotational-speed difference has reached the threshold value) at step S8. If YES at step S8, the controller sets the finish flag of preparation-and-inertia-and-changeover phase at step S15a. Then, the finishing phase starts.

On the other hand, if NO at step S8, the controller judges whether or not the timer has reached a finish time at step S10. If it is determined that the timer has reached the finish time, the controller sets the finish flag of preparation-and-inertia-and-changeover phase to ON at step S15a. Then, the finishing phase starts. The other steps are similar as the first embodiment.

<Time Chart in the Case of Power-On Downshift>

The shift control according to this embodiment will now be explained in the case of power-on downshift, with reference to time charts of FIGS. 16 and 17. Concrete examples of this embodiment are as follows.

(Case Where No Pre-Shift Process is Executed)

FIG. 16 is a time chart of shift control in the case where it is determined that the pre-shift process is not necessary during the finishing phase. As shown in FIG. 16, in the preparation-and-inertia-and-changeover phase, the controller switches the controlled object for speed difference control from clutch 1 to clutch 2, estimates an after-shift rotational speed of input shaft, and calculates a trail of target rotational-speed difference between a current rotational speed of input shaft and the estimated after-shift rotational speed. Then, the controller causes the actual rotational-speed difference of clutch 2 to follow or track this trail of target rotational-speed difference (by controlling hydraulic pressures of clutches 1 and 2). At the same time, by braking (slightly engaging) clutch 2, the engagement-side shaft (shaft 55B connected with clutch2) is dragged. Thereby, when the rotational speed of this engagement-side shaft has reached in proximity to an estimated value of rotational speed of engagement-side shaft which will be attained after the establishment of after-shift speed step, the controller establishes the after-shift speed step. Therefore, the burden of the mechanical actuation such as synchro is reduced.

Then, if the controller determines that the establishment of after-shift speed step is completed and also the rotational speed of input shaft is greater than the rotational speed of output shaft of clutch 2 (the speed of after-shift speed step), the controller carries out the torque distribution-ratio control. Thereby, the engaged clutch 1 is released while the released clutch 2 is engaged. The later controls of this embodiment are similar as the time chart in FIG. 10 of the first embodiment, and hence the explanations thereof are omitted.

(Case Where Pre-Shift Process is executed)

FIG. 17 is a time chart of shift control in the case where it is determined that the pre-shift process is necessary during the finishing phase. An example shown in FIG. 17 is similar as the example shown in FIG. 16 except the finishing phase. In the finishing phase of this example, the controller sets target rotational-speed difference 2 for clutch 2 and controls (hydraulic pressure of) clutch 2 to cause the actual rotational-speed difference of clutch 2 to follow target rotational-speed difference 2. At this time, in the case of automatic transmission that needs the configuration change of gear train which is conducted, e.g., by synchro; the controller releases the before-shift speed step and sets up the predicted speed step.

Thus, the shift control according to this embodiment has advantages similar as the first embodiment. Furthermore, the time period necessary for the shift can be shortened to a larger degree, since the preparation phase, the inertia phase, and the changeover phase are executed concurrently.

Fourth Embodiment

In a fourth embodiment and the following fifth and sixth embodiments according to the present invention, the rotational-speed difference control of clutch is replaced by a rotational speed control of input shaft. Namely, the rotational-speed difference control of clutch is a control for controlling the difference between the input rotational speed and the output rotational speed of clutch. This input rotational speed of clutch corresponds to the speed of input-shaft, and the output rotational speed of clutch corresponds to the vehicle speed through its transmission ratio (gear ratio related to that clutch). Namely, the output rotational speed of clutch corresponds to the vehicle speed on consideration of a ratio according to transmission ratio for that clutch, and it is recognized that the vehicle speed scarcely vary at the time of shift. Therefore, the rotational-speed difference control of clutch can be replaced by the rotational speed control of input shaft.

In the fourth embodiment, the rotational-speed difference control of clutch explained in the first embodiment is replaced by the rotational speed control of input shaft. FIGS. 18 to 21 show control apparatus and method for a twin-clutch-type transmission according to the fourth embodiment of the present invention. Block diagram, flowchart, and time charts according to the fourth embodiment will be explained with a focus on functional dissimilarities from the first embodiment.

<Block Diagram>

Figure 18:
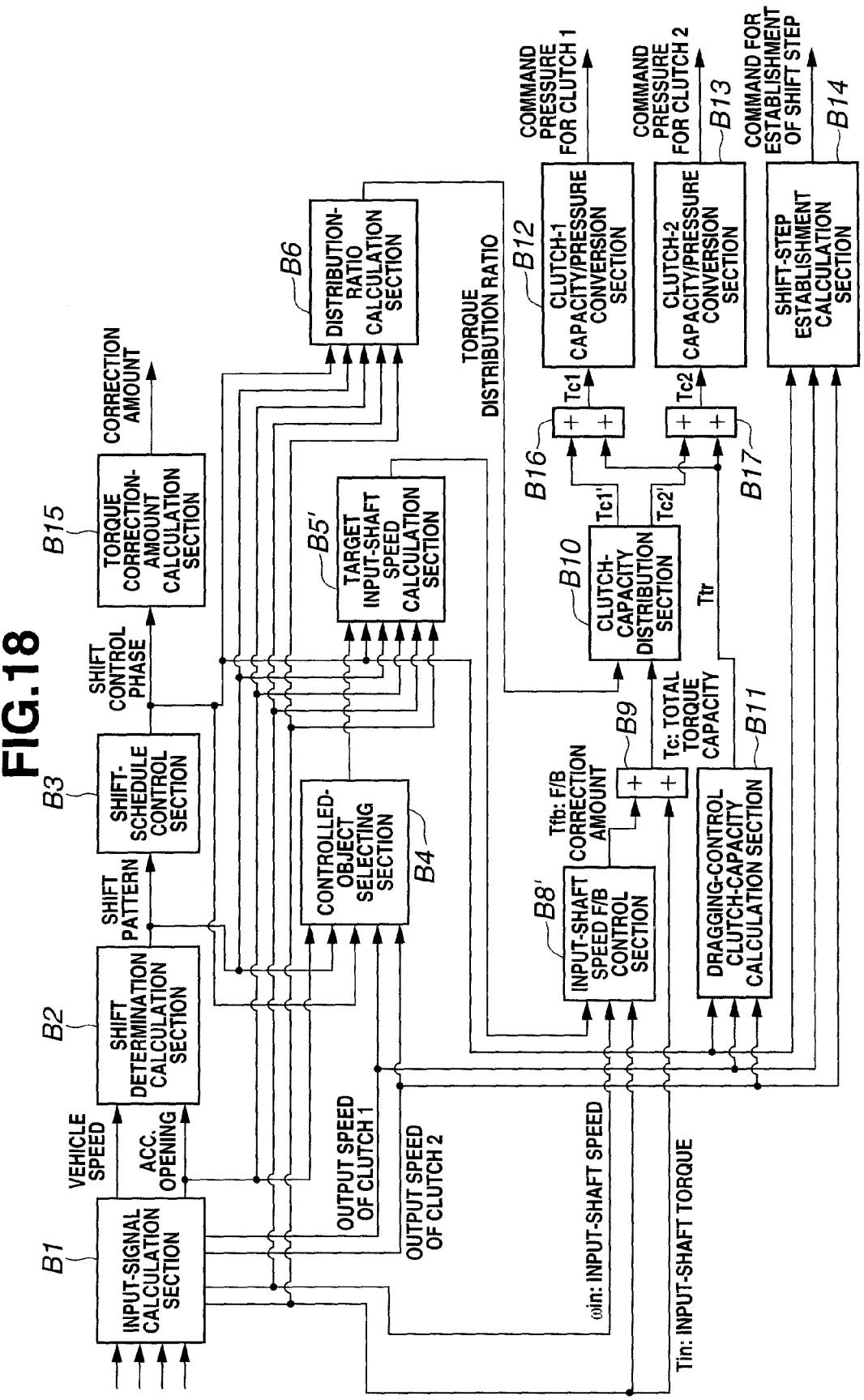
FIG. 18 is a control block diagram showing a detailed control configuration of control apparatus for a twin-clutch-type transmission according to fourth to sixth embodiments of the present invention.

FIG. 18 is a block diagram showing a control configuration according to the fourth embodiment. Although the target rotational-speed difference for the control-targeted clutch is set in order to control the actual rotational-speed difference thereof in the first embodiment, a target input-shaft rotational speed for the control-targeted clutch is set in order to control the actual rotational speed of input shaft in this fourth embodiment. Accordingly, in the block diagram of FIG. 18, the block B7 of FIG. 8 is deleted and blocks B5 and B8 of FIG. 8 are modified from the target rotational-speed difference to the target rotational speed of input shaft, as compared with the block diagram of FIG. 8. It is noted that advantages obtainable in the fourth embodiment are similar as the first embodiment, although the control logic for controlling the rotational-speed difference is just replaced with a control logic for controlling the actual rotational speed.

<Flowchart>

Figure 19:
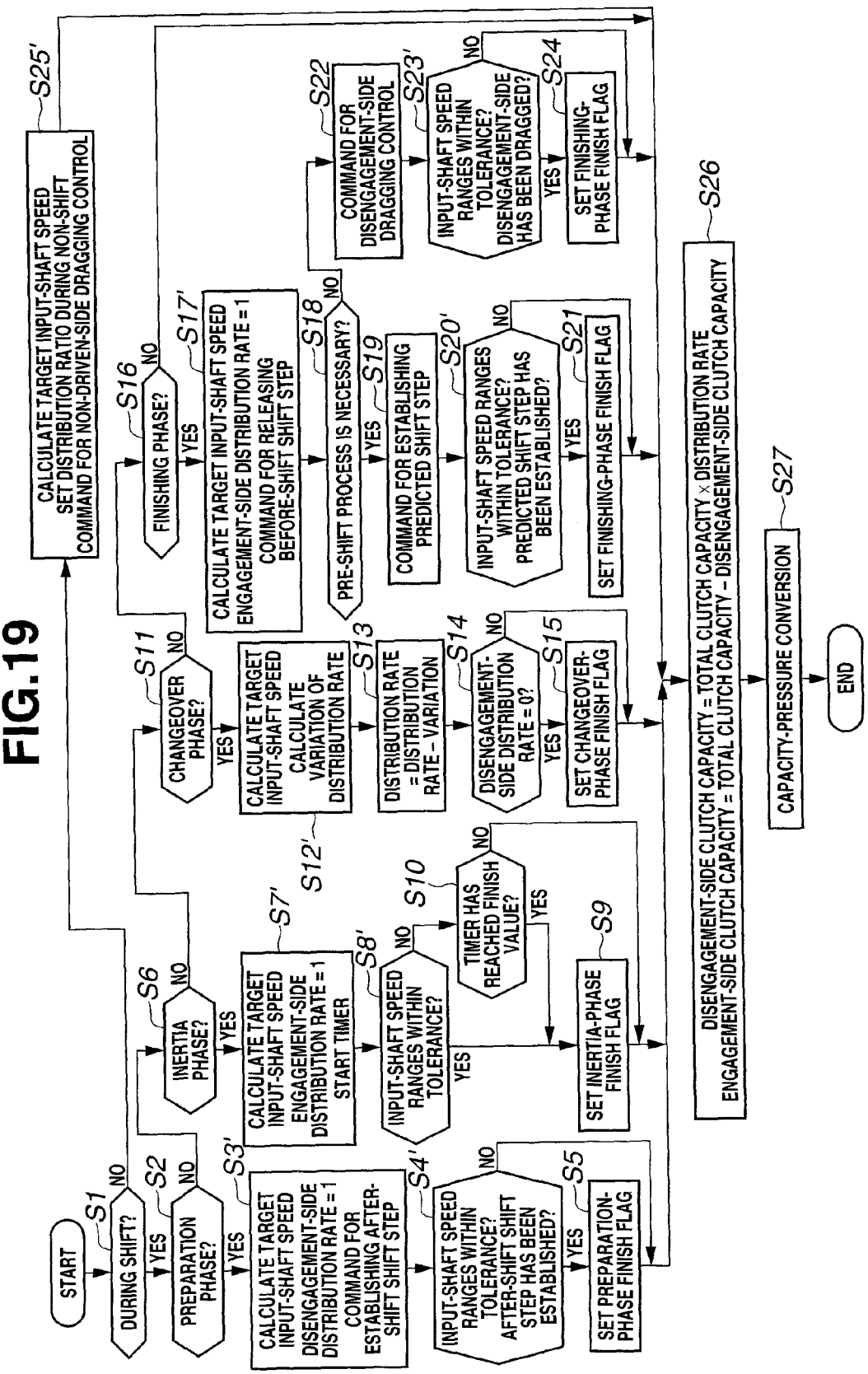
FIG. 19 is a flowchart explaining a shift control for an automatic transmission according to the fourth embodiment.

FIG. 19 is a flowchart showing a control according to this embodiment. Respective steps S3, S4, S7, S8, S12, S17, S20, S23, and S25 of FIG. 9 are replaced with steps S3', S4', S7', S8', S12', S17', S20', S23', and S25' of the flowchart of FIG. 19, by modifying the respective steps of FIG. 9 from the target rotational-speed difference to the target rotational speed of input shaft. It is noted that advantages obtainable in the fourth embodiment are similar as the first embodiment, although the control logic for controlling the rotational-speed difference is just replaced with the control logic for controlling the actual rotational speed.

<Time Chart>

Figure 20:
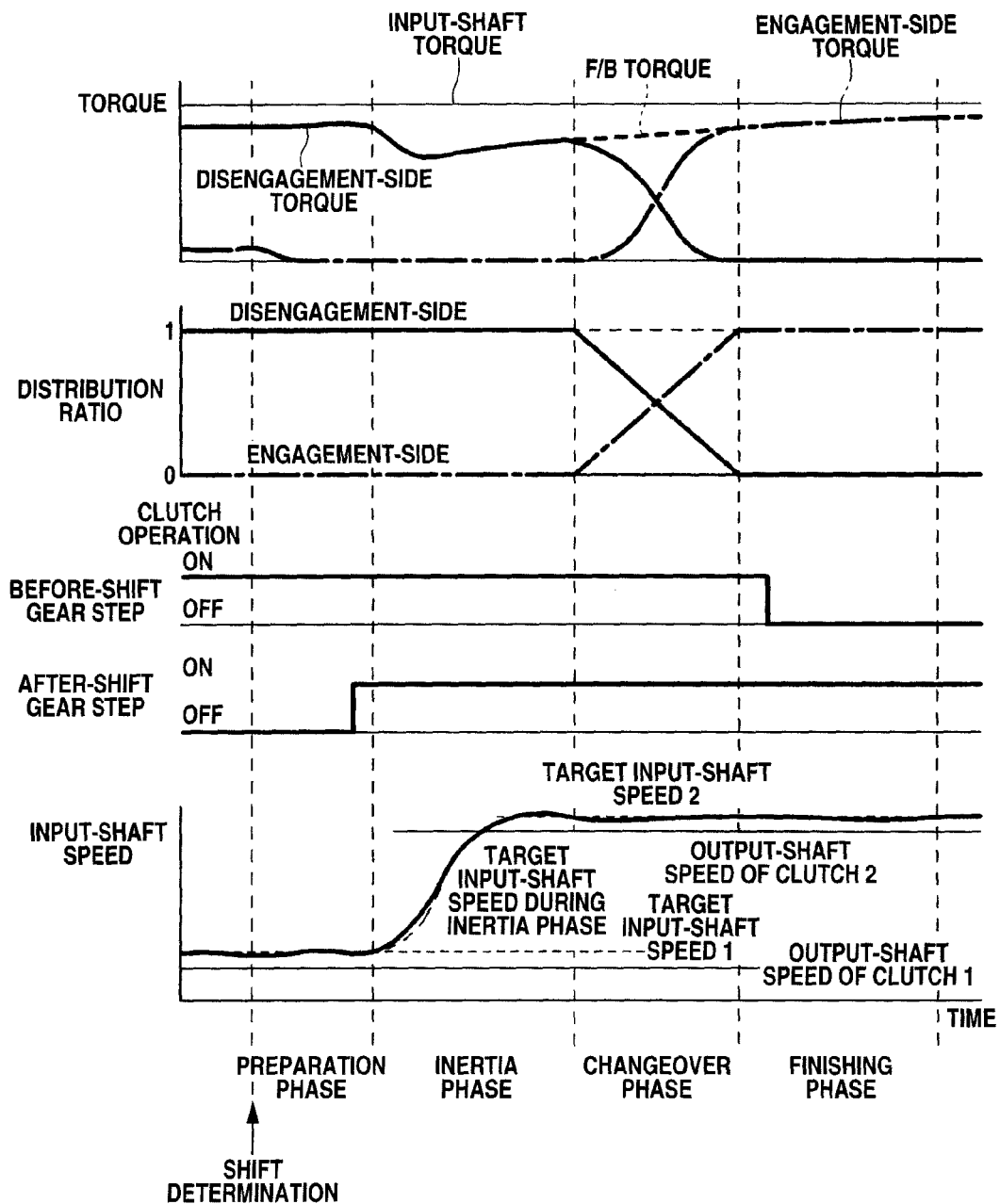
FIG. 20 is a time chart explaining one example of the shift control according to the fourth embodiment.

FIG. 20 is a time chart of shift control according to the fourth embodiment at the time of power-on downshift, in the case where it is determined that the pre-shift process is not necessary during the finishing phase. In this example, obtainable advantages are similar as the case of FIG. 10 according to the first embodiment, although the control logic for rotational-speed difference according to the first embodiment is replaced with the control logic for input-shaft rotational speed.

Figure 21:
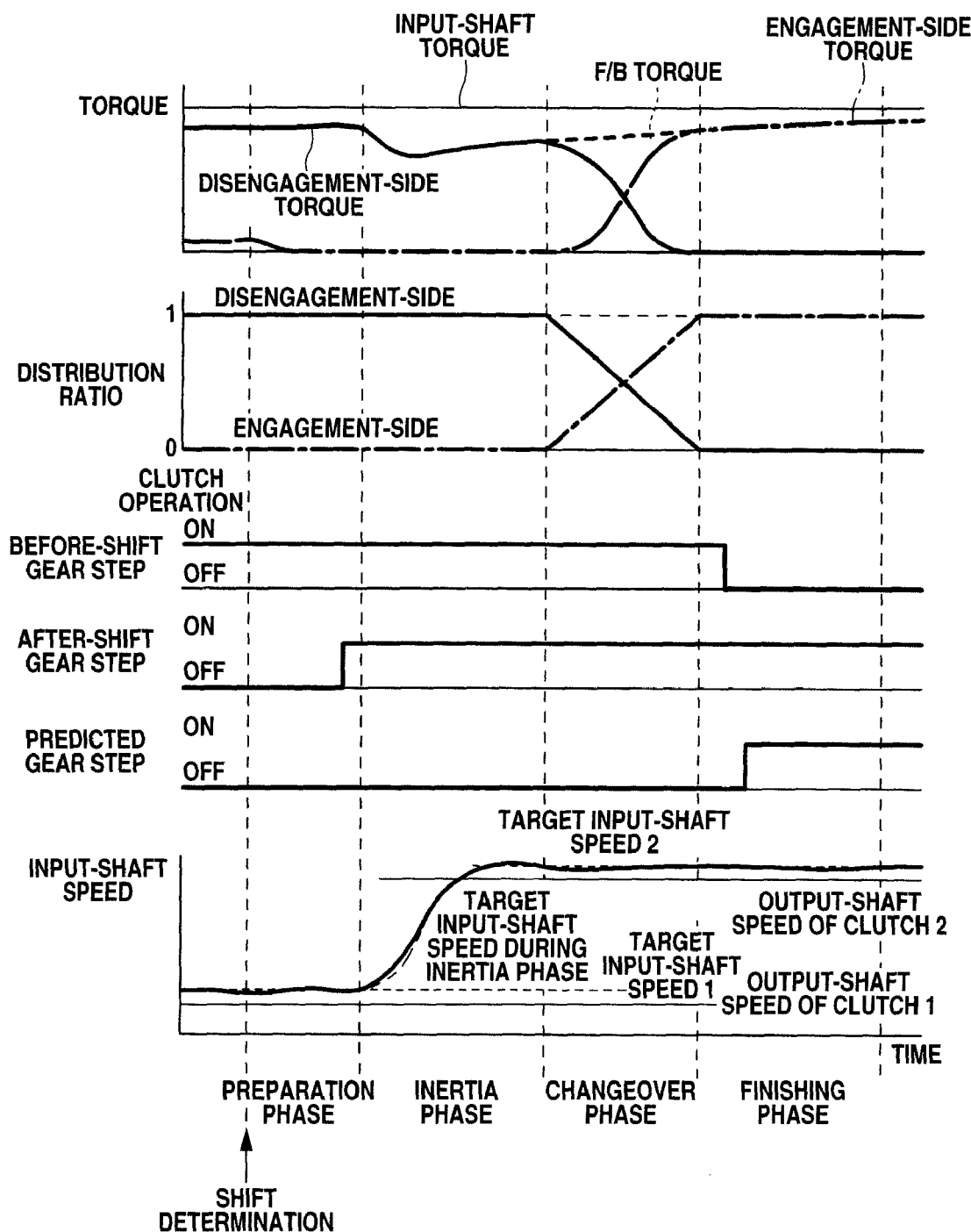
FIG. 21 is a time chart explaining the other example of the shift control according to the fourth embodiment.

FIG. 21 is a time chart of shift control according to the fourth embodiment at the time of power-on downshift, in the case where it is determined that the pre-shift process is necessary during the finishing phase. Also in this example, obtainable advantages are similar as the case of FIG. 11 according to the first embodiment, although the control logic for rotational-speed difference according to the first embodiment is replaced with the control logic for input-shaft rotational speed. Thus, also by focusing on the target speed of input shaft, the similar control as the first embodiment can be carried out, and thereby the similar functions and effects as the first embodiment can be obtained.

Fifth Embodiment

Figure 22:
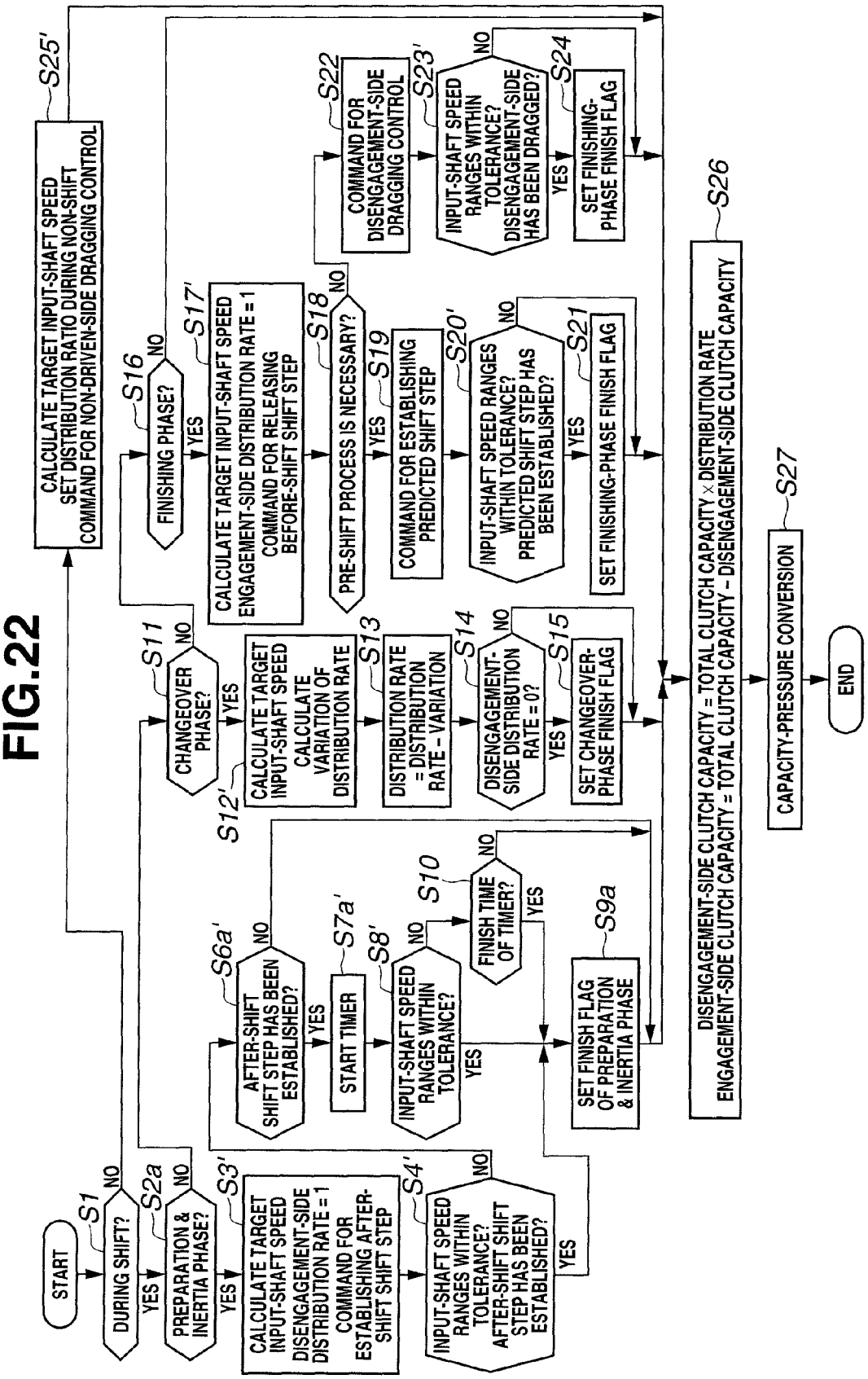
FIG. 22 is a flowchart explaining a shift control for an automatic transmission according to the fifth embodiment.
Figure 23:
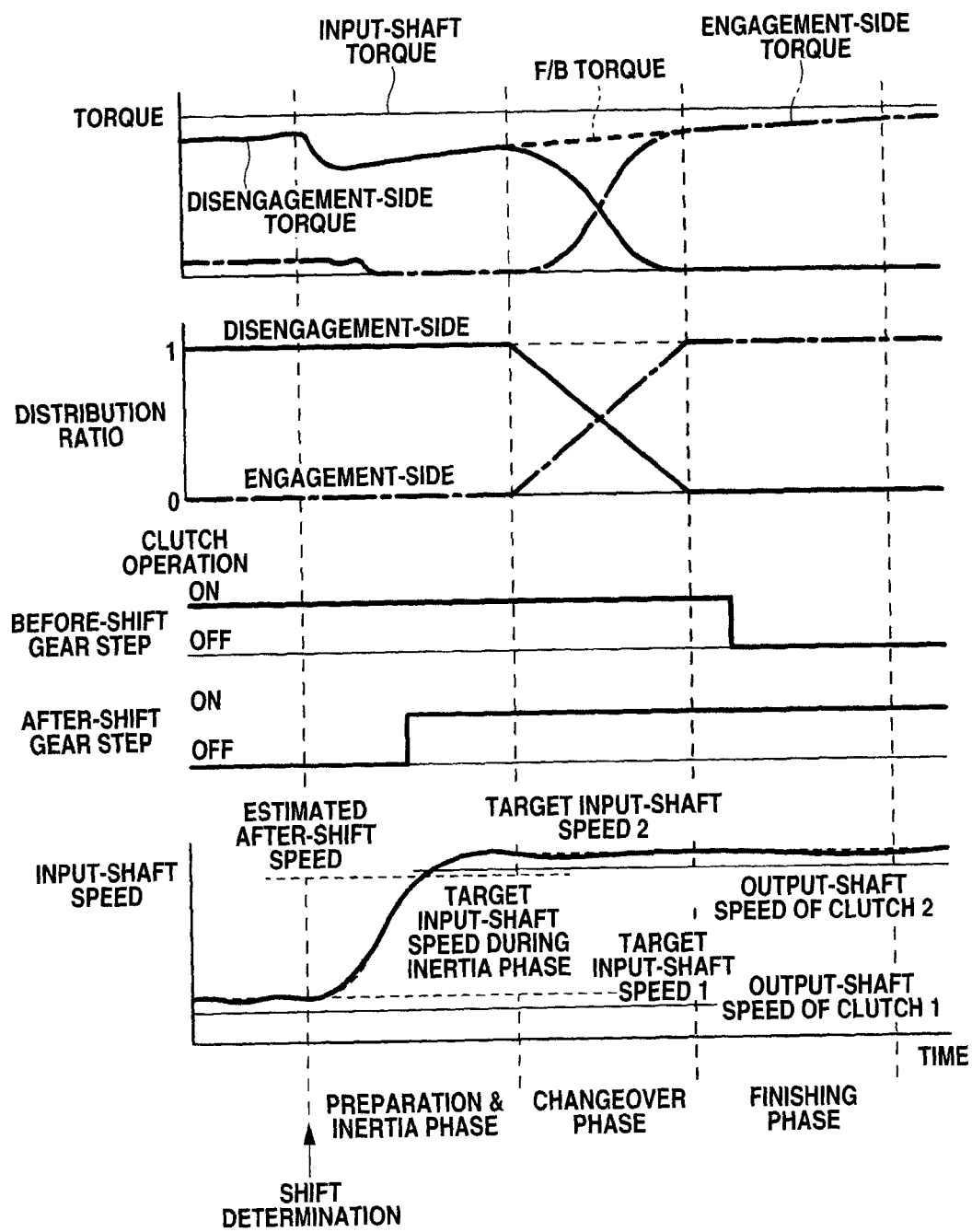
FIG. 23 is a time chart explaining one example of the shift control according to the fifth embodiment.
Figure 24:
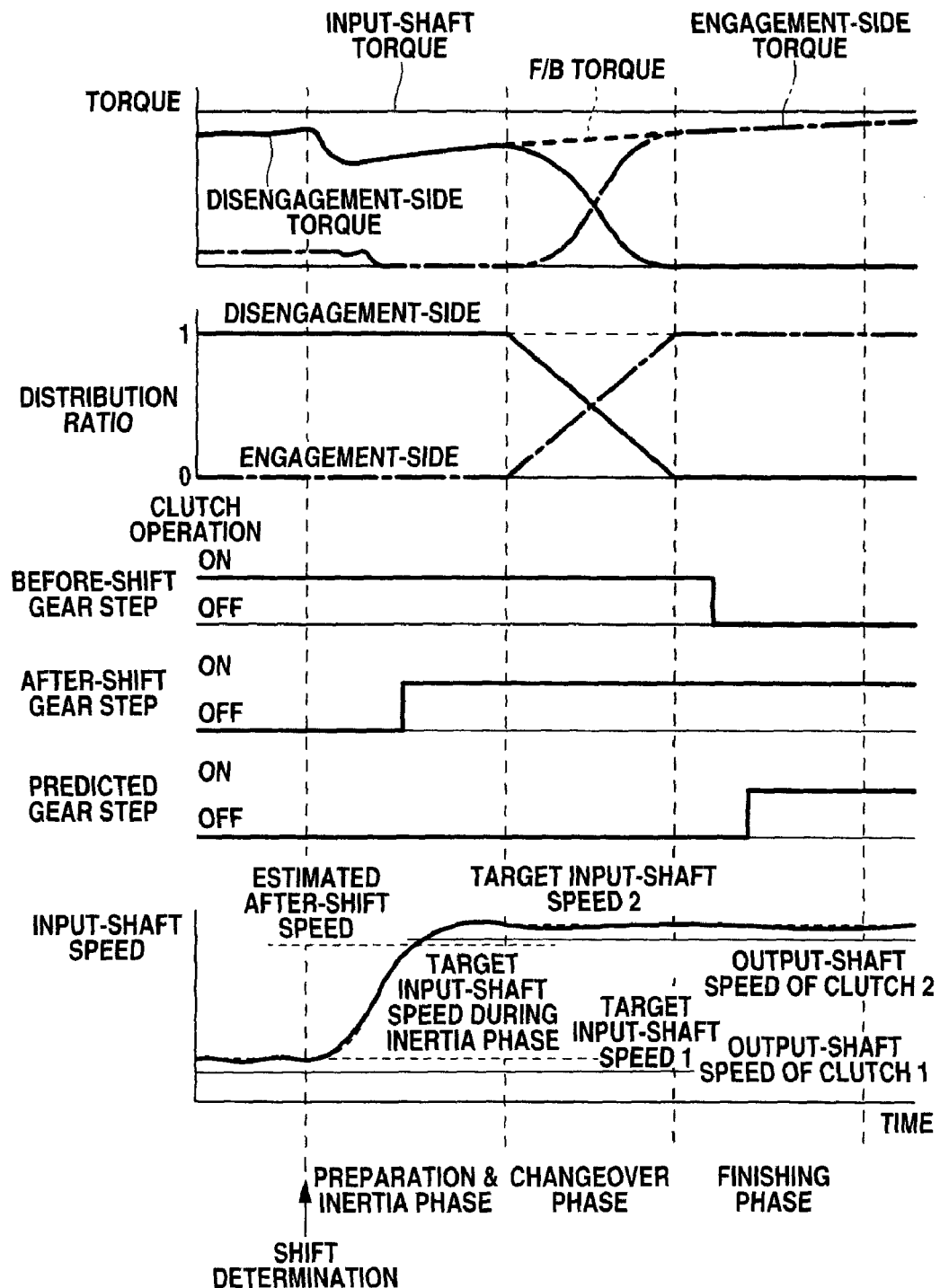
FIG. 24 is a time chart explaining the other example of the shift control according to the fifth embodiment.

Also in the fifth embodiment, the rotational-speed difference control of clutch according to the first embodiment is replaced by the rotational speed control of input shaft. Functional elements associated with the shift control are similar as the block diagram of FIG. 18 according to the fourth embodiment, and hence, explanations thereof are omitted. FIGS. 22 to 24 show control apparatus and method for a twin-clutch-type transmission according to the fifth embodiment of the present invention.

Flowchart and time charts according to the fifth embodiment will be explained with a focus on functional dissimilarities from the second embodiment.

<Flowchart>

FIG. 22 is a flowchart showing a control according to this embodiment. Respective steps S3, S4, S6a, S7a, S8, S12, S17, S20, S23, and S25 of FIG. 12 are replaced with steps S3', S4', S6a', S7a', S8', S12', S17', S20', S23', and S25' of the flowchart of FIG. 22, by modifying the respective steps of FIG. 12 from the target rotational-speed difference to the target rotational speed of input shaft. It is noted that advantages obtainable in the fifth embodiment are similar as the second embodiment, although the control logic for controlling the rotational-speed difference is just replaced with the control logic for controlling the actual rotational speed.

<Time Chart>

FIG. 23 is a time chart of shift control according to the fifth embodiment at the time of power-on downshift, in the case where it is determined that the pre-shift process is not necessary during the finishing phase. In this example, obtainable advantages are similar as the case of FIG. 13 according to the second embodiment, although the control logic for rotational-speed difference according to the second embodiment is replaced with the control logic for input-shaft rotational speed.

FIG. 24 is a time chart of shift control according to the fifth embodiment at the time of power-on downshift, in the case where it is determined that the pre-shift process is necessary during the finishing phase. Also in this example, obtainable advantages are similar as the case of FIG. 14 according to the second embodiment, although the control logic for rotational-speed difference according to the second embodiment is replaced with the control logic for input-shaft rotational speed. Thus, also by focusing on the target speed of input shaft, the similar control as the second embodiment can be carried out, and thereby the similar functions and effects as the second embodiment can be obtained.

Sixth Embodiment

Figure 25:
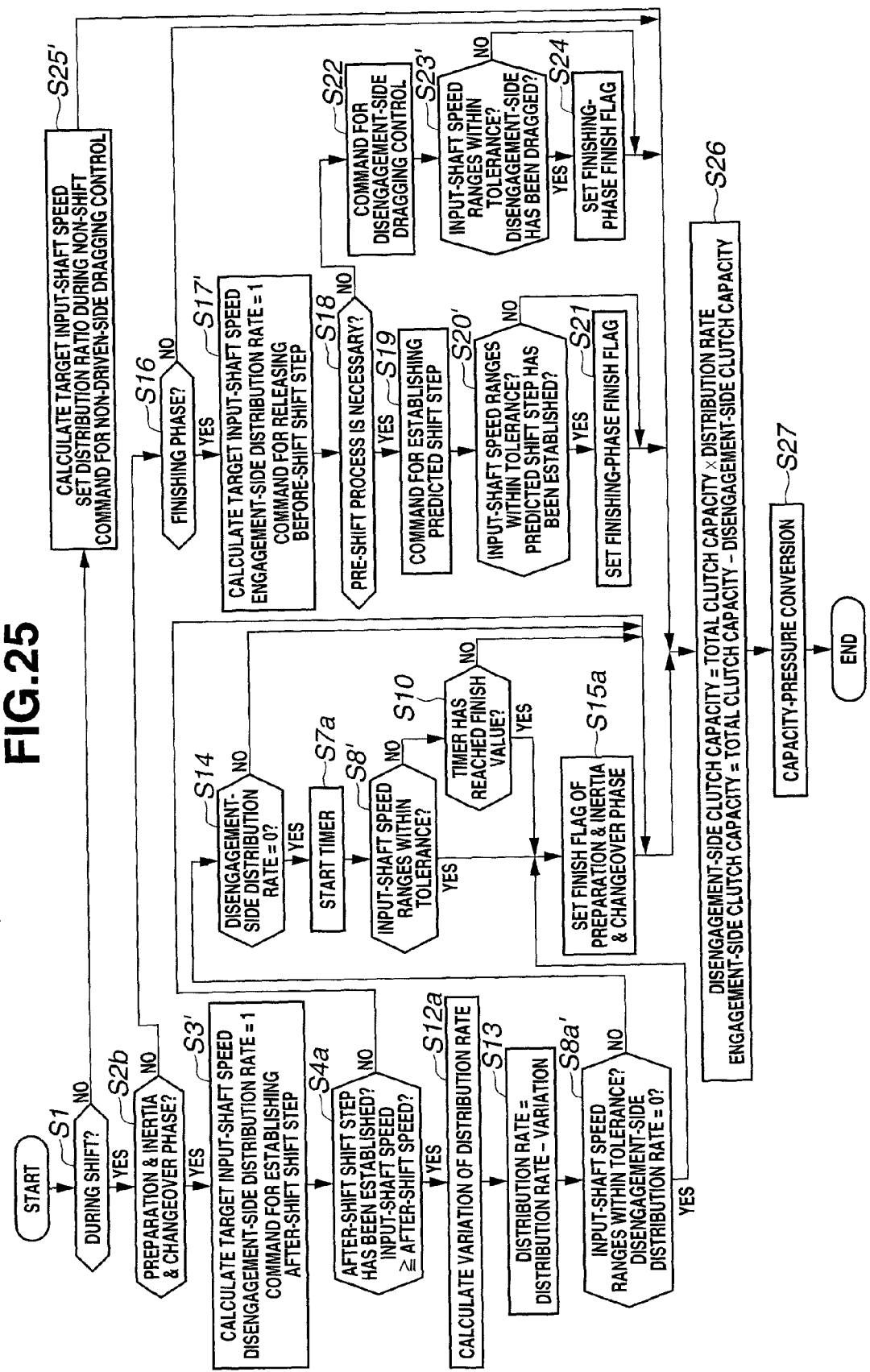
FIG. 25 is a flowchart explaining a shift control for an automatic transmission according to the sixth embodiment.
Figure 26:
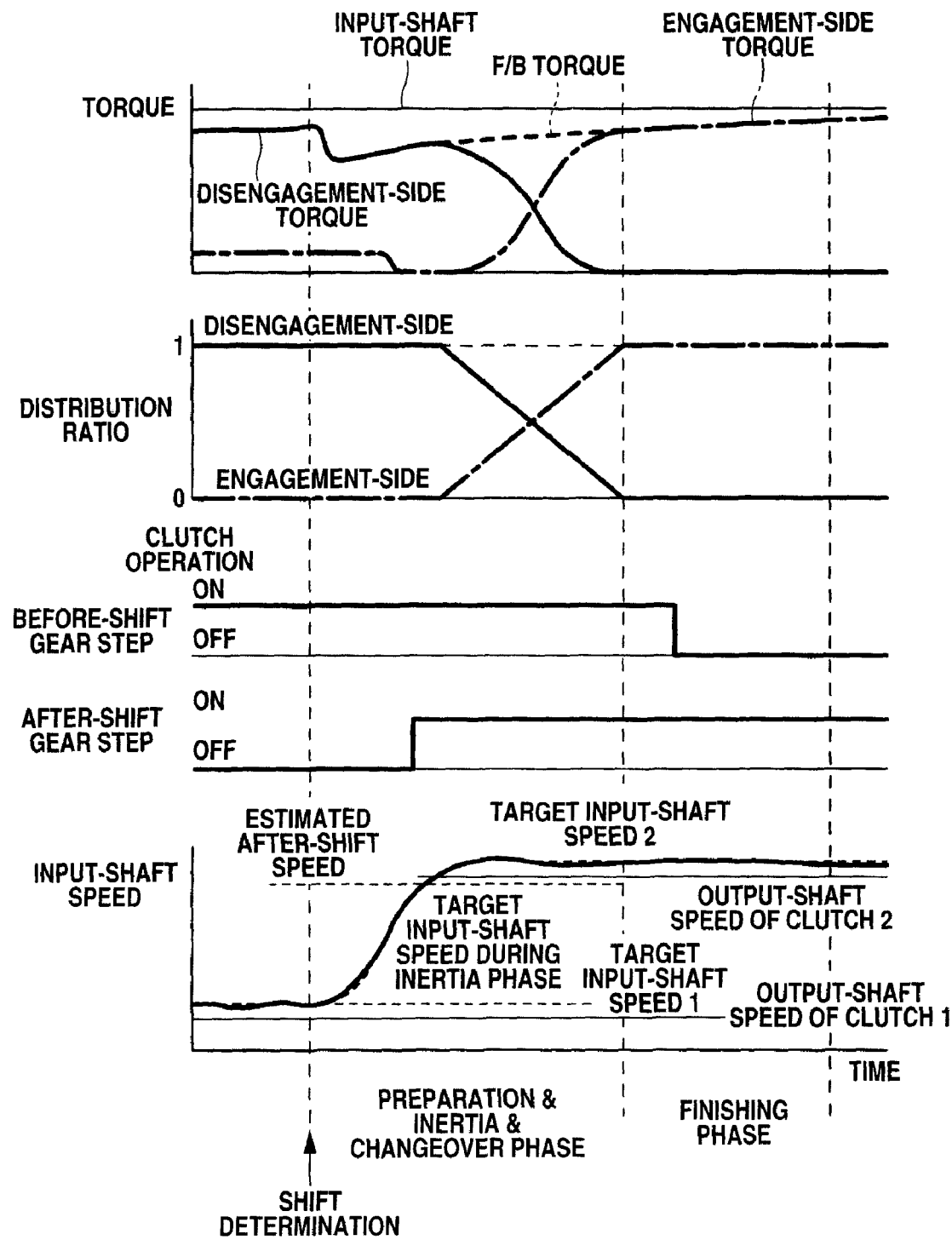
FIG. 26 is a time chart explaining one example of the shift control according to the sixth embodiment.
Figure 27:
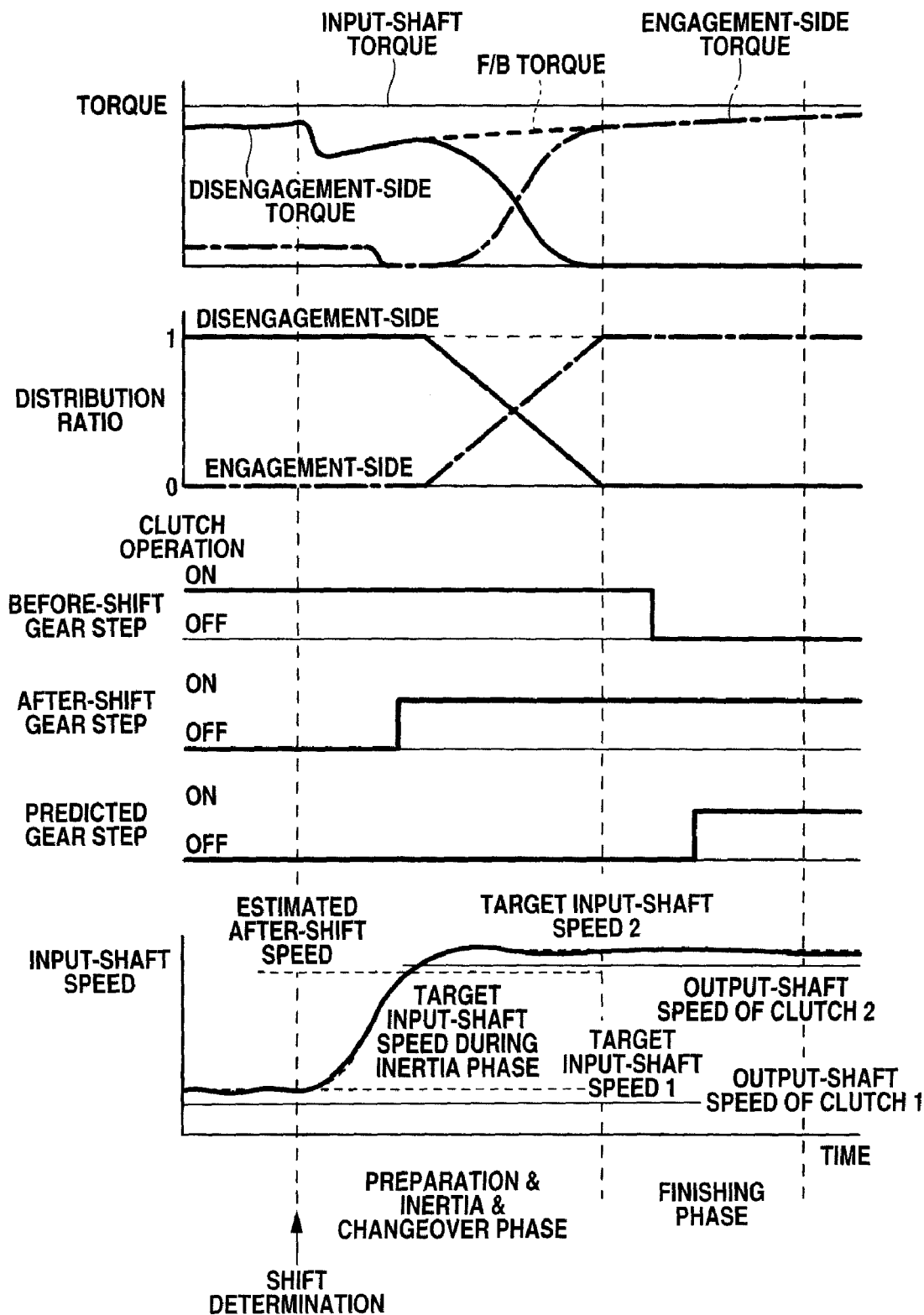
FIG. 27 is a time chart explaining the other example of the shift control according to the sixth embodiment.

Also in the sixth embodiment, the rotational-speed difference control of clutch is replaced by the rotational speed control of input shaft. Functional elements associated with the shift control are similar as the block diagram of FIG. 18 according to the fourth embodiment, and hence, explanations thereof are omitted. FIGS. 25 to 27 show control apparatus and method for a twin-clutch-type transmission according to the sixth embodiment of the present invention.

Flowchart and time charts according to the sixth embodiment will be explained with a focus on functional dissimilarities from the third embodiment.

<Flowchart>

FIG. 25 is a flowchart showing a control according to this embodiment. Respective steps S3, S8a, S8, S17, S20, S23, and S25 of FIG. 15 are replaced with steps S3', S8a', S8', S17', S20', S23', and S25' of the flowchart of FIG. 25, by modifying the respective steps of FIG. 15 from the target rotational-speed difference to the target rotational speed of input shaft. It is noted that advantages obtainable in the sixth embodiment are similar as the third embodiment, although the control logic for controlling the rotational-speed difference is just replaced with the control logic for controlling the actual rotational speed.

<Time Chart>

FIG. 26 is a time chart of shift control according to the sixth embodiment at the time of power-on downshift, in the case where it is determined that the pre-shift process is not necessary during the finishing phase. In this example, obtainable advantages are similar as the case of FIG. 16 according to the third embodiment, although the control logic for rotational-speed difference according to the third embodiment is replaced with the control logic for input-shaft rotational speed.

FIG. 27 is a time chart of shift control according to the sixth embodiment at the time of power-on downshift, in the case where it is determined that the pre-shift process is necessary during the finishing phase. Also in this example, obtainable advantages are similar as the case of FIG. 17 according to the third embodiment, although the control logic for rotational-speed difference according to the third embodiment is replaced with the control logic for input-shaft rotational speed. Thus, also by focusing on the target speed of input shaft, the similar control as the third embodiment can be carried out, and thereby the similar functions and effects as the third embodiment can be obtained.

Other Embodiments

Although the invention has been described above with reference to certain embodiments of the invention, the invention is not limited to the embodiments described above. Modifications and variations of the embodiments described above will occur to those skilled in the art in light of the above teachings.

For example in the above embodiments, friction-engagement element control means 10 controls clutches 1 and 2 by using the rotational speed of input shaft as a control parameter. However, the rotational speed of the other input member related to this rotational speed of input shaft may be used as the control parameter, instead of the input-shaft rotational speed itself. Moreover, the control for clutches 1 and 2 may be performed by using the transmission ratio as the control parameter. Namely, since giving a rotation difference between the input and the output of clutch can mean slightly varying the apparent transmission ratio, the target transmission ratio (value) may be slightly varied from a before-shift value or an after-shift value of transmission ratio. Thereby, the control for clutches 1 and 2 can be performed also so as to bring the transmission ratio closer to thus-set target transmission ratio.

If the transmission ratio is used as the control parameter, also the target value of clutch speed (also corresponding to the control finish threshold value) at the time of shift is determined by the transmission ratio (i.e., target transmission ratio) instead of the input rotational speed. Namely in the case where the target rotational speed is set at a value which is higher than the before-shift input speed or after-shift input speed by predetermined speed value $\Delta n1$ or $\Delta n2$ in the above embodiments, a target transmission ratio (phase finish threshold value) r1 during the preparation phase or a target transmission ratio r2 during the inertia phase is set at a value which is higher than the before-shift transmission ratio or after-shift transmission ratio by a predetermined value $\Delta r1$ or $\Delta r2$.

Moreover, in the case where the rotation difference of clutch 2 or an input rotational speed (e.g., input-shaft rotational speed) corresponding to this rotation difference is controlled toward the target value, a trail (path) for this target value may be prescribed to vary the target value (from its before-shift value to after-shift value) in accordance with the elapsed time as mentioned in the above embodiments, instead of setting the target value at a constant value. Namely, the shift control may be performed with a trail follow-up control that causes the control parameter to follow this target-value trail. Thereby, it becomes possible to achieve the shift control with a desired shift time or shift speed.

Furthermore in the above respective embodiments, the automatic transmission shown in FIG. 6 has been used for explaining the shift control apparatus and method according to the present invention. However, the shift control apparatus and method according to the present invention are widely applicable to the shift (or changeover of friction-engagement element) for various automatic transmissions, as explained in principle referring to FIGS. 1 to 5.

Configurations and Advantages According to Embodiments of the Present Invention

Now, configurations described in above respective embodiments, additional configurations according to the respective embodiments, and those advantages are explained.

In the control apparatus and method according to the above embodiments; the target rotational-speed difference between the input and output rotational speeds of one of first and second friction-engagement elements is set so as to cause the input rotational speed to become higher than the output rotational speed, when a downshift is carried out during the power-on running of vehicle. Then, the total torque capacity for the first and second friction-engagement elements is calculated so as to bring the actual rotational-speed difference of the one of first and second friction-engagement elements to the target rotational-speed difference, and the engagement states of first and second friction-engagement elements are controlled by distributing the total torque capacity into first and second friction-engagement elements with the set distribution ratio. This total torque capacity is calculated by adding the input torque needed to be inputted to the transmission, to the correction value calculated from the deviation for feedback control between the target rotational-speed difference and the actual rotational-speed difference. Accordingly, the total torque capacity can be set properly with a simple logic, and a smooth power-on downshift can be carried out. Moreover, the rotational speed of friction-engagement element is controlled while focusing on the distribution condition of transfer torque, and the changeover control is separated into the control focused on torque and the control focused on rotational speed. Then finally, a single controlled variable can be outputted. Therefore, the smooth changeover motion can be achieved with a simple control logic. Moreover, the disengaging timing of disengagement-side friction-engagement element and the engaging timing of engagement-side friction-engagement element can be completely synchronized with each other. This shift control technique is easily applicable to various automatic transmissions, and can achieve a stable shift control more smoothly and with a little shock. In such control, two friction-engagement elements are controlled with a common control logic. Therefore, the above control is superior in stability as compared to a control in which the two friction-engagement elements are controlled with respective control logics different from each other.

In the control apparatus and method according to the above embodiments; target-value setting section 10A may set the target rotational-speed difference on the basis of two of the engine load or its corresponding amount, and the rotational speed of input member of transmission, its corresponding amount, or transmission ratio. Thereby, the target rotational-speed difference suitable for the running condition of vehicle can be calculated. It is preferable that the rotational-speed difference of the friction-engagement element regarded as controlled object during the power-on running is the value obtained by subtracting the rotational speed of output shaft of this friction-engagement element or its corresponding speed from the rotational speed of input member of the transmission or the rotational speed of input shaft of this friction-engagement element (or its corresponding speed). Also, it is preferable that the target rotational-speed difference of the friction-engagement element regarded as controlled object during the power-on running is set as a target for the value obtained by subtracting the rotational speed of output shaft of this friction-engagement element or its corresponding speed from the rotational speed of input member of the transmission or the rotational speed of input shaft of this friction-engagement element (or its corresponding speed). Accordingly, the same control logic can be used by switching the calculation method for rotational-speed difference when the vehicle changes the running condition (power-on or power-off).

In the control apparatus and method according to the above embodiments; it is preferable that total torque capacity calculating section 10B regards the rotational-speed difference of first friction-engagement element as controlled object and calculates the total torque capacity necessary to bring the rotational-speed difference of first friction-engagement element close to its target rotational-speed difference by assuming that two friction-engagement elements are replaced with one friction-engagement element, irrespective of the running condition (power-on or power-off). Accordingly, the changeover control for clutches can be performed without changing the control logic thereof. In this case, the controlled object is switched between the rotational-speed differences of the two friction-engagement elements in accordance with the progress (phase) of shift control. Accordingly, the shift can be carried out with the same control logic by switching the friction-engagement element regarded as controlled object.

In the control apparatus and method according to the above embodiments; it is preferable that distribution ratio setting section 10C distributes the calculated total torque capacity to the two friction-engagement elements at a distribution ratio according to the running condition of vehicle or the shift progress. Then, engagement control section 10E determines the respective control-command pressures based on the conversion characteristic between torque capacity and hydraulic pressure, from thus-distributed individual torque capacities of respective friction-engagement elements; and controls hydraulic pressures for adjusting the engagement states of respective friction-engagement elements, in accordance with these control-command pressures. Accordingly, the changeover of clutch with the identical control logic becomes possible by controlling the torque distribution ratio. Further, when converting torque capacity to hydraulic pressure, it is preferable to use a frictional resistance characteristic relative to the rotational-speed difference between the input and the output of friction-engagement element. Accordingly, the command pressure can be calculated in conformity with the characteristic between clutch capacity and hydraulic pressure of the friction-engagement element.

In the control apparatus and method according to the above embodiments; it is preferable that the conversion characteristic between torque capacity and hydraulic pressure of the friction-engagement element regarded as controlled object is reflected by the correction amount for the feedback control. Because of such a learning control for friction-engagement element (clutch), the friction-engagement element can be controlled more properly.

In the control apparatus and method according to the above embodiments; it is preferable that the controller (the above sections) sets the target rotational-speed difference of controlled-object at the time of steady-state running (not during the shift) by regarding the friction-engagement element currently transmitting input torque as the controlled-object, and then controls this friction-engagement element so as to cause the measured actual rotational-speed difference thereof to follow the target rotational-speed difference thereof. At this time, the distribution ratio is set so as to distribute all of the total torque capacity only to the friction-engagement element regarded as the controlled-object.

Further in this case, it is preferable to carry out the control for dragging the output shaft of friction-engagement element currently not being driven (i.e., substantially not transmitting input torque), by giving a predetermined small capacity to this friction-engagement element. In the case where the next-time shift control is not scheduled to be carried out soon, such control for dragging the output shaft of currently-disengaged-state friction-engagement element (disengagement-side dragging control) is carried out after the power transmitting element for before-shift speed step is released. Accordingly, the next motion for the shift can be prepared while avoiding an interlock state. In this case, it is preferable that the above-mentioned predetermined small capacity is set at a value calculated based on the following two of the rotational speed of input member of the transmission or the rotational speed of input shaft of friction-engagement element currently not being driven, and an inertia of output shaft of friction-engagement element currently not being driven. Further, in the case where the speed step (shift step) for the friction-engagement element currently not being driven has been established, it is preferable to prohibit the dragging control. Accordingly, the tendency of interlock can be prevented from occurring. Thus in the case where the speed step for the friction-engagement element currently not being driven has been established, it is preferable to make the torque capacity of this friction-engagement element smaller than a minimum value necessary to transfer the substantial input torque of transmission (i.e., so as to prevent this friction-engagement element from substantially transferring the input torque). Accordingly, the interlock can be reliably avoided.

In the control apparatus and method according to the above embodiments; it is preferable that the automatic transmission is a twin-clutch-type transmission for automotive vehicle which includes: two of first input-side shaft 55A and second input-side shaft 55B; first friction-engagement element 52 interposed between first input-side shaft 55A and the input member (input shaft 51); second friction-engagement element 53 interposed between second input-side shaft 55B and the input member; output shaft 54 of transmission; and a plurality of gear sets each for attaining the corresponding speed step and each connected through power transmitting/cutting element 61c~66c (synchro unit capable of transmitting and cutting power) between one of the first and second input-side shafts and output shaft 54.

In the control apparatus and method according to the above embodiments; during the preparation phase, it is preferable that target-value setting section 10A sets the target rotational-speed difference of first friction-engagement element 52 by regarding first friction-engagement element 52 as controlled object; engagement control section 10E controls the engagement state of first friction-engagement element 52 so as to cause the actual rotational-speed difference of first friction-engagement element 52 to follow the target rotational-speed difference; and distribution-ratio setting section 10C sets the distribution ratio at 1:0 so as to distribute substantially all the total torque capacity to first friction-engagement element 52. Thus by keeping the predetermined rotational-speed difference, the clutch capacity can be made substantially equal to the input torque. During the preparation phase, it is preferable that target-value setting section 10A sets the target rotational-speed difference on the basis of the engine load or its corresponding amount of that time; and the rotational speed of input member of transmission, its corresponding amount, or the transmission ratio of that time. Thereby, the target rotational-speed difference can be set appropriately for the running condition of vehicle at that time.

Further, it is preferable that the finish criteria for finishing the preparation phase includes the determination that the actual rotational-speed difference of first friction-engagement element 52 has been maintained within a predetermined tolerance of its target rotational-speed difference for a predetermined time period. Thus by judging the attainment of slip control of first friction-engagement element 52, the preparation phase is terminated. Accordingly, the next inertia phase can smoothly start. In this case, it is preferable that the predetermined tolerance of target rotational-speed difference is set by giving a predetermined margin value β to the target rotational-speed difference (target rotational-speed difference ±β), and this predetermined margin value β is determined based on the engine load or its corresponding amount at that time (e.g., throttle opening, operation degree of accelerator, or input torque to the transmission); and one of the rotational speed of input member of transmission, the input rotational speed of friction-engagement element regarded as controlled object, and the transmission ratio. Accordingly, the attainment of slip control can be properly judged. Moreover in this case, it is preferable that the predetermined time period is determined based on the engine load or its corresponding amount at that time (e.g., throttle opening, operation degree of accelerator, or input torque to the transmission); and one of three of the rotational speed of input member of transmission, the input rotational speed of friction-engagement element regarded as controlled object, and the transmission ratio. Accordingly, the attainment of slip control can be properly judged.

In the control apparatus and method according to the above embodiments; it is preferable that the structure change of the gear set and the power transmitting/cutting unit corresponding to after-shift speed step is carried out during the preparation phase in the case where the automatic transmission needs the structure change by the mechanical actuation (not including engaging/disengaging actuation of first and second friction-engagement elements 52, 53) in order to establish the after-shift speed step. Since second friction-engagement element 53 for after-shift speed step remains released during the preparation phase, the structure change of gear set (power transmitting/cutting unit) does not pose any trouble. Since the structure change of gear set is carried out during the preparation phase in advance in order to establish the after-shift speed step, a time period until completing the shift can be shortened by just that much. This establishment of after-shift speed step (structure change of gear set and power transmitting/cutting unit) during the preparation phase is carried out when the torque capacity of second friction-engagement element 53 connected with the gear set and power transmitting/cutting unit corresponding to after-shift speed step has a value incapable of substantially transmitting the input torque of transmission. This is because the establishment of speed step accompanies the synchro control, and a start condition for this synchro control requires that second friction-engagement element 53 is transmitting substantially none of the input torque of transmission.

In the control apparatus and method according to the above embodiments; during the preparation phase, it is preferable that engagement control section 10E performs the dragging control to drag second input-side shaft 55B connected with second friction-engagement element 53 by giving a predetermined capacity to second friction-engagement element 53 before carrying out the structure change of the gear set and the power transmitting/cutting unit for the after-shift speed step. This dragging control can reduce a load of the above-mentioned synchro. Further, it is preferable that the dragging control is started when the current output rotational-speed of second friction-engagement element 53 or its corresponding speed is lower than the current input rotational-speed of second friction-engagement element 53 or its corresponding speed; and when it is determined that the load of mechanical actuation for establishing the after-shift speed step is greater than a predetermined load on the basis of the current output rotational-speed of second friction-engagement element 53 (or its corresponding speed) and the estimated output rotational-speed of second friction-engagement element 53 which is a value estimated from the after-shift speed step and taken after the after-shift speed step is established (or its corresponding speed). In this case, it is preferable that this estimated output rotational-speed of second friction-engagement element 53 is a value estimated from the current output rotational-speed, the transmission ratio of before-shift speed step, and the transmission ratio of after-shift speed step. Thus by estimating the second friction-engagement element 53's speed scheduled to become after the after-shift speed step has been established, the proper control of rotational-speed difference can be conducted. Further in this case, it is preferable that the above-mentioned predetermined capacity is calculated from an inertia of output shaft of second friction-engagement element 53 and the rotational speed of input member of transmission (or the rotational speed of input shaft of second friction-engagement element 53). Further in this case, it is preferable that engagement control section 10E finishes the dragging control when a dragging-control finish condition is satisfied, and this dragging-control finish condition includes a determination that the output rotational speed of second friction-engagement element 53 has become substantially equal to the input rotational speed of second friction-engagement element 53. Accordingly, the timing for finishing the dragging control can be properly judged. Further in this case, if any speed step other than the after-shift speed step which are connected with second friction-engagement element 53 has been established, it is preferable that the dragging control is started after releasing said other speed step. Accordingly, the timing for starting the dragging control can be properly judged.

Further, in the case where the automatic transmission is adapted to need some mechanical actuations for changing the configuration of engagement-side gear train in order to establish the after-shift speed step, other than the engagement/disengagement of first and second friction-engagement elements at the time of shift; it is preferable that the dragging-control finish condition includes a determination that the after-shift speed step has been already established during the preparation phase. Accordingly, the finish timing of preparation phase can be properly judged in the case of automatic transmission adapted to need the synchro control.

In the control apparatus and method according to the above embodiments; during the inertia phase, it is preferable that target-value setting section 10A regards the difference between input and output rotational speeds of second friction-engagement element 53 as the controlled object, total torque-capacity calculating section 10B calculates the total torque capacity for controlling the rotational-speed difference of second friction-engagement element 53 so as to bring the input rotational speed of second friction-engagement element 53 from its value determined by the before-shift transmission ratio to its value determined by the after-shift transmission ratio, and distribution-ratio setting section 10C sets the distribution ratio so as to distribute substantially all the total torque capacity to first friction-engagement element 52. Accordingly, the rotational variation (inertia phase) can be produced by varying its target value without switching the control logic itself. Further, it is preferable that the above-mentioned input rotational speed of second friction-engagement element 53 determined by the after-shift transmission ratio is estimated from the output rotational speed of first friction-engagement element 52 (or its corresponding speed), the before-shift transmission ratio, and the after-shift transmission ratio. Accordingly, the rotational speed obtainable after the shift can be reliably estimated.

In the control apparatus and method according to the above embodiments; during the inertia phase, it is preferable that target-value setting section 10A produces the trail for the target rotational-speed difference between input and output rotational speeds of second friction-engagement element 53 regarded as controlled object. This trail is produced between a before-shift value thereof and an after-shift value thereof; and is produced based on the current engine load or its corresponding amount (e.g., throttle opening, operation degree of accelerator, or input torque to the transmission), and one of the rotational speed of the input member, the input rotational speed of friction-engagement element regarded as the controlled object, and the transmission ratio. Then, engagement control section 10E controls the torque capacity of first friction-engagement element 52 so as to cause the measured actual rotational-speed difference of second friction-engagement element 53 to follow the trail for target rotational-speed difference. Thus by producing the trail for target rotational-speed difference, arbitrary shift time-period and arbitrary shift speed can be set.

In this case, it is preferable that dynamic characteristics of this target rotational-speed difference during the inertia phase are determined based on the current engine load or its corresponding amount (e.g., throttle opening, operation degree of accelerator, or input torque to the transmission), target time period of shift, and one of the rotational speed of the input member, the input rotational speed of friction-engagement element regarded as the controlled object, and the transmission ratio. Accordingly, the shift according to the running condition of vehicle can be carried out. In this case, it is preferable that the target time-period of shift is a value determined based on the current engine load or its corresponding amount (e.g., throttle opening, operation degree of accelerator, or input torque to the transmission), and one of the rotational speed of the input member, the input rotational speed of friction-engagement element regarded as the controlled object, and the transmission ratio. Accordingly, the target shift time-period suitable for the running condition of vehicle can be set.

In the control apparatus and method according to the above embodiments; during the inertia phase, it is preferable to calculate a derivative value of the produced target rotational-speed difference (trail), to calculate a torque correction amount by multiplying the calculated derivative value by an inertia of the input shaft of transmission, and to output a torque-correction command according to this torque correction amount to the engine. Accordingly, an inertia torque consumed for the increase of rotational speed can be properly covered or supplemented.

In the control apparatus and method according to the above embodiments; during the preparation-and-inertia phase during which the preparation phase and the inertia phase proceed concurrently, it is preferable that the structure change of the gear set and the power transmitting/cutting unit corresponding to after-shift speed step is carried out in the case where the automatic transmission is adapted to need this structure change by the mechanical actuation (not including engaging/disengaging actuation of first and second friction-engagement elements 52, 53) in order to establish the after-shift speed step. In this case, it is preferable that engagement control section 10E performs the dragging control to drag second input-side shaft 55B connected with second friction-engagement element 53 by giving a predetermined capacity to second friction-engagement element 53 before carrying out the structure change of the gear set and the power transmitting/cutting unit for the after-shift speed step. This dragging control can reduce the load of the above-mentioned synchro (load of mechanical actuation). Further in this case, it is preferable that the above-mentioned predetermined capacity is calculated from the inertia of output shaft of second friction-engagement element 53 and the rotational speed of input member of transmission (or the rotational speed of input shaft of second friction-engagement element 53). Further in this case, if any speed step (shift step) other than the after-shift speed step which are connected with second friction-engagement element 53 has been established, it is preferable that the dragging control is started after releasing this other speed step. In the dragging control, it is preferable to remove the capacity of second friction-engagement element 53 when the rotational speed of output shaft of second friction-engagement element 53 remaining dragged becomes substantially equal to the estimated after-shift rotational speed thereof, and then to carry out the control for establishing the after-shift speed step when the torque capacity of second friction-engagement element 53 is smaller than the minimum capacity necessary to transmit the substantial input torque. Accordingly, the finish timing of the dragging control and the start timing of the synchro control can be properly judged.

In the control apparatus and method according to the above embodiments; it is preferable that the finish condition of inertia phase includes the determination that the input rotational speed of friction-engagement element regarded as controlled object has reached a finish threshold value. In this case, it is preferable that this finish threshold value is a lower threshold value (greater than or equal to the estimated after-shift rotational speed) which is calculated by subtracting a predetermined value from the set after-shift target rotational speed thereof (≈ the estimated after-shift rotational speed+the set after-shift target rotational-speed difference). This predetermined value is calculated based on the current engine load or its corresponding amount (e.g., throttle opening, operation degree of accelerator, or input torque to the transmission), and one of the rotational speed of the input member, the input rotational speed of friction-engagement element regarded as the controlled object, and the transmission ratio.

Moreover in this case, it is preferable that the finish condition of inertia phase further includes the determination that the input rotational speed of friction-engagement element regarded as controlled object is lower than an upper finish threshold value which is the sum of the above-mentioned set after-shift target rotational speed and the above-mentioned predetermined value (calculated based on the engine load etc.). Further in this case, it is also preferable that the timer is set and started at the same time when the inertia phase is started. Then, if the finish condition (that the input rotational speed of friction-engagement element has reached the finish threshold value) is not satisfied even though the timer has reached a predetermined elapsed time; the control of inertia phase is forced to finish. Further in this case, in the case where the automatic transmission needs the structure change by the mechanical actuation (not including engaging/disengaging actuation of first and second friction-engagement elements 52, 53) in order to establish the after-shift speed step during the shift, the timer may be set and started when the after-shift speed step is established. Then, if the finish condition (that the input rotational speed of friction-engagement element has reached the finish threshold value) is not satisfied even though the timer has reached its predetermined elapsed time; the control of inertia phase is forced to finish.

Further in this case, in the case of the preparation-and-inertia-and-changeover phase during which the preparation phase, the inertia phase, and the changeover proceed concurrently; the timer may be set and started when determining that the distribution state of total torque capacity has reached a state causing second friction-engagement element 53 to have 100% share of the total torque capacity. Then, if the finish condition (that the input rotational speed of friction-engagement element has reached the finish threshold value) is not satisfied even though the timer has reached its predetermined elapsed time; the control of inertia phase (preparation-and-inertia-and-changeover phase) is forced to finish. The predetermined elapsed time in this case is preferably determined based on the current engine load or its corresponding amount (e.g., throttle opening, operation degree of accelerator, or input torque to the transmission), and one of the rotational speed of the input member, the input rotational speed of friction-engagement element regarded as the controlled object, and the transmission ratio. Accordingly, the setting of timer suitable for shift situation can be performed.

In the control apparatus and method according to the above embodiments; during the changeover phase, it is preferable that distribution-ratio setting section 10C sets the distribution ratio so as to gradually increase the distribution rate for second friction-engagement element 53 from substantially equal to 0 to substantially equal to 1 while gradually decreasing the distribution rate for first friction-engagement element 52 from substantially equal to 1 to substantially equal to 0. Thereby, engagement control section 10E controls the engagement states of first and second friction-engagement elements 52, 53 so as to gradually bring a condition where substantially all the total torque capacity is distributed to first friction-engagement element 52 to a condition where substantially all the total torque capacity is distributed to second friction-engagement element 53, while maintaining the actual rotational-speed difference of first friction-engagement element 52 at the target rotational-speed difference thereof. Accordingly, the changeover of friction-engagement elements can be carried out while maintaining the rotational-speed difference.

In this case, the sum of the distribution rate for first friction-engagement element 52 and the distribution rate for second friction-engagement element 53 is always equal to 1. For example, the distribution rate for disengagement-side (first friction-engagement element) can be expressed as 1-$\alpha$, and the distribution rate for engagement-side (second friction-engagement element) can be expressed as $\alpha$, while satisfying a relation $0<\alpha\leqq1$. Accordingly, the interlock inside the transmission and an engine racing (idling) can be prevented.

In the control apparatus and method according to the above embodiments; during the changeover phase, it is preferable that the time variation of the distribution rate is calculated based on the current engine load or its corresponding amount (e.g., throttle opening, operation degree of accelerator, or input torque to the transmission), and one of the rotational speed of the input member, the input rotational speed of friction-engagement element regarded as the controlled object, and the transmission ratio. Accordingly, the changeover of friction-engagement element suitable for the running condition of vehicle can be conducted.

In the control apparatus and method according to the above embodiments; it is preferable that the finish condition of changeover phase includes the determination that the state where all of the total torque capacity is distributed to second friction-engagement element 53 has arisen. Accordingly, the completion of changeover can be reliably judged.

In the control apparatus and method according to the above embodiments, during the finishing phase, it is preferable that target-value setting section 10A sets the target rotational-speed difference of second friction-engagement element 53 by regarding second friction-engagement element 53 as controlled object; and engagement control section 10E controls second friction-engagement element 53 so as to cause the measured actual rotational-speed difference of second friction-engagement element 53 to follow the target rotational-speed difference thereof. Thus, in advance by giving some rotational speed difference to second friction-engagement element 53 remaining used for power transfer, the shift can be smoothly terminated. During the finishing phase, it is preferable that the target rotational-speed difference is determined based on the current engine load or its corresponding amount (e.g., throttle opening, operation degree of accelerator, or input torque to the transmission), and one of the rotational speed of the input member, the input rotational speed of friction-engagement element regarded as the controlled object, and the transmission ratio. Accordingly, the target rotational-speed difference suitable for the current running condition of vehicle can be set.

In the control apparatus and method according to the above embodiments, it is preferable that the finish criteria for terminating the finishing phase includes the determination that that the actual rotational-speed difference of friction-engagement element regarded as controlled object has been maintained within a predetermined tolerance of its target rotational-speed difference for a predetermined time period. Thus by judging the attainment of slip control of friction-engagement element, the finishing phase is terminated. Accordingly, the normal running which carries out the slip control can smoothly start after the finishing phase. In this case, it is preferable that the predetermined tolerance of target rotational-speed difference is set by giving a predetermined margin value $\beta'$ to the set target rotational-speed difference (target rotational-speed difference $\pm\beta'$), and this predetermined margin value $\beta'$ is determined based on the engine load or its corresponding amount (e.g., throttle opening, operation degree of accelerator, or input torque to the transmission at that time); and one of the rotational speed of input member of transmission, the input rotational speed of friction-engagement element regarded as controlled object, and the transmission ratio. Accordingly, the attainment of slip control can be properly judged.

Moreover in this case, it is preferable that the predetermined time period is determined based on the engine load or its corresponding amount at that time (e.g., throttle opening, operation degree of accelerator, or input torque to the transmission); and one of three of the rotational speed of input member of transmission, the input rotational speed of friction-engagement element regarded as controlled object, and the transmission ratio. Accordingly, the attainment of slip control can be properly judged.

In the control apparatus and method according to the above embodiments; it is preferable that the release of gear set and power transmitting/cutting unit corresponding to the before-shift speed step is carried out during the finishing phase in the case where the automatic transmission is adapted to need the structure change by the mechanical actuation (not including engaging/disengaging actuation of first and second friction-engagement elements 52, 53) in order to establish the after-shift speed step at the time of shift. Since first friction-engagement element 52 used for before-shift speed step remains released during the finishing phase, the structure change (release) of before-shift gear set and the like does not pose any trouble. Since the before-shift gear set (power transmitting/cutting unit) is released during the finishing phase in advance, a next desired shift for transmission can be smoothly carried out.

In this case, it is preferable that this release of before-shift speed step (structure change of gear set and power transmitting/cutting unit) during the finishing phase is carried out when the torque capacity of first friction-engagement element 52 connected with the gear set and power transmitting/cutting unit corresponding to before-shift speed step has a value substantially incapable of transmitting the input torque of transmission.

In the control apparatus and method according to the above embodiments; it is preferable that the control for establishing the predicted speed step (pre-shift control) is carried out during the finishing phase by judging whether or not the next-time shift control will be soon carried out, in the case where the automatic transmission needs the structure change by mechanical actuation (not including engaging/disengaging actuation of first and second friction-engagement elements 52, 53) in order to establish the after-shift speed step. Thus by conducting the pre-shift control which previously responds to a command for final speed step, the time period of shift motion can be shortened in the case where sequential shift controls are carried out continuously.

In this case, it is preferable that the judgment of next-time shift control is executed based on the current vehicle speed, throttle opening, and current speed-step. Further in this case, it is preferable that the control for establishing the predicted speed step (pre-shift control) is carried out after the before-shift speed step has been released. Accordingly, a so-called double mesh (double engagement) can be avoided. Further in this case, it is preferable that the control for establishing the predicted speed step (pre-shift control) is carried out when the torque capacity of first friction-engagement element 52 is smaller than its minimum value necessary to transfer the substantial input torque of transmission. Accordingly, the interlock can be reliably avoided.

On the other hand, when determining that the next-time shift control is not scheduled to be carried out soon in the case where the automatic transmission needs the structure change by mechanical actuation (not including engaging/disengaging actuation of first and second friction-engagement elements 52, 53) in order to establish the after-shift speed step, it is preferable that the before-shift speed step is released, and the dragging control for dragging first input-side shaft 55A connected with first friction-engagement element 52 used before the shift is carried out by giving a predetermined torque capacity to first friction-engagement element 52 in the finishing phase.

In this case, it is preferable that this dragging control is carried out after the before-shift speed step has been released. Accordingly, the so-called double mesh (double engagement) can be avoided. Further in this case, it is preferable that the given predetermined torque capacity for dragging control is calculated from the inertia of first input-side shaft 55A connected with first friction-engagement element 52 and the rotational speed of input member of transmission (or the input rotational speed of first friction-engagement element 52).

In the control apparatus and method according to the above embodiments, it is preferable that the finish criteria for terminating the finishing phase further includes judgments of the release of before-shift speed step, and the completion of establishment of predicted speed-step or the completion (execution) of dragging control; in the case where the automatic transmission needs the structure change by mechanical actuation (not including engaging/disengaging actuation of first and second friction-engagement elements 52, 53) in order to establish the after-shift speed step at the time of shift.

This application is based on a prior Japanese Patent Application No. 2006-208908 filed on Jul. 31, 2006. The entire contents of this Japanese Patent Application are hereby incorporated by reference.

The scope of the invention is defined with reference to the following claims.

What is claimed is:

1. A control apparatus for an automatic transmission,
the automatic transmission
including an input member and a plurality of friction-engagement elements having a first friction-engagement element and a second friction-engagement element, and
being adapted to change a rotational speed of the input member driven by an engine, by engaging at least one of the plurality of friction-engagement elements in accordance with a desired speed step,
the control apparatus comprising:
a target-value setting section configured to set a target rotational-speed difference between an input rotational speed and an output rotational speed of at least one of the first and second friction-engagement elements, to cause the input rotational speed to become higher than the output rotational speed, when a downshift by a changeover between the first friction-engagement element and the second friction-engagement element is carried out during a power-on running of vehicle, the first friction-engagement element being adapted to attain a before-shift speed step, the second friction-engagement element being adapted to attain an after-shift speed step;
a total torque-capacity calculating section configured to calculate a total torque capacity necessary for the first and second friction-engagement elements to bring an actual rotational-speed difference between the input rotational speed and the output rotational speed of the at least one of the first and second friction-engagement elements to the target rotational-speed difference set by the target-value setting section;
a distribution-ratio setting section configured to set a distribution ratio of the total torque capacity between the first and second friction-engagement elements;
an individual torque-capacity calculating section configured to calculate individual torque capacities necessary for the respective first and second friction-engagement elements, on the basis of the total torque capacity calculated by the total torque-capacity calculating section and the distribution ratio set by the distribution-ratio setting section; and
an engagement control section configured to control engagement states of the first and second friction-engagement elements in accordance with the individual torque capacities calculated by the individual torque-capacity calculating section,
the total torque-capacity calculating section being configured to calculate the total torque capacity by adding a transmission input torque for being inputted to the input member, to a correction value calculated from a deviation between the target rotational-speed difference and the actual rotational-speed difference for feedback control.

2. The control apparatus as claimed in claim 1, wherein the target-value setting section is configured to set the target rotational-speed difference on the basis of
an engine load or its corresponding amount, and
the rotational speed of the input member, its corresponding amount, or a transmission ratio determined by the speed step.

3. The control apparatus as claimed in claim 1, wherein the automatic transmission further includes
two of a first input-side shaft and a second input-side shaft, the first friction-engagement element being interposed between the first input-side shaft and the input member, the second friction-engagement element being interposed between the second input-side shaft and the input member;
an output shaft; and
a plurality of gear sets each for attaining corresponding speed step, and each connected through a power transmitting/cutting unit between one of the first and second input-side shafts and the output shaft of the transmission.

4. The control apparatus as claimed in claim 3, wherein the target-value setting section, the total torque-capacity calculating section, the distribution-ratio setting section, the individual torque-capacity calculating section, and the engagement control section are configured to cooperate to carry out a control for the downshift at the time of the power-on running, the control for the downshift including
a preparation phase during which the downshift is prepared;
an inertia phase during which the actual rotational-speed difference of the second friction-engagement element is adjusted;
a changeover phase during which the changeover is carried out to change a state of the first friction-engagement element from a substantially engaged state to a substantially disengaged state and to change a state of the second friction-engagement element from the substantially disengaged state to the substantially engaged state; and a finishing phase during which the gear set for attaining the before-shift speed step is released.

5. The control apparatus as claimed in claim 4, wherein the preparation phase, the inertia phase, and the changeover phase are carried out sequentially in this order.

6. The control apparatus as claimed in claim 4, wherein the preparation phase and the inertia phase are concurrently carried out, and the changeover phase is carried out subsequently.

7. The control apparatus as claimed in claim 4, wherein the preparation phase, the inertia phase, and the changeover phase are concurrently carried out.

8. The control apparatus as claimed in claim 4, wherein during the preparation phase, the target-value setting section is configured to set the target rotational-speed difference of the first friction-engagement element by regarding the first friction-engagement element as a controlled object;

the engagement control section is configured to control the engagement state of the first friction-engagement element so as to cause the actual rotational-speed difference of the first friction-engagement element to follow the target rotational-speed difference; and the distribution-ratio setting section is configured to set the distribution ratio so as to distribute substantially all the total torque capacity to the first friction-engagement element.

9. The control apparatus as claimed in claim 8, wherein during the preparation phase, the target-value setting section is configured to set the target rotational-speed difference of the first friction-engagement element on the basis of an current engine load or its corresponding amount, and one of the rotational speed of the input member, its corresponding amount, and a transmission ratio.

10. The control apparatus as claimed in claim 8, the preparation phase ends when a finish condition is satisfied, the finish condition including a determination that the actual rotational-speed difference of the first friction-engagement element has been maintained within a predetermined tolerance of the target rotational-speed difference for a predetermined time period.

11. The control apparatus as claimed in claim 8, the automatic transmission is adapted to need a structure change of the gear set and the power transmitting/cutting unit corresponding to the after-shift speed step by a mechanical actuation, in order to establish the after-shift speed step; and the structure change is carried out during the preparation phase.

12. The control apparatus as claimed in claim 11, wherein during the preparation phase, the structure change of the gear set and the power transmitting/cutting unit corresponding to the after-shift speed step is carried out when the second friction-engagement element connected with the gear set corresponding to the after-shift speed step has a value of torque capacity incapable of substantially transmitting input torque.

13. The control apparatus as claimed in claim 11, wherein during the preparation phase, the engagement control section is configured to perform a dragging control to drag the second input-side shaft connected with the second friction-engagement element by giving a predetermined capacity to the second friction-engagement element before carrying out the structure change of the gear set and the power transmitting/cutting unit for the after-shift speed step.

14. The control apparatus as claimed in claim 13, wherein the engagement control section is configured to finish the dragging control when a dragging-control finish condition is satisfied, the dragging-control finish condition including a determination that the output rotational speed of the second friction-engagement element has become substantially equal to the input rotational speed of the second friction-engagement element.

15. The control apparatus as claimed in claim 4, wherein during the inertia phase, the target-value setting section is configured to regard the rotational-speed difference of the second friction-engagement element as a controlled object;

the total torque-capacity calculating section is configured to calculate the total torque capacity for controlling the rotational-speed difference of the second friction-engagement element so as to bring the input rotational speed of the second friction-engagement element from its value determined by a before-shift transmission ratio to its value determined by an after-shift transmission ratio; and the distribution-ratio setting section is configured to set the distribution ratio so as to distribute substantially all the total torque capacity to the first friction-engagement element.

16. The control apparatus as claimed in claim 15, wherein during the inertia phase, the target-value setting section is configured to produce a trail for the target rotational-speed difference between the input and output rotational speeds of the second friction-engagement element regarded as the controlled object, the trail being produced between its before-shift value and its after-shift value, and being produced based on an current engine load or its corresponding amount, and one of the rotational speed of the input member, the input rotational speed of friction-engagement element regarded as the controlled object, and the transmission ratio; and the engagement control section is configured to control the torque capacity of the first friction-engagement element so as to cause the measured actual rotational-speed difference of the second friction-engagement element to follow the trail.

17. The control apparatus as claimed in claim 4, wherein during the changeover phase, the distribution-ratio setting section configured to set the distribution ratio so as to gradually increase a distribution rate for the second friction-engagement element from substantially equal to 0 to substantially equal to 1 while gradually decreasing a distribution rate for the first friction-engagement element from substantially equal to 1 to substantially equal to 0; and the engagement control section is configured to control the engagement states of the first and second friction-engagement elements so as to gradually bring a condition where substantially all the total torque capacity is distributed to the first friction-engagement element to a condition where substantially all the total torque capacity is distributed to the second friction-engagement element, while maintaining the actual rotational-speed difference of the first friction-engagement element at the target rotational-speed difference thereof.

18. The control apparatus as claimed in claim 17, wherein during the changeover phase,
a changing speed of the distribution rates for the first and second friction-engagement elements is a predetermined speed calculated based on
an current engine load or its corresponding amount, and
one of the rotational speed of the input member, the input rotational speed of friction-engagement element regarded as the controlled object, and a transmission ratio determined by the speed step.

19. The control apparatus as claimed in claim 4, wherein during the finishing phase,
the target-value setting section is configured to set the target rotational-speed difference of the second friction-engagement element by regarding the second friction-engagement element as a controlled object; and
the engagement control section is configured to control the second friction-engagement element so as to cause the actual rotational-speed difference of the second friction-engagement element to follow the target rotational-speed difference thereof.

20. The control apparatus as claimed in claim 19, wherein during the finishing phase,
the target-value setting section is configured to set the target rotational-speed difference of the second friction-engagement element on the basis of
an current engine load or its corresponding amount, and
one of the rotational speed of the input member, the input rotational speed of friction-engagement element regarded as the controlled object, and a transmission ratio.

21. The control apparatus as claimed in claim 4,
the target-value setting section is configured to set a target rotational speed of the input member corresponding to the target rotational-speed difference of the friction-engagement element regarded as a controlled object, to cause the rotational speed of the input member to be higher than or equal to the output rotational speed of the friction-engagement element; and
the total torque-capacity calculating section is configured to calculate the total torque capacity necessary for the first and second friction-engagement elements connected with the input member to bring an actual rotational speed of the input member to the target rotational speed of the input member set by the target-value setting section.

22. A control method for an automatic transmission,
the automatic transmission
including an input member and a plurality of friction-engagement elements having a first friction-engagement element and a second friction-engagement element; and
being adapted to change a rotational speed of the input member driven by an engine, by engaging at least one of the plurality of friction-engagement elements in accordance with a desired speed step,
the control method comprising:
setting a target rotational-speed difference between an input rotational speed and an output rotational speed of at least one of the first and second friction-engagement elements to cause the input rotational speed to become higher than the output rotational speed, when a downshift by a changeover between the first friction-engagement element and the second friction-engagement element is carried out during a power-on running of vehicle, the first friction-engagement element being adapted to attain a before-shift speed step, the second friction-engagement element being adapted to attain an after-shift speed step;
calculating a total torque capacity necessary for the first and second friction-engagement elements by adding a transmission input torque for being inputted to the input member to a correction value so as to bring an actual rotational-speed difference between input and output rotational speeds of the at least one of the first and second friction-engagement elements to the set target rotational-speed difference, the correction value being calculated from a deviation between the target rotational-speed difference and the actual rotational-speed difference for feedback control;
setting a distribution ratio of the total torque capacity between the first and second friction-engagement elements;
calculating individual torque capacities necessary for the respective first and second friction-engagement elements, on the basis of the calculated total torque capacity and the set distribution ratio; and
controlling engagement states of the first and second friction-engagement elements in accordance with the calculated individual torque capacities.

23. The control method as claimed in claim 22, wherein the automatic transmission further includes
two of a first input-side shaft and a second input-side shaft, the first friction-engagement element being interposed between the first input-side shaft and the input member, the second friction-engagement element being interposed between the second input-side shaft and the input member;
an output shaft; and
a plurality of gear sets each for attaining corresponding speed step, and each connected through a power transmitting/cutting unit between one of the first and second input-side shafts and the output shaft of the transmission.

24. The control method as claimed in claim 23, wherein the downshift during the power-on running includes
a first step of preparing the downshift;
a second step of adjusting the actual rotational-speed difference of the second friction-engagement element;
a third step of carrying out the changeover to change a state of the first friction-engagement element from a substantially engaged state to a substantially disengaged state and to change a state of the second friction-engagement element from the substantially disengaged state to the substantially engaged state; and
a fourth step of releasing the gear set for attaining the before-shift speed step.

25. The control method as claimed in claim 24, wherein first step, the second step, and the third step are carried out sequentially in this order.

26. The control method as claimed in claim 24, wherein the first step and the second step are concurrently carried out, and the third step is carried out subsequently.

27. The control method as claimed in claim 24, wherein the first step, the second step, and the third step are concurrently carried out.

* * * * *